United States Patent
Gaalema et al.

(10) Patent No.: US 10,401,480 B1
(45) Date of Patent: Sep. 3, 2019

(54) LIDAR RECEIVER WITH MULTIPLE DETECTORS FOR RANGE-AMBIGUITY MITIGATION

(71) Applicant: Luminar Technologies, Inc., Orlando, FL (US)

(72) Inventors: Stephen D. Gaalema, Colorado Springs, CO (US); Mark A. Drummer, Orlando, FL (US); Stephen L. Mielke, Oviedo, FL (US); Jason M. Eichenholz, Orlando, FL (US)

(73) Assignee: Luminar Technologies, Inc., Orlando, FL (US)

( * ) Notice: Subject to any disclaimer, the term of this patent is extended or adjusted under 35 U.S.C. 154(b) by 0 days.

(21) Appl. No.: 16/210,704

(22) Filed: Dec. 5, 2018

(51) Int. Cl.
  *G01S 7/48* (2006.01)
  *G01S 7/481* (2006.01)

(52) U.S. Cl.
  CPC .......... *G01S 7/4804* (2013.01); *G01S 7/4816* (2013.01); *G01S 7/4817* (2013.01)

(58) Field of Classification Search
  CPC ..... G01S 7/4804; G01S 7/4817; G01S 7/4816
  USPC ....................................................... 356/5.01
  See application file for complete search history.

(56) References Cited

U.S. PATENT DOCUMENTS

| | | | |
|---|---|---|---|
| 3,895,381 A * | 7/1975 | Kock | ................. G01S 13/9035 |
| | | | 342/179 |
| 5,311,353 A | 5/1994 | Crawford | |
| 6,603,534 B2 | 8/2003 | Seifert et al. | |
| 10,006,766 B2 | 6/2018 | Hinderling et al. | |

OTHER PUBLICATIONS

Alvarez et al., "Development and Application of a Compact, Tunable, Solid-State Airborne Ozone Lidar System for Boundary Layer Profiling," Journal of Atmospheric and Oceanic Technology, vol. 28, Oct. 2011, pp. 1258-1272.

* cited by examiner

*Primary Examiner* — Daniel L Murphy

(57) ABSTRACT

In one embodiment, a lidar system includes a light source configured to emit multiple optical signals directed into a field of regard of the lidar system. The optical signals include a first optical signal and a second optical signal, where the second optical signal is emitted a particular time interval after the first optical signal is emitted. The lidar system also includes a receiver configured to detect a received optical signal that includes a portion of the emitted first or second optical signal that is scattered by a target located a distance from the lidar system. The received optical signal is detected after the second optical signal is emitted. The receiver includes a first detector configured to detect a first portion of the received optical signal and a second detector configured to detect a second portion of the received optical signal.

30 Claims, 18 Drawing Sheets

LIDAR RECEIVER WITH MULTIPLE DETECTORS FOR RANGE-AMBIGUITY MITIGATION

TECHNICAL FIELD

This disclosure generally relates to lidar systems.

BACKGROUND

Light detection and ranging (lidar) is a technology that can be used to measure distances to remote targets. Typically, a lidar system includes a light source and an optical receiver. The light source can include, for example, a laser which emits light having a particular operating wavelength. The operating wavelength of a lidar system may lie, for example, in the infrared, visible, or ultraviolet portions of the electromagnetic spectrum. The light source emits light toward a target which scatters the light, and some of the scattered light is received back at the receiver. The system determines the distance to the target based on one or more characteristics associated with the received light. For example, the lidar system may determine the distance to the target based on the time of flight for a pulse of light emitted by the light source to travel to the target and back to the lidar system.

DESCRIPTION OF EXAMPLE EMBODIMENTS

Figure 1:
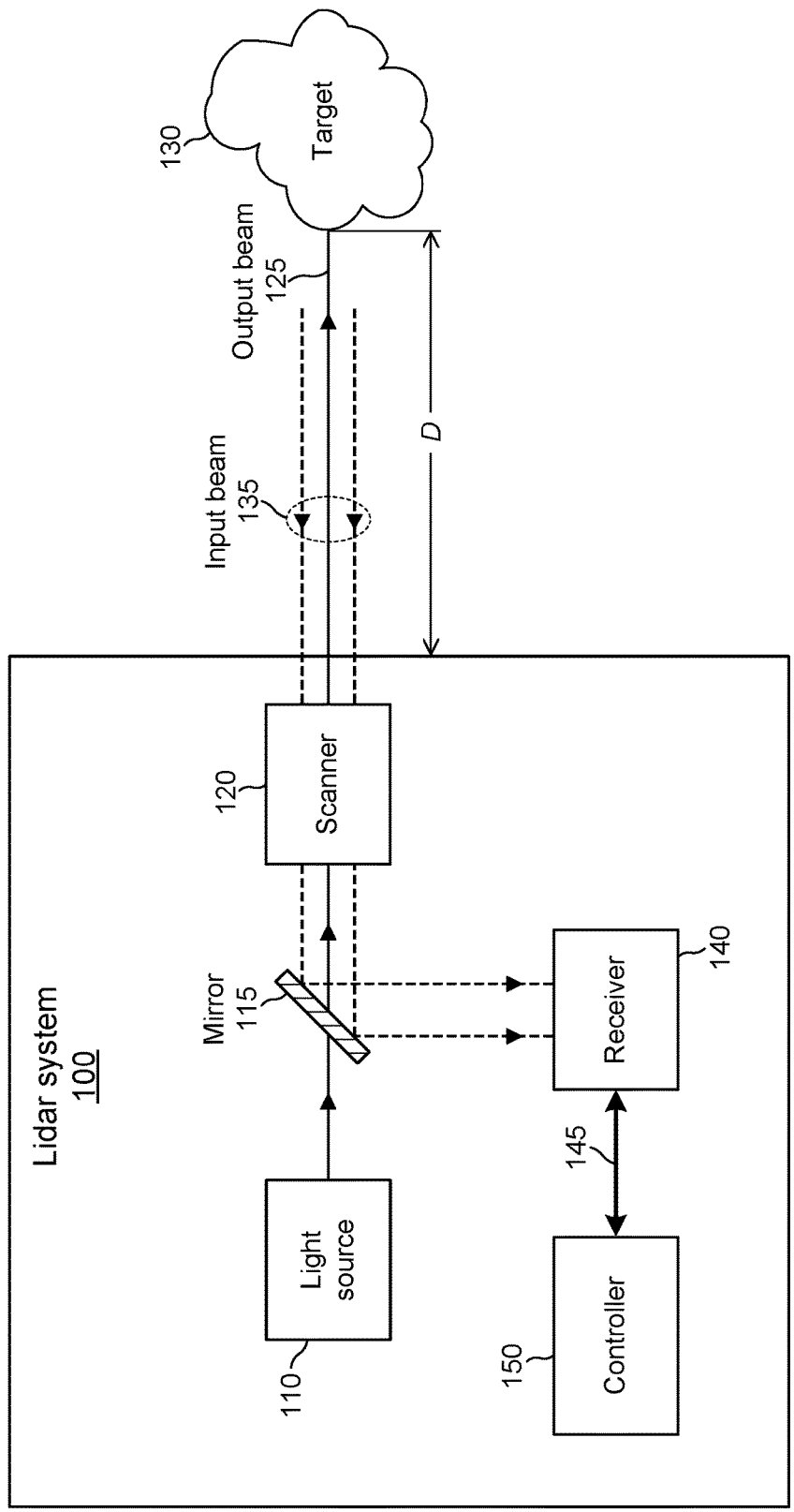
FIG. 1 illustrates an example light detection and ranging (lidar) system.

FIG. 1 illustrates an example light detection and ranging (lidar) system 100. In particular embodiments, a lidar system 100 may be referred to as a laser ranging system, a laser radar system, a LIDAR system, a lidar sensor, or a laser detection and ranging (LADAR or ladar) system. In particular embodiments, a lidar system 100 may include a light source 110, mirror 115, scanner 120, receiver 140, or controller 150. The light source 110 may include, for example, a laser which emits light having a particular operating wavelength in the infrared, visible, or ultraviolet portions of the electromagnetic spectrum. As an example, light source 110 may include a laser with an operating wavelength between approximately 900 nanometers (nm) and 2000 nm. The light source 110 emits an output beam of light 125 which may be continuous wave (CW), pulsed, or modulated in any suitable manner for a given application. The output beam of light 125 is directed downrange toward a remote target 130. As an example, the remote target 130 may be located a distance D of approximately 1 m to 1 km from the lidar system 100.

Once the output beam 125 reaches the downrange target 130, the target may scatter or reflect at least a portion of light from the output beam 125, and some of the scattered or reflected light may return toward the lidar system 100. In the example of FIG. 1, the scattered or reflected light is represented by input beam 135, which passes through scanner 120 and is reflected by mirror 115 and directed to receiver 140. In particular embodiments, a relatively small fraction of the light from output beam 125 may return to the lidar system 100 as input beam 135. As an example, the ratio of input beam 135 average power, peak power, or pulse energy to output beam 125 average power, peak power, or pulse energy may be approximately $10^{-1}$, $10^{-2}$, $10^{-3}$, $10^{-4}$, $10^{-5}$, $10^{-6}$, $10^{-7}$, $10^{-8}$, $10^{-9}$, $10^{-10}$, $10^{-11}$, or $10^{-12}$. As another example, if a pulse of output beam 125 has a pulse energy of 1 microjoule (µJ), then the pulse energy of a corresponding pulse of input beam 135 may have a pulse energy of approximately 10 nanojoules (nJ), 1 nJ, 100 picojoules (pJ), 10 pJ, 1 pJ, 100 femtojoules (fJ), 10 fJ, 1 fJ, 100 attojoules (aJ), 10 aJ, 1 aJ, or 0.1 aJ.

In particular embodiments, output beam 125 may be referred to as an optical signal, laser beam, light beam, optical beam, emitted beam, emitted light, or beam. In particular embodiments, input beam 135 may be referred to as a received optical signal, return beam, received beam, return light, received light, input light, scattered light, or reflected light. As used herein, scattered light may refer to light that is scattered or reflected by a target 130. As an example, an input beam 135 may include: light from the output beam 125 that is scattered by target 130; light from the output beam 125 that is reflected by target 130; or a combination of scattered and reflected light from target 130.

In particular embodiments, receiver 140 may receive or detect photons from input beam 135 and produce one or more representative signals. For example, the receiver 140 may produce an output electrical signal 145 that is representative of the input beam 135, and the electrical signal 145 may be sent to controller 150. In particular embodiments, receiver 140 or controller 150 may include a processor, computing system (e.g., an ASIC or FPGA), or other suitable circuitry. A controller 150 may be configured to analyze one or more characteristics of the electrical signal 145 from the receiver 140 to determine one or more characteristics of the target 130, such as its distance downrange from the lidar system 100. This may be done, for example, by analyzing a time of flight or a frequency or phase of a transmitted beam of light 125 or a received beam of light 135. If lidar system 100 measures a time of flight of T (e.g., T represents a round-trip time of flight for an emitted pulse of light to travel from the lidar system 100 to the target 130 and back to the lidar system 100), then the distance D from the target 130 to the lidar system 100 may be expressed as $D = c \cdot T/2$, where c is the speed of light (approximately $3.0 \times 10^8$ m/s). As an example, if a time of flight is measured to be T=300 ns, then the distance from the target 130 to the lidar system 100 may be determined to be approximately D=45.0 m. As another example, if a time of flight is measured to be T=1.33 μs, then the distance from the target 130 to the lidar system 100 may be determined to be approximately D=199.5 m. In particular embodiments, a distance D from lidar system 100 to a target 130 may be referred to as a distance, depth, or range of target 130. As used herein, the speed of light c refers to the speed of light in any suitable medium, such as for example in air, water, or vacuum. As an example, the speed of light in vacuum is approximately $2.9979 \times 10^8$ m/s, and the speed of light in air (which has a refractive index of approximately 1.0003) is approximately $2.9970 \times 10^8$ m/s.

In particular embodiments, light source 110 may include a pulsed or CW laser. As an example, light source 110 may be a pulsed laser configured to produce or emit pulses of light with a pulse duration or pulse width of approximately 10 picoseconds (ps) to 100 nanoseconds (ns). The pulses may have a pulse duration of approximately 100 ps, 200 ps, 400 ps, 1 ns, 2 ns, 5 ns, 10 ns, 20 ns, 50 ns, 100 ns, or any other suitable pulse duration. As another example, light source 110 may be a pulsed laser that produces pulses with a pulse duration of approximately 1-5 ns. As another example, light source 110 may be a pulsed laser that produces pulses at a pulse repetition frequency of approximately 80 kHz to 10 MHz or a pulse period (e.g., a time between consecutive pulses) of approximately 100 ns to 12.5 μs. In particular embodiments, light source 110 may have a substantially constant pulse repetition frequency, or light source 110 may have a variable or adjustable pulse repetition frequency. As an example, light source 110 may be a pulsed laser that produces pulses at a substantially constant pulse repetition frequency of approximately 640 kHz (e.g., 640,000 pulses per second), corresponding to a pulse period of approximately 1.56 μs. As another example, light source 110 may have a pulse repetition frequency (which may be referred to as a repetition rate) that can be varied from approximately 200 kHz to 2 MHz. As used herein, a pulse of light may be referred to as an optical pulse, a light pulse, or a pulse.

In particular embodiments, light source 110 may include a pulsed or CW laser that produces a free-space output beam 125 having any suitable average optical power. As an example, output beam 125 may have an average power of approximately 1 milliwatt (mW), 10 mW, 100 mW, 1 watt (W), 10 W, or any other suitable average power. In particular embodiments, output beam 125 may include optical pulses with any suitable pulse energy or peak optical power. As an example, output beam 125 may include pulses with a pulse energy of approximately 0.01 μJ, 0.1 μJ, 0.5 μJ, 1 μJ, 2 μJ, 10 μJ, 100 μJ, 1 mJ, or any other suitable pulse energy. As another example, output beam 125 may include pulses with a peak power of approximately 10 W, 100 W, 1 kW, 5 kW, 10 kW, or any other suitable peak power. The peak power ($P_{peak}$) of a pulse of light can be related to the pulse energy (E) by the expression $E = P_{peak} \cdot \Delta t$, where $\Delta t$ is the duration of the pulse, and the duration of a pulse may be defined as the full width at half maximum duration of the pulse. For example, an optical pulse with a duration of 1 ns and a pulse energy of 1 μJ has a peak power of approximately 1 kW. The average power ($P_{av}$) of an output beam 125 can be related to the pulse repetition frequency (PRF) and pulse energy by the expression $P_{av} = PRF \cdot E$. For example, if the pulse repetition frequency is 500 kHz, then the average power of an output beam 125 with 1-μJ pulses is approximately 0.5 W.

In particular embodiments, light source 110 may include a laser diode, such as for example, a Fabry-Perot laser diode, a quantum well laser, a distributed Bragg reflector (DBR) laser, a distributed feedback (DFB) laser, a vertical-cavity surface-emitting laser (VCSEL), a quantum dot laser diode, a grating-coupled surface-emitting laser (GCSEL), a slab-coupled optical waveguide laser (SCOWL), a single-transverse-mode laser diode, a multi-mode broad area laser diode, a laser-diode bar, a laser-diode stack, or a tapered-stripe laser diode. As an example, light source 110 may include an aluminum-gallium-arsenide (AlGaAs) laser diode, an indium-gallium-arsenide (InGaAs) laser diode, an indium-gallium-arsenide-phosphide (InGaAsP) laser diode, or a laser diode that includes any suitable combination of aluminum (Al), indium (In), gallium (Ga), arsenic (As), phosphorous (P), or any other suitable material. In particular embodiments, light source 110 may include a pulsed or CW laser diode with a peak emission wavelength between 1200 nm and 1600 nm. As an example, light source 110 may include a current-modulated InGaAsP DFB laser diode that produces optical pulses at a wavelength of approximately 1550 nm.

In particular embodiments, light source 110 may include a pulsed or CW laser diode followed by one or more optical-amplification stages. A pulsed laser diode may produce relatively low-power optical seed pulses which are amplified by an optical amplifier. As an example, light source 110 may be a fiber-laser module that includes a current-modulated laser diode with an operating wavelength of approximately 1550 nm followed by a single-stage or a multi-stage erbium-doped fiber amplifier (EDFA) or erbium-ytterbium-doped fiber amplifier (EYDFA) that amplifies the seed pulses from the laser diode. As another example, light source 110 may include a continuous-wave (CW) or quasi-CW laser diode followed by an external optical modulator (e.g., an electro-optic amplitude modulator). The optical modulator may modulate the CW light from the laser diode to produce optical pulses which are sent to an optical amplifier. As another example, light source 110 may include a pulsed or CW laser diode followed by a semiconductor optical amplifier (SOA). The SOA may include an active optical waveguide configured to receive light from the laser diode and amplify the light as it propagates through the waveguide. The SOA may be integrated on the same chip as the laser diode, or the SOA may be a separate device with an anti-reflection coating on its input facet or output facet.

In particular embodiments, light source 110 may include a direct-emitter laser diode. A direct-emitter laser diode (which may be referred to as a direct emitter) may include a laser diode which produces light that is not subsequently amplified by an optical amplifier. A light source 110 that includes a direct-emitter laser diode may not include an optical amplifier, and the output light produced by a direct emitter may not be amplified after it is emitted by the laser diode. The light produced by a direct-emitter laser diode (e.g., optical pulses, CW light, or frequency-modulated light) may be emitted directly as a free-space output beam 125 without being amplified. A direct-emitter laser diode may be driven by an electrical power source that supplies current pulses to the laser diode, and each current pulse may result in the emission of an output optical pulse.

In particular embodiments, light source 110 may include a diode-pumped solid-state (DPSS) laser. A DPSS laser (which may be referred to as a solid-state laser) may refer to a laser that includes a solid-state, glass, ceramic, or crystal-based gain medium that is pumped by one or more pump laser diodes. The gain medium may include a host material that is doped with rare-earth ions (e.g., neodymium, erbium, ytterbium, or praseodymium). For example, a gain medium may include a yttrium aluminum garnet (YAG) crystal that is doped with neodymium (Nd) ions, and the gain medium may be referred to as a Nd:YAG crystal. A DPSS laser with a Nd:YAG gain medium may produce light at a wavelength between approximately 1300 nm and approximately 1400 nm, and the Nd:YAG gain medium may be pumped by one or more pump laser diodes with an operating wavelength between approximately 730 nm and approximately 900 nm. A DPSS laser may be a passively Q-switched laser that includes a saturable absorber (e.g., a vanadium-doped crystal that acts as a saturable absorber). Alternatively, a DPSS laser may be an actively Q-switched laser that includes an active Q-switch (e.g., an acousto-optic modulator or an electro-optic modulator). A passively or actively Q-switched DPSS laser may produce output optical pulses that form an output beam 125 of a lidar system 100.

In particular embodiments, an output beam of light 125 emitted by light source 110 may be a collimated optical beam having any suitable beam divergence, such as for example, a full-angle beam divergence of approximately 0.5 to 10 milliradians (mrad). A divergence of output beam 125 may refer to an angular measure of an increase in beam size (e.g., a beam radius or beam diameter) as output beam 125 travels away from light source 110 or lidar system 100. In particular embodiments, output beam 125 may have a substantially circular cross section with a beam divergence characterized by a single divergence value. As an example, an output beam 125 with a circular cross section and a full-angle beam divergence of 2 mrad may have a beam diameter or spot size of approximately 20 cm at a distance of 100 m from lidar system 100. In particular embodiments, output beam 125 may have a substantially elliptical cross section characterized by two divergence values. As an example, output beam 125 may have a fast axis and a slow axis, where the fast-axis divergence is greater than the slow-axis divergence. As another example, output beam 125 may be an elliptical beam with a fast-axis divergence of 4 mrad and a slow-axis divergence of 2 mrad.

In particular embodiments, an output beam of light 125 emitted by light source 110 may be unpolarized or randomly polarized, may have no specific or fixed polarization (e.g., the polarization may vary with time), or may have a particular polarization (e.g., output beam 125 may be linearly polarized, elliptically polarized, or circularly polarized). As an example, light source 110 may produce light with no specific polarization or may produce light that is linearly polarized.

In particular embodiments, lidar system 100 may include one or more optical components configured to reflect, focus, filter, shape, modify, steer, or direct light within the lidar system 100 or light produced or received by the lidar system 100 (e.g., output beam 125 or input beam 135). As an example, lidar system 100 may include one or more lenses, mirrors, filters (e.g., bandpass or interference filters), beam splitters, polarizers, polarizing beam splitters, wave plates (e.g., half-wave or quarter-wave plates), diffractive elements, holographic elements, isolators, couplers, detectors, beam combiners, or collimators. The optical components in a lidar system 100 may be free-space optical components, fiber-coupled optical components, or a combination of free-space and fiber-coupled optical components.

In particular embodiments, lidar system 100 may include a telescope, one or more lenses, or one or more mirrors configured to expand, focus, or collimate the output beam 125 or the input beam 135 to a desired beam diameter or divergence. As an example, the lidar system 100 may include one or more lenses to focus the input beam 135 onto a photodetector of receiver 140. As another example, the lidar system 100 may include one or more flat mirrors or curved mirrors (e.g., concave, convex, or parabolic mirrors) to steer or focus the output beam 125 or the input beam 135. For example, the lidar system 100 may include an off-axis parabolic mirror to focus the input beam 135 onto a photodetector of receiver 140. As illustrated in FIG. 1, the lidar system 100 may include mirror 115 (which may be a metallic or dielectric mirror), and mirror 115 may be configured so that light beam 125 passes through the mirror 115 or passes along an edge or side of the mirror 115 and input beam 135 is reflected toward the receiver 140. As an example, mirror 115 (which may be referred to as an overlap mirror, superposition mirror, or beam-combiner mirror) may include a hole, slot, or aperture which output light beam 125 passes through. As another example, rather than passing through the mirror 115, the output beam 125 may be directed to pass alongside the mirror 115 with a gap (e.g., a gap of width approximately 0.1 mm, 0.5 mm, 1 mm, 2 mm, 5 mm, or 10 mm) between the output beam 125 and an edge of the mirror 115.

In particular embodiments, mirror 115 may provide for output beam 125 and input beam 135 to be substantially coaxial so that the two beams travel along approximately the same optical path (albeit in opposite directions). The input and output beams being substantially coaxial may refer to the beams being at least partially overlapped or sharing a common propagation axis so that input beam 135 and output beam 125 travel along substantially the same optical path (albeit in opposite directions). As an example, output beam 125 and input beam 135 may be parallel to each other to within less than 10 mrad, 5 mrad, 2 mrad, 1 mrad, 0.5 mrad, or 0.1 mrad. As output beam 125 is scanned across a field of regard, the input beam 135 may follow along with the output beam 125 so that the coaxial relationship between the two beams is maintained.

In particular embodiments, lidar system 100 may include a scanner 120 configured to scan an output beam 125 across a field of regard of the lidar system 100. As an example, scanner 120 may include one or more scanning mirrors configured to pivot, rotate, oscillate, or move in an angular manner about one or more rotation axes. The output beam 125 may be reflected by a scanning mirror, and as the scanning mirror pivots or rotates, the reflected output beam 125 may be scanned in a corresponding angular manner. As an example, a scanning mirror may be configured to periodically pivot back and forth over a 30-degree range, which results in the output beam 125 scanning back and forth across a 60-degree range (e.g., a 0-degree rotation by a scanning mirror results in a 20-degree angular scan of output beam 125).

In particular embodiments, a scanning mirror may be attached to or mechanically driven by a scanner actuator or mechanism which pivots or rotates the mirror over a particular angular range (e.g., over a 5° angular range, 30° angular range, 60° angular range, 120° angular range, 360° angular range, or any other suitable angular range). A scanner actuator or mechanism configured to pivot or rotate a mirror may include a galvanometer scanner, a resonant scanner, a piezoelectric actuator, a voice coil motor, an electric motor (e.g., a DC motor, a brushless DC motor, a synchronous electric motor, or a stepper motor), a microelectromechanical systems (MEMS) device, or any other suitable actuator or mechanism. As an example, a scanner 120 may include a scanning mirror attached to a galvanometer scanner configured to pivot back and forth over a 30° angular range. As another example, a scanner 120 may include a polygon mirror configured to rotate continuously in the same direction (e.g., rather than pivoting back and forth, the polygon mirror continuously rotates 360 degrees in a clockwise or counterclockwise direction). The polygon mirror may be coupled or attached to a synchronous motor configured to rotate the polygon mirror at a substantially fixed rotational frequency (e.g., a rotational frequency of approximately 1 Hz, 10 Hz, 50 Hz, 100 Hz, 500 Hz, or 1,000 Hz).

In particular embodiments, scanner 120 may be configured to scan the output beam 125 (which may include at least a portion of the light emitted by light source 110) across a field of regard of the lidar system 100. A field of regard (FOR) of a lidar system 100 may refer to an area, region, or angular range over which the lidar system 100 may be configured to scan or capture distance information. As an example, a lidar system 100 with an output beam 125 with a 30-degree scanning range may be referred to as having a 30-degree angular field of regard. As another example, a lidar system 100 with a scanning mirror that rotates over a 30-degree range may produce an output beam 125 that scans across a 60-degree range (e.g., a 60-degree FOR). In particular embodiments, lidar system 100 may have a FOR of approximately 10°, 20°, 40°, 60°, 120°, 360°, or any other suitable FOR.

In particular embodiments, scanner 120 may be configured to scan the output beam 125 horizontally and vertically, and lidar system 100 may have a particular FOR along the horizontal direction and another particular FOR along the vertical direction. As an example, lidar system 100 may have a horizontal FOR of 10° to 120° and a vertical FOR of 2° to 45°. In particular embodiments, scanner 120 may include a first scan mirror and a second scan mirror, where the first scan mirror directs the output beam 125 toward the second scan mirror, and the second scan mirror directs the output beam 125 downrange from the lidar system 100. As an example, the first scan mirror may scan the output beam 125 along a first direction, and the second scan mirror may scan the output beam 125 along a second direction that is substantially orthogonal to the first direction. As another example, the first scan mirror may scan the output beam 125 along a substantially horizontal direction, and the second scan mirror may scan the output beam 125 along a substantially vertical direction (or vice versa). As another example, the first and second scan mirrors may each be driven by galvanometer scanners. As another example, the first or second scan mirror may include a polygon mirror driven by an electric motor. In particular embodiments, scanner 120 may be referred to as a beam scanner, optical scanner, or laser scanner.

In particular embodiments, one or more scanning mirrors may be communicatively coupled to controller 150 which may control the scanning mirror(s) so as to guide the output beam 125 in a desired direction downrange or along a desired scan pattern. In particular embodiments, a scan pattern may refer to a pattern or path along which the output beam 125 is directed. As an example, scanner 120 may include two scanning mirrors configured to scan the output beam 125 across a 60° horizontal FOR and a 20° vertical FOR. The two scanner mirrors may be controlled to follow a scan path that substantially covers the 60°×20° FOR. As an example, the scan path may result in a point cloud with pixels that substantially cover the 60°×20° FOR. The pixels may be approximately evenly distributed across the 60°×20° FOR. Alternatively, the pixels may have a particular non-uniform distribution (e.g., the pixels may be distributed across all or a portion of the 60°×20° FOR, and the pixels may have a higher density in one or more particular regions of the 60°×20° FOR).

In particular embodiments, a lidar system 100 may include a light source 110 configured to emit pulses of light and a scanner 120 configured to scan at least a portion of the emitted pulses of light across a field of regard of the lidar system 100. One or more of the emitted pulses of light may be scattered by a target 130 located downrange from the lidar system 100, and a receiver 140 may detect at least a portion of the pulses of light scattered by the target 130. A receiver 140 may be referred to as a photoreceiver, optical receiver, optical sensor, detector, photodetector, or optical detector. In particular embodiments, lidar system 100 may include a receiver 140 that receives or detects at least a portion of input beam 135 and produces an electrical signal that corresponds to input beam 135. As an example, if input beam 135 includes an optical pulse, then receiver 140 may produce an electrical current or voltage pulse that corresponds to the optical pulse detected by receiver 140. As another example, receiver 140 may include one or more avalanche photodiodes (APDs) or one or more single-photon avalanche diodes (SPADs). As another example, receiver 140 may include one or more PN photodiodes (e.g., a photodiode structure formed by a p-type semiconductor and a n-type semiconductor, where the PN acronym refers to the structure having p-doped and n-doped regions) or one or more PIN photodiodes (e.g., a photodiode structure formed by an undoped intrinsic semiconductor region located between p-type and n-type regions, where the PIN acronym refers to the structure having p-doped, intrinsic, and n-doped regions). An APD, SPAD, PN photodiode, or PIN photodiode may each be referred to as a detector, photodetector, or photodiode. A detector may have an active region or an avalanche-multiplication region that includes silicon, germanium, InGaAs, or AlInAsSb (aluminum indium arsenide antimonide). The active region may refer to an area over which a detector may receive or detect input light. An active region may have any suitable size or diameter, such as for example, a diameter of approximately 10 µm, 25 µm, 50 µm, 80 µm, 100 µm, 200 µm, 500 µm, 1 mm, 2 mm, or 5 mm.

In particular embodiments, receiver 140 may include electronic circuitry that performs signal amplification, sampling, filtering, signal conditioning, analog-to-digital conversion, time-to-digital conversion, pulse detection, threshold detection, rising-edge detection, or falling-edge detection. As an example, receiver 140 may include a transimpedance amplifier that converts a received photocurrent (e.g., a current produced by an APD in response to a received optical signal) into a voltage signal. The voltage signal may be sent to pulse-detection circuitry that produces an analog or digital output signal 145 that corresponds to one or more optical characteristics (e.g., rising edge, falling edge, amplitude, duration, or energy) of a received optical pulse. As an example, the pulse-detection circuitry may perform a time-to-digital conversion to produce a digital output signal 145. The electrical output signal 145 may be sent to controller 150 for processing or analysis (e.g., to determine a time-of-flight value corresponding to a received optical pulse).

In particular embodiments, controller 150 may be electrically coupled or communicatively coupled to light source 110, scanner 120, or receiver 140. As an example, controller 150 may receive electrical trigger pulses or edges from light source 110, where each pulse or edge corresponds to the emission of an optical pulse by light source 110. As another example, controller 150 may provide instructions, a control signal, or a trigger signal to light source 110 indicating when light source 110 should produce optical pulses. Controller 150 may send an electrical trigger signal that includes electrical pulses, where each electrical pulse results in the emission of an optical pulse by light source 110. In particular embodiments, the frequency, period, duration, pulse energy, peak power, average power, or wavelength of the optical pulses produced by light source 110 may be adjusted based on instructions, a control signal, or trigger pulses provided by controller 150. In particular embodiments, controller 150 may be coupled to light source 110 and receiver 140, and controller 150 may determine a time-of-flight value for an optical pulse based on timing information associated with when the pulse was emitted by light source 110 and when a portion of the pulse (e.g., input beam 135) was detected or received by receiver 140. In particular embodiments, controller 150 may include circuitry that performs signal amplification, sampling, filtering, signal conditioning, analog-to-digital conversion, time-to-digital conversion, pulse detection, threshold detection, rising-edge detection, or falling-edge detection.

In particular embodiments, lidar system 100 may include one or more processors (e.g., a controller 150) configured to determine a distance D from the lidar system 100 to a target 130 based at least in part on a round-trip time of flight for an emitted pulse of light to travel from the lidar system 100 to the target 130 and back to the lidar system 100. The target 130 may be at least partially contained within a field of regard of the lidar system 100 and located a distance D from the lidar system 100 that is less than or equal to an operating range ($R_{OP}$) of the lidar system 100. In particular embodiments, an operating range (which may be referred to as an operating distance) of a lidar system 100 may refer to the distance over which the lidar system 100 is configured to sense or identify targets 130 that appear in a field of regard of the lidar system 100. The operating range of lidar system 100 may be any suitable distance, such as for example, 25 m, 50 m, 100 m, 200 m, 500 m, or 1 km. As an example, a lidar system 100 with a 200-m operating range may be configured to sense or identify various targets 130 located up to 200 m away from the lidar system 100. The operating range $R_{OP}$ of a lidar system 100 may be related to the time τ between the emission of successive optical signals by the expression $R_{OP}=c·τ/2$. For a lidar system 100 with a 200-m operating range ($R_{OP}$=200 m), the time τ between successive pulses (which may be referred to as the pulse period) is approximately $2·R_{OP}/c≅1.33$ µs. The pulse period τ may also correspond to the time of flight for a pulse to travel to and from a target 130 located a distance $R_{OP}$ from the lidar system 100. Additionally, the pulse period τ may be related to the pulse repetition frequency (PRF) by the expression τ=1/PRF. For example, a pulse period of 1.33 µs corresponds to a PRF of approximately 752 kHz.

In particular embodiments, a lidar system 100 may be used to determine the distance to one or more downrange targets 130. By scanning the lidar system 100 across a field of regard, the system may be used to map the distance to a number of points within the field of regard. Each of these depth-mapped points may be referred to as a pixel or a voxel. A collection of pixels captured in succession (which may be referred to as a depth map, a point cloud, or a frame) may be rendered as an image or may be analyzed to identify or detect objects or to determine a shape or distance of objects within the FOR. As an example, a point cloud may cover a field of regard that extends 60° horizontally and 15° vertically, and the point cloud may include a frame of 100-2000 pixels in the horizontal direction by 4-400 pixels in the vertical direction.

In particular embodiments, lidar system 100 may be configured to repeatedly capture or generate point clouds of a field of regard at any suitable frame rate between approximately 0.1 frames per second (FPS) and approximately 1,000 FPS. As an example, lidar system 100 may generate point clouds at a frame rate of approximately 0.1 FPS, 0.5 FPS, 1 FPS, 2 FPS, 5 FPS, 10 FPS, 20 FPS, 100 FPS, 500 FPS, or 1,000 FPS. As another example, lidar system 100 may be configured to produce optical pulses at a rate of $5×10^5$ pulses/second (e.g., the system may determine 500,000 pixel distances per second) and scan a frame of 1000×50 pixels (e.g., 50,000 pixels/frame), which corresponds to a point-cloud frame rate of 10 frames per second (e.g., 10 point clouds per second). In particular embodiments, a point-cloud frame rate may be substantially fixed, or a point-cloud frame rate may be dynamically adjustable. As an example, a lidar system 100 may capture one or more point clouds at a particular frame rate (e.g., 1 Hz) and then switch to capture one or more point clouds at a different frame rate (e.g., 10 Hz). A slower frame rate (e.g., 1 Hz) may be used to capture one or more high-resolution point clouds, and a faster frame rate (e.g., 10 Hz) may be used to rapidly capture multiple lower-resolution point clouds.

In particular embodiments, a lidar system 100 may be configured to sense, identify, or determine distances to one or more targets 130 within a field of regard. As an example, a lidar system 100 may determine a distance to a target 130, where all or part of the target 130 is contained within a field of regard of the lidar system 100. All or part of a target 130 being contained within a FOR of the lidar system 100 may refer to the FOR overlapping, encompassing, or enclosing at least a portion of the target 130. In particular embodiments, target 130 may include all or part of an object that is moving or stationary relative to lidar system 100. As an example, target 130 may include all or a portion of a person, vehicle, motorcycle, truck, train, bicycle, wheelchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects. In particular embodiments, a target may be referred to as an object.

In particular embodiments, light source 110, scanner 120, and receiver 140 may be packaged together within a single housing, where a housing may refer to a box, case, or enclosure that holds or contains all or part of a lidar system 100. As an example, a lidar-system enclosure may contain a light source 110, mirror 115, scanner 120, and receiver 140 of a lidar system 100. Additionally, the lidar-system enclosure may include a controller 150. The lidar-system enclosure may also include one or more electrical connections for conveying electrical power or electrical signals to or from the enclosure. In particular embodiments, one or more components of a lidar system 100 may be located remotely from a lidar-system enclosure. As an example, all or part of light source 110 may be located remotely from a lidar-system enclosure, and pulses of light produced by the light source 110 may be conveyed to the enclosure via optical fiber. As another example, all or part of a controller 150 may be located remotely from a lidar-system enclosure.

In particular embodiments, light source 110 may include an eye-safe laser, or lidar system 100 may be classified as an eye-safe laser system or laser product. An eye-safe laser, laser system, or laser product may refer to a system that includes a laser with an emission wavelength, average power, peak power, peak intensity, pulse energy, beam size, beam divergence, exposure time, or scanned output beam such that emitted light from the system presents little or no possibility of causing damage to a person's eyes. As an example, light source 110 or lidar system 100 may be classified as a Class 1 laser product (as specified by the 60825-1 standard of the International Electrotechnical Commission (IEC)) or a Class I laser product (as specified by Title 21, Section 1040.10 of the United States Code of Federal Regulations (CFR)) that is safe under all conditions of normal use. In particular embodiments, lidar system 100 may be an eye-safe laser product (e.g., with a Class 1 or Class I classification) configured to operate at any suitable wavelength between approximately 900 nm and approximately 2100 nm. As an example, lidar system 100 may include a laser with an operating wavelength between approximately 1200 nm and approximately 1400 nm or between approximately 1400 nm and approximately 1600 nm, and the laser or the lidar system 100 may be operated in an eye-safe manner. As another example, lidar system 100 may be an eye-safe laser product that includes a scanned laser with an operating wavelength between approximately 1300 nm and approximately 1400 nm. As another example, lidar system 100 may be a Class 1 or Class I laser product that includes a laser diode, fiber laser, or solid-state laser with an operating wavelength between approximately 1200 nm and approximately 1600 nm.

In particular embodiments, one or more lidar systems 100 may be integrated into a vehicle. As an example, multiple lidar systems 100 may be integrated into a car to provide a complete 360-degree horizontal FOR around the car. As another example, 4-10 lidar systems 100, each system having a 45-degree to 90-degree horizontal FOR, may be combined together to form a sensing system that provides a point cloud covering a 360-degree horizontal FOR. The lidar systems 100 may be oriented so that adjacent FORs have an amount of spatial or angular overlap to allow data from the multiple lidar systems 100 to be combined or stitched together to form a single or continuous 360-degree point cloud. As an example, the FOR of each lidar system 100 may have approximately 1-15 degrees of overlap with an adjacent FOR. In particular embodiments, a vehicle may refer to a mobile machine configured to transport people or cargo. For example, a vehicle may include, may take the form of, or may be referred to as a car, automobile, motor vehicle, truck, bus, van, trailer, off-road vehicle, farm vehicle, lawn mower, construction equipment, forklift, robot, golf cart, motorhome, taxi, motorcycle, scooter, bicycle, skateboard, train, snowmobile, watercraft (e.g., a ship or boat), aircraft (e.g., a fixed-wing aircraft, helicopter, or dirigible), unmanned aerial vehicle (e.g., drone), or spacecraft. In particular embodiments, a vehicle may include an internal combustion engine or an electric motor that provides propulsion for the vehicle.

In particular embodiments, one or more lidar systems 100 may be included in a vehicle as part of an advanced driver assistance system (ADAS) to assist a driver of the vehicle in operating the vehicle. For example, a lidar system 100 may be part of an ADAS that provides information or feedback to a driver (e.g., to alert the driver to potential problems or hazards) or that automatically takes control of part of a vehicle (e.g., a braking system or a steering system) to avoid collisions or accidents. A lidar system 100 may be part of a vehicle ADAS that provides adaptive cruise control, automated braking, automated parking, collision avoidance, alerts the driver to hazards or other vehicles, maintains the vehicle in the correct lane, or provides a warning if an object or another vehicle is in a blind spot.

In particular embodiments, one or more lidar systems 100 may be integrated into a vehicle as part of an autonomous-vehicle driving system. As an example, a lidar system 100 may provide information about the surrounding environment to a driving system of an autonomous vehicle. An autonomous-vehicle driving system may be configured to guide the autonomous vehicle through an environment surrounding the vehicle and toward a destination. An autonomous-vehicle driving system may include one or more computing systems that receive information from a lidar system 100 about the surrounding environment, analyze the received information, and provide control signals to the vehicle's driving systems (e.g., steering wheel, accelerator, brake, or turn signal). As an example, a lidar system 100 integrated into an autonomous vehicle may provide an autonomous-vehicle driving system with a point cloud every 0.1 seconds (e.g., the point cloud has a 10 Hz update rate, representing 10 frames per second). The autonomous-vehicle driving system may analyze the received point clouds to sense or identify targets 130 and their respective locations, distances, or speeds, and the autonomous-vehicle driving system may update control signals based on this information. As an example, if lidar system 100 detects a vehicle ahead that is slowing down or stopping, the autonomous-vehicle driving system may send instructions to release the accelerator and apply the brakes.

In particular embodiments, an autonomous vehicle may be referred to as an autonomous car, driverless car, self-driving car, robotic car, or unmanned vehicle. In particular embodiments, an autonomous vehicle may refer to a vehicle configured to sense its environment and navigate or drive with little or no human input. As an example, an autonomous vehicle may be configured to drive to any suitable location and control or perform all safety-critical functions (e.g., driving, steering, braking, parking) for the entire trip, with the driver not expected to control the vehicle at any time. As another example, an autonomous vehicle may allow a driver to safely turn their attention away from driving tasks in particular environments (e.g., on freeways), or an autonomous vehicle may provide control of a vehicle in all but a few environments, requiring little or no input or attention from the driver.

In particular embodiments, an autonomous vehicle may be configured to drive with a driver present in the vehicle, or an autonomous vehicle may be configured to operate the vehicle with no driver present. As an example, an autonomous vehicle may include a driver's seat with associated controls (e.g., steering wheel, accelerator pedal, and brake pedal), and the vehicle may be configured to drive with no one seated in the driver's seat or with little or no input from a person seated in the driver's seat. As another example, an autonomous vehicle may not include any driver's seat or associated driver's controls, and the vehicle may perform substantially all driving functions (e.g., driving, steering, braking, parking, and navigating) without human input. As another example, an autonomous vehicle may be configured to operate without a driver (e.g., the vehicle may be configured to transport human passengers or cargo without a driver present in the vehicle). As another example, an autonomous vehicle may be configured to operate without any human passengers (e.g., the vehicle may be configured for transportation of cargo without having any human passengers onboard the vehicle).

In particular embodiments, an optical signal (which may be referred to as a light signal, a light waveform, an optical waveform, an output beam, or emitted light) may include pulses of light, CW light, amplitude-modulated light, frequency-modulated light, or any suitable combination thereof. Although this disclosure describes or illustrates example embodiments of lidar systems 100 or light sources 110 that produce optical signals that include pulses of light, the embodiments described or illustrated herein may also be applied, where appropriate, to other types of optical signals, including continuous-wave (CW) light, amplitude-modulated optical signals, or frequency-modulated optical signals. For example, a lidar system 100 as described or illustrated herein may include a light source 110 configured to produce pulses of light. Alternatively, a lidar system 100 may be configured to operate as a frequency-modulated continuous-wave (FMCW) lidar system and may include a light source 110 configured to produce CW light or a frequency-modulated optical signal.

In particular embodiments, a lidar system 100 may be a FMCW lidar system where the emitted light from the light source 110 (e.g., output beam 125 in FIG. 1 or FIG. 3) includes frequency-modulated light. A pulsed lidar system is a type of lidar system 100 in which the light source 110 emits pulses of light, and the distance to a remote target 130 is determined from the time-of-flight for a pulse of light to travel to the target 130 and back. Another type of lidar system 100 is a frequency-modulated lidar system, which may be referred to as a frequency-modulated continuous-wave (FMCW) lidar system. A FMCW lidar system uses frequency-modulated light to determine the distance to a remote target 130 based on a modulation frequency of the received light (which is scattered by the remote target) relative to the modulation frequency of the emitted light. A round-trip time for the emitted light to travel to a target 130 and back to the lidar system may correspond to a frequency difference between the received scattered light and a portion of the emitted light.

For example, for a linearly chirped light source (e.g., a frequency modulation that produces a linear change in frequency with time), the larger the frequency difference between the emitted light and the received light, the farther away the target 130 is located. The frequency difference may be determined by mixing the received light with a portion of the emitted light (e.g., by coupling the two beams onto a detector, or by mixing analog electric signals corresponding to the received light and the emitted light) and determining the resulting beat frequency. For example, an electrical signal from an APD may be analyzed using a fast Fourier transform (FFT) technique to determine the frequency difference between the emitted light and the received light. If a linear frequency modulation m (e.g., in units of Hz/s) is applied to a CW laser, then the round-trip time T may be related to the frequency difference between the received scattered light and the emitted light $\Delta f$ by the expression $T=\Delta f/m$. Additionally, the distance D from the target 130 to the lidar system 100 may be expressed as $D=c\cdot\Delta f/(2\ m)$, where c is the speed of light. For example, for a light source 110 with a linear frequency modulation of $10^{12}$ Hz/s (or, 1 MHz/µs), if a frequency difference (between the received scattered light and the emitted light) of 330 kHz is measured, then the distance to the target is approximately 50 meters (which corresponds to a round-trip time of approximately 330 ns). As another example, a frequency difference of 1.33 MHz corresponds to a target located approximately 200 meters away.

The light source 110 for a FMCW lidar system may be a fiber laser (e.g., a seed laser diode followed by one or more optical amplifiers) or a direct-emitter laser diode. The seed laser diode or the direct-emitter laser diode may be operated in a CW manner (e.g., by driving the laser diode with a substantially constant DC current), and the frequency modulation may be provided by an external modulator (e.g., an electro-optic phase modulator). Alternatively, the frequency modulation may be produced by applying a DC bias current along with a current modulation to the seed laser diode or the direct-emitter laser diode. The current modulation produces a corresponding refractive-index modulation in the laser diode, which results in a frequency modulation of the light emitted by the laser diode. The current-modulation component (and corresponding frequency modulation) may have any suitable frequency or shape (e.g., piecewise linear, sinusoidal, triangle-wave, or sawtooth).

Figure 2:
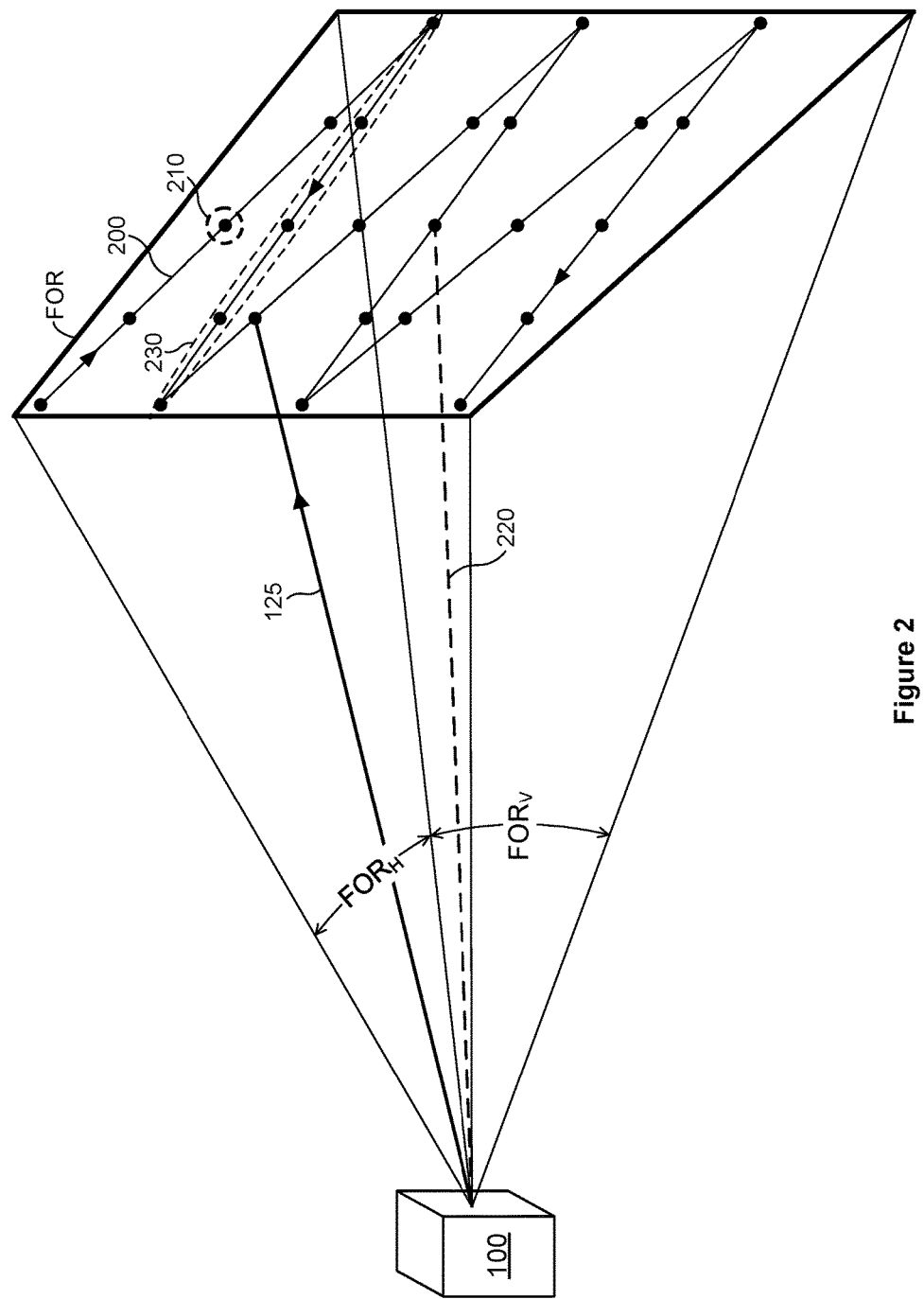
FIG. 2 illustrates an example scan pattern produced by a lidar system.

FIG. 2 illustrates an example scan pattern 200 produced by a lidar system 100. A scan pattern 200 (which may be referred to as an optical scan pattern, optical scan path, scan path, or scan) may represent a path or course followed by output beam 125 as it is scanned across all or part of a FOR. Each traversal of a scan pattern 200 may correspond to the capture of a single frame or a single point cloud. In particular embodiments, a lidar system 100 may be configured to scan output optical beam 125 along one or more particular scan patterns 200. In particular embodiments, a scan pattern 200 may scan across any suitable field of regard (FOR) having any suitable horizontal FOR ($FOR_H$) and any suitable vertical FOR ($FOR_V$). For example, a scan pattern 200 may have a field of regard represented by angular dimensions (e.g., $FOR_H \times FOR_V$) 40°×30°, 90°×40°, or 60°×15°. As another example, a scan pattern 200 may have a $FOR_H$ greater than or equal to 10°, 25°, 30°, 40°, 60°, 90°, or 120°. As another example, a scan pattern 200 may have a $FOR_V$ greater than or equal to 2°, 5°, 10°, 15°, 20°, 30°, or 45°.

In the example of FIG. 2, reference line 220 represents a center of the field of regard of scan pattern 200. In particular embodiments, reference line 220 may have any suitable orientation, such as for example, a horizontal angle of 0° (e.g., reference line 220 may be oriented straight ahead) and a vertical angle of 0° (e.g., reference line 220 may have an inclination of 0°), or reference line 220 may have a nonzero horizontal angle or a nonzero inclination (e.g., a vertical angle of +10° or −10°). In FIG. 2, if the scan pattern 200 has a 60°×15° field of regard, then scan pattern 200 covers a ±30° horizontal range with respect to reference line 220 and a ±7.5° vertical range with respect to reference line 220. Additionally, optical beam 125 in FIG. 2 has an orientation of approximately −15° horizontal and +3° vertical with respect to reference line 220. Optical beam 125 may be referred to as having an azimuth of −15° and an altitude of +3° relative to reference line 220. In particular embodiments, an azimuth (which may be referred to as an azimuth angle) may represent a horizontal angle with respect to reference line 220, and an altitude (which may be referred to as an altitude angle, elevation, or elevation angle) may represent a vertical angle with respect to reference line 220.

In particular embodiments, a scan pattern 200 may include multiple pixels 210, and each pixel 210 may be associated with one or more laser pulses or one or more distance measurements. Additionally, a scan pattern 200 may include multiple scan lines 230, where each scan line represents one scan across at least part of a field of regard, and each scan line 230 may include multiple pixels 210. In FIG. 2, scan line 230 includes five pixels 210 and corresponds to an approximately horizontal scan across the FOR from right to left, as viewed from the lidar system 100. In particular embodiments, a cycle of scan pattern 200 may include a total of $P_x \times P_y$ pixels 210 (e.g., a two-dimensional distribution of $P_x$ by $P_y$ pixels). As an example, scan pattern 200 may include a distribution with dimensions of approximately 100-2,000 pixels 210 along a horizontal direction and approximately 4-400 pixels 210 along a vertical direction. As another example, scan pattern 200 may include a distribution of 1,000 pixels 210 along the horizontal direction by 64 pixels 210 along the vertical direction (e.g., the frame size is 1000×64 pixels) for a total of 64,000 pixels per cycle of scan pattern 200. In particular embodiments, the number of pixels 210 along a horizontal direction may be referred to as a horizontal resolution of scan pattern 200, and the number of pixels 210 along a vertical direction may be referred to as a vertical resolution. As an example, scan pattern 200 may have a horizontal resolution of greater than or equal to 100 pixels 210 and a vertical resolution of greater than or equal to 4 pixels 210. As another example, scan pattern 200 may have a horizontal resolution of 100-2,000 pixels 210 and a vertical resolution of 4-400 pixels 210.

In particular embodiments, each pixel 210 may be associated with a distance (e.g., a distance to a portion of a target 130 from which an associated laser pulse was scattered) or one or more angular values. As an example, a pixel 210 may be associated with a distance value and two angular values (e.g., an azimuth and altitude) that represent the angular location of the pixel 210 with respect to the lidar system 100. A distance to a portion of target 130 may be determined based at least in part on a time-of-flight measurement for a corresponding pulse. An angular value (e.g., an azimuth or altitude) may correspond to an angle (e.g., relative to reference line 220) of output beam 125 (e.g., when a corresponding pulse is emitted from lidar system 100) or an angle of input beam 135 (e.g., when an input signal is received by lidar system 100). In particular embodiments, an angular value may be determined based at least in part on a position of a component of scanner 120. As an example, an azimuth or altitude value associated with a pixel 210 may be determined from an angular position of one or more corresponding scanning mirrors of scanner 120.

Figure 3:
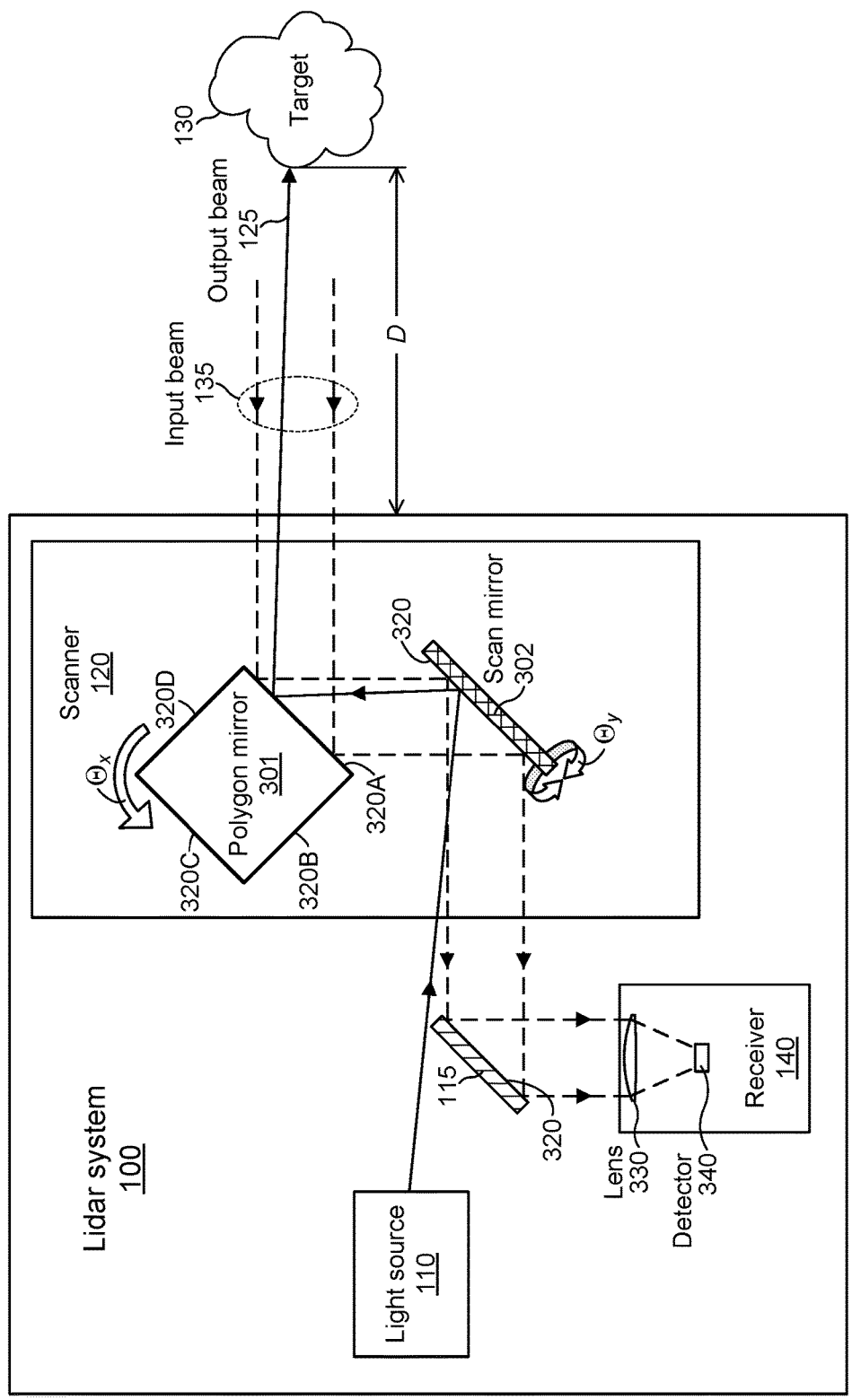
FIG. 3 illustrates an example lidar system with an example rotating polygon mirror.

FIG. 3 illustrates an example lidar system 100 with an example rotating polygon mirror 301. In particular embodiments, a scanner 120 may include a polygon mirror 301 configured to scan output beam 125 along a particular direction. In the example of FIG. 3, scanner 120 includes two scanning mirrors: (1) a polygon mirror 301 that rotates along the $\Theta_x$ direction and (2) a scanning mirror 302 that oscillates back and forth along the $\Theta_y$ direction. The output beam 125 from light source 110, which passes alongside mirror 115, is reflected by reflecting surface 320 of scan mirror 302 and is then reflected by a reflecting surface (e.g., surface 320A, 320B, 320C, or 320D) of polygon mirror 301. Scattered light from a target 130 returns to the lidar system 100 as input beam 135. The input beam 135 reflects from polygon mirror 301, scan mirror 302, and mirror 115, which directs input beam 135 through focusing lens 330 and to the detector 340 of receiver 140. The detector 340 may be a PN photodiode, a PIN photodiode, an APD, a SPAD, or any other suitable detector. A reflecting surface 320 (which may be referred to as a reflective surface) may include a reflective metallic coating (e.g., gold, silver, or aluminum) or a reflective dielectric coating, and the reflecting surface 320 may have any suitable reflectivity R at an operating wavelength of the light source 110 (e.g., R greater than or equal to 70%, 80%, 90%, 95%, 98%, or 99%).

In particular embodiments, a polygon mirror 301 may be configured to rotate along a $\Theta_x$ or $\Theta_y$ direction and scan output beam 125 along a substantially horizontal or vertical direction, respectively. A rotation along a $\Theta_x$ direction may refer to a rotational motion of mirror 301 that results in output beam 125 scanning along a substantially horizontal direction. Similarly, a rotation along a $\Theta_y$ direction may refer to a rotational motion that results in output beam 125 scanning along a substantially vertical direction. In FIG. 3, mirror 301 is a polygon mirror that rotates along the $\Theta_x$ direction and scans output beam 125 along a substantially horizontal direction, and mirror 302 pivots along the $\Theta_y$ direction and scans output beam 125 along a substantially vertical direction. In particular embodiments, a polygon mirror 301 may be configured to scan output beam 125 along any suitable direction. As an example, a polygon mirror 301 may scan output beam 125 at any suitable angle with respect to a horizontal or vertical direction, such as for example, at an angle of approximately 0°, 10°, 20°, 30°, 45°, 60°, 70°, 80°, or 90° with respect to a horizontal or vertical direction.

In particular embodiments, a polygon mirror 301 may refer to a multi-sided object having reflective surfaces 320 on two or more of its sides or faces. As an example, a polygon mirror may include any suitable number of reflective faces (e.g., 2, 3, 4, 5, 6, 7, 8, or 10 faces), where each face includes a reflective surface 320. A polygon mirror 301 may have a cross-sectional shape of any suitable polygon, such as for example, a triangle (with three reflecting surfaces 320), square (with four reflecting surfaces 320), pentagon (with five reflecting surfaces 320), hexagon (with six reflecting surfaces 320), heptagon (with seven reflecting surfaces 320), or octagon (with eight reflecting surfaces 320). In FIG. 3, the polygon mirror 301 has a substantially square cross-sectional shape and four reflecting surfaces (320A, 320B, 320C, and 320D). The polygon mirror 301 in FIG. 3 may be referred to as a square mirror, a cube mirror, or a four-sided polygon mirror. In FIG. 3, the polygon mirror 301 may have a shape similar to a cube, cuboid, or rectangular prism. Additionally, the polygon mirror 301 may have a total of six sides, where four of the sides include faces with reflective surfaces (320A, 320B, 320C, and 320D).

In particular embodiments, a polygon mirror 301 may be continuously rotated in a clockwise or counter-clockwise rotation direction about a rotation axis of the polygon mirror 301. The rotation axis may correspond to a line that is perpendicular to the plane of rotation of the polygon mirror 301 and that passes through the center of mass of the polygon mirror 301. In FIG. 3, the polygon mirror 301 rotates in the plane of the drawing, and the rotation axis of the polygon mirror 301 is perpendicular to the plane of the drawing. An electric motor may be configured to rotate a polygon mirror 301 at a substantially fixed frequency (e.g., a rotational frequency of approximately 1 Hz (or 1 revolution per second), 10 Hz, 50 Hz, 100 Hz, 500 Hz, or 1,000 Hz). As an example, a polygon mirror 301 may be mechanically coupled to an electric motor (e.g., a synchronous electric motor) which is configured to spin the polygon mirror 301 at a rotational speed of approximately 160 Hz (or, 9600 revolutions per minute (RPM)).

In particular embodiments, output beam 125 may be reflected sequentially from the reflective surfaces 320A, 320B, 320C, and 320D as the polygon mirror 301 is rotated. This results in the output beam 125 being scanned along a particular scan axis (e.g., a horizontal or vertical scan axis) to produce a sequence of scan lines, where each scan line corresponds to a reflection of the output beam 125 from one of the reflective surfaces of the polygon mirror 301. In FIG. 3, the output beam 125 reflects off of reflective surface 320A to produce one scan line. Then, as the polygon mirror 301 rotates, the output beam 125 reflects off of reflective surfaces 320B, 320C, and 320D to produce a second, third, and fourth respective scan line. In particular embodiments, a lidar system 100 may be configured so that the output beam 125 is first reflected from polygon mirror 301 and then from scan mirror 302 (or vice versa). As an example, an output beam 125 from light source 110 may first be directed to polygon mirror 301, where it is reflected by a reflective surface of the polygon mirror 301, and then the output beam 125 may be directed to scan mirror 302, where it is reflected by reflective surface 320 of the scan mirror 302. In the example of FIG. 3, the output beam 125 is reflected from the polygon mirror 301 and the scan mirror 302 in the reverse order. In FIG. 3, the output beam 125 from light source 110 is first directed to the scan mirror 302, where it is reflected by reflective surface 320, and then the output beam 125 is directed to the polygon mirror 301, where it is reflected by reflective surface 320A.

Figure 4:
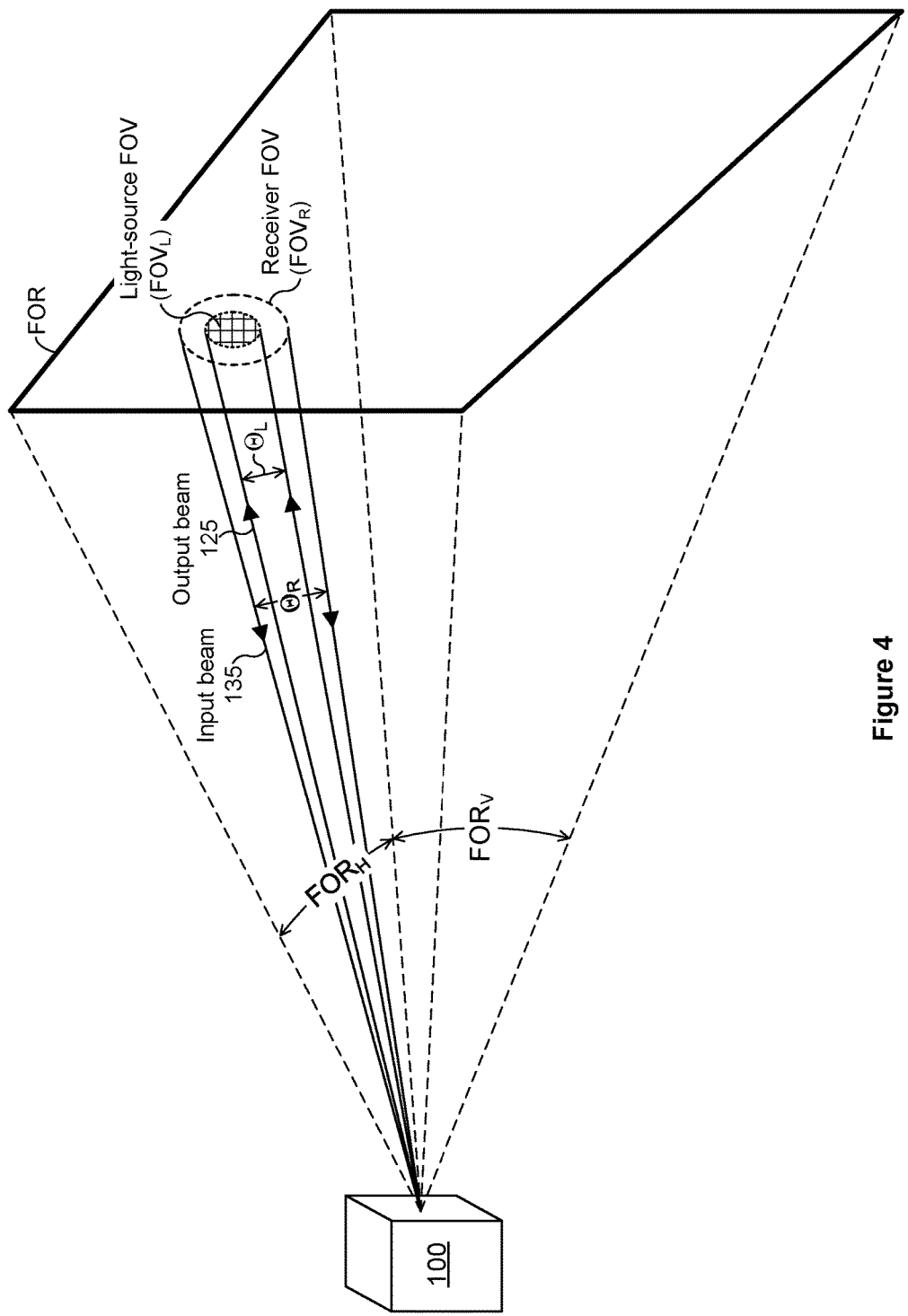
FIG. 4 illustrates an example light-source field of view ($FOV_L$) and receiver field of view ($FOV_R$) for a lidar system.

FIG. 4 illustrates an example light-source field of view ($FOV_L$) and receiver field of view ($FOV_R$) for a lidar system 100. A light source 110 of lidar system 100 may emit pulses of light as the $FOV_L$ and $FOV_R$ are scanned by scanner 120 across a field of regard (FOR). In particular embodiments, a light-source field of view may refer to an angular cone illuminated by the light source 110 at a particular instant of time. Similarly, a receiver field of view may refer to an angular cone over which the receiver 140 may receive or detect light at a particular instant of time, and any light outside the receiver field of view may not be received or detected. As an example, as the light-source field of view is scanned across a field of regard, a portion of a pulse of light emitted by the light source 110 may be sent downrange from lidar system 100, and the pulse of light may be sent in the direction that the $FOV_L$ is pointing at the time the pulse is emitted. The pulse of light may scatter off a target 130, and the receiver 140 may receive and detect a portion of the scattered light that is directed along or contained within the $FOV_R$.

In particular embodiments, scanner 120 may be configured to scan both a light-source field of view and a receiver field of view across a field of regard of the lidar system 100. Multiple pulses of light may be emitted and detected as the scanner 120 scans the $FOV_L$ and $FOV_R$ across the field of regard of the lidar system 100 while tracing out a scan pattern 200. In particular embodiments, the light-source field of view and the receiver field of view may be scanned synchronously with respect to one another, so that as the $FOV_L$ is scanned across a scan pattern 200, the $FOV_R$ follows substantially the same path at the same scanning speed. Additionally, the $FOV_L$ and $FOV_R$ may maintain the same relative position to one another as they are scanned across the field of regard. As an example, the $FOV_L$ may be substantially overlapped with or centered inside the $FOV_R$ (as illustrated in FIG. 4), and this relative positioning between $FOV_L$ and $FOV_R$ may be maintained throughout a scan. As another example, the $FOV_R$ may lag behind the $FOV_L$ by a particular, fixed amount throughout a scan (e.g., the $FOV_R$ may be offset from the $FOV_L$ in a direction opposite the scan direction).

In particular embodiments, the $FOV_L$ may have an angular size or extent $\Theta_L$ that is substantially the same as or that corresponds to the divergence of the output beam 125, and the $FOV_R$ may have an angular size or extent $\Theta_R$ that corresponds to an angle over which the receiver 140 may receive and detect light. In particular embodiments, the receiver field of view may be any suitable size relative to the light-source field of view. As an example, the receiver field of view may be smaller than, substantially the same size as, or larger than the angular extent of the light-source field of view. In particular embodiments, the light-source field of view may have an angular extent of less than or equal to 50 milliradians, and the receiver field of view may have an angular extent of less than or equal to 50 milliradians. The $FOV_L$ may have any suitable angular extent $\Theta_L$, such as for example, approximately 0.1 mrad, 0.2 mrad, 0.5 mrad, 1 mrad, 1.5 mrad, 2 mrad, 3 mrad, 5 mrad, 10 mrad, 20 mrad, 40 mrad, or 50 mrad. Similarly, the $FOV_R$ may have any suitable angular extent $\Theta_R$, such as for example, approximately 0.1 mrad, 0.2 mrad, 0.5 mrad, 1 mrad, 1.5 mrad, 2 mrad, 3 mrad, 5 mrad, 10 mrad, 20 mrad, 40 mrad, or 50 mrad. In particular embodiments, the light-source field of view and the receiver field of view may have approximately equal angular extents. As an example, $\Theta_L$ and $\Theta_R$ may both be approximately equal to 1 mrad, 2 mrad, or 4 mrad. In particular embodiments, the receiver field of view may be larger than the light-source field of view, or the light-source field of view may be larger than the receiver field of view. As an example, $\Theta_L$ may be approximately equal to 3 mrad, and $\Theta_R$ may be approximately equal to 4 mrad. As another example, $\Theta_R$ may be approximately L times larger than $\Theta_L$, where L is any suitable factor, such as for example, 1.1, 1.2, 1.5, 2, 3, 5, or 10.

In particular embodiments, a pixel 210 may represent or may correspond to a light-source field of view or a receiver field of view. As the output beam 125 propagates from the light source 110, the diameter of the output beam 125 (as well as the size of the corresponding pixel 210) may increase according to the beam divergence $\Theta_L$. As an example, if the output beam 125 has a $\Theta_L$ of 2 mrad, then at a distance of 100 m from the lidar system 100, the output beam 125 may have a size or diameter of approximately 20 cm, and a corresponding pixel 210 may also have a corresponding size or diameter of approximately 20 cm. At a distance of 200 m from the lidar system 100, the output beam 125 and the corresponding pixel 210 may each have a diameter of approximately 40 cm.

Figure 5:
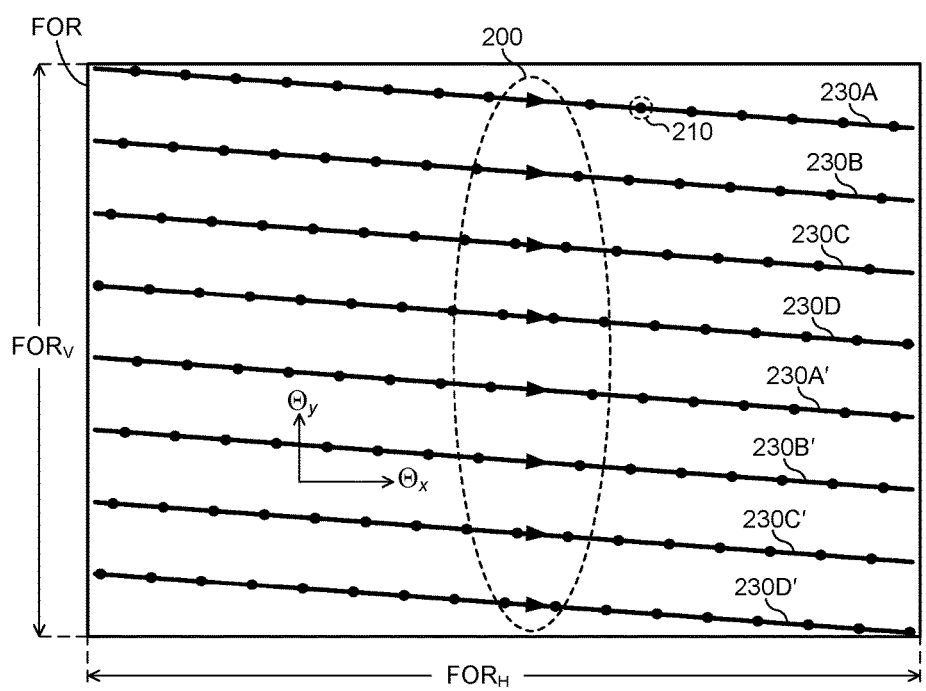
FIG. 5 illustrates an example unidirectional scan pattern that includes multiple pixels and multiple scan lines.

FIG. 5 illustrates an example unidirectional scan pattern 200 that includes multiple pixels 210 and multiple scan lines 230. In particular embodiments, scan pattern 200 may include any suitable number of scan lines 230 (e.g., approximately 1, 2, 5, 10, 20, 50, 100, 500, or 1,000 scan lines), and each scan line 230 of a scan pattern 200 may include any suitable number of pixels 210 (e.g., 1, 2, 5, 10, 20, 50, 100, 200, 500, 1,000, 2,000, or 5,000 pixels). The scan pattern 200 illustrated in FIG. 5 includes eight scan lines 230, and each scan line 230 includes approximately 16 pixels 210. In particular embodiments, a scan pattern 200 where the scan lines 230 are scanned in two directions (e.g., alternately scanning from right to left and then from left to right) may be referred to as a bidirectional scan pattern 200, and a scan pattern 200 where the scan lines 230 are scanned in the same direction may be referred to as a unidirectional scan pattern 200. The scan pattern 200 in FIG. 5 may be referred to as a unidirectional scan pattern 200 where each scan line 230 travels across the FOR in substantially the same direction (e.g., approximately from left to right as viewed from the lidar system 100). In particular embodiments, scan lines 230 of a unidirectional scan pattern 200 may be directed across a FOR in any suitable direction, such as for example, from left to right, from right to left, from top to bottom, from bottom to top, or at any suitable angle (e.g., at a 0°, 5°, 10°, 30°, or 45° angle) with respect to a horizontal or vertical axis. In particular embodiments, each scan line 230 in a unidirectional scan pattern 200 may be a separate line that is not directly connected to a previous or subsequent scan line 230.

In particular embodiments, a unidirectional scan pattern 200 may be produced by a scanner 120 that includes a polygon mirror (e.g., polygon mirror 301 of FIG. 3), where each scan line 230 is associated with a particular reflective surface 320 of the polygon mirror. As an example, reflective surface 320A of polygon mirror 301 in FIG. 3 may produce scan line 230A in FIG. 5. Similarly, as the polygon mirror 301 rotates, reflective surfaces 320B, 320C, and 320D may successively produce scan lines 230B, 230C, and 230D, respectively. Additionally, for a subsequent revolution of the polygon mirror 301, the scan lines 230A', 230B', 230C', and 230D' may be successively produced by reflections of the output beam 125 from reflective surfaces 320A, 320B, 320C, and 320D, respectively. In particular embodiments, N successive scan lines 230 of a unidirectional scan pattern 200 may correspond to one full revolution of a N-sided polygon mirror. As an example, the four scan lines 230A, 230B, 230C, and 230D in FIG. 5 may correspond to one full revolution of the four-sided polygon mirror 301 in FIG. 3. Additionally, a subsequent revolution of the polygon mirror 301 may produce the next four scan lines 230A', 230B', 230C', and 230D' in FIG. 5.

Figure 6:
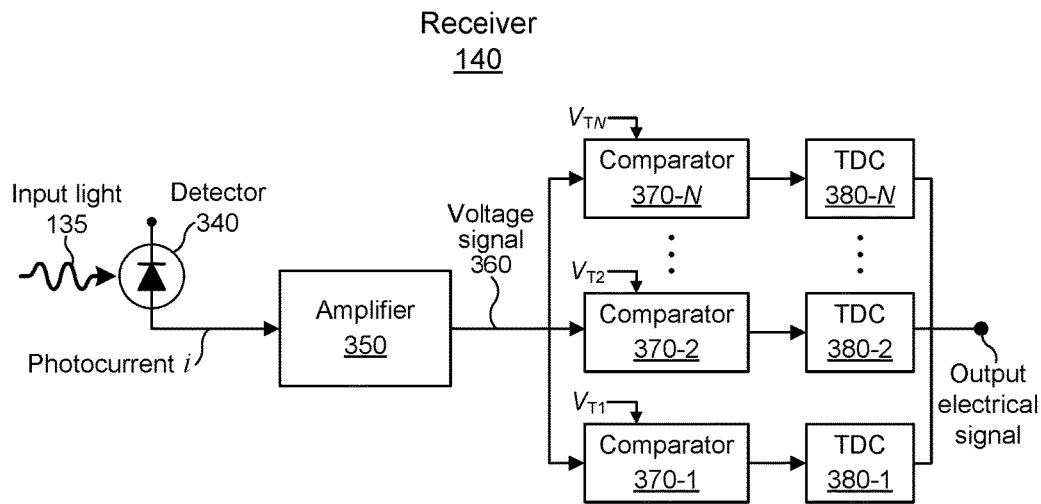
FIG. 6 illustrates an example receiver.

FIG. 6 illustrates an example receiver 140. In particular embodiments, a receiver 140 of a lidar system 100 may include one or more detectors 340, one or more amplifiers 350, or one or more comparators 370. Additionally, a receiver 140 may include one or more time-to-digital converters (TDCs) 380 associated with each of the comparators 370. A light source 110 of a lidar system 100 may emit an optical signal, and a receiver 140 may be configured to detect a received optical signal (e.g., input light 135) that includes a portion of the emitted optical signal that is scattered by a remote target 130.

The example receiver 140 illustrated in FIG. 6 includes a detector 340 configured to receive an input optical signal (input light 135) and produce a photocurrent i that corresponds to the received optical signal. The detector 340 may include an APD, PN photodiode, or PIN photodiode, and the photocurrent i produced by the detector 340 may be referred to as a photocurrent signal or an electrical-current signal. The detector 340 is coupled to an electronic amplifier 350 configured to receive the photocurrent i and produce a voltage signal 360 that corresponds to the received photocurrent. For example, the detector 340 may be an APD that produces a pulse of photocurrent in response to detecting an input optical pulse, and the voltage signal 360 may be an analog voltage pulse that corresponds to the pulse of photocurrent. The amplifier 350 may include a transimpedance amplifier configured to receive the photocurrent i and produce a voltage signal that corresponds to the photocurrent signal. Additionally, the amplifier 350 may include a voltage amplifier that amplifies the voltage signal or an electronic filter (e.g., a low-pass filter) that filters the photocurrent or the voltage signal.

In FIG. 6, the voltage signal 360 produced by the amplifier 350 is coupled to N comparators (comparators 370-1, 370-2, . . . , 370-N), and each comparator is supplied with a particular threshold or reference voltage ($V_{T1}$, $V_{T2}$, . . . , $V_{TN}$). For example, receiver 140 may include N=10 comparators, and the threshold voltages may be set to 10 values between 0 volts and 1 volt (e.g., $V_{T1}$=0.1 V, $V_{T2}$=0.2 V, and $V_{T10}$=1.0 V). A comparator may produce an edge signal (e.g., a rising or falling electrical edge) when the voltage signal 360 rises above or falls below a particular threshold voltage. For example, comparator 370-2 may produce a rising edge when the voltage signal 360 rises above the threshold voltage $V_{T2}$. Additionally or alternatively, comparator 370-2 may produce a falling edge when the voltage signal 360 falls below the threshold voltage $V_{T2}$.

The receiver 140 in FIG. 6 includes N time-to-digital converters (TDCs 380-1, 380-2, . . . , 380-N), and each comparator is coupled to one of the TDCs. Each TDC may act as a timer that produces an output electrical signal (e.g., a digital signal, a digital word, or a digital value) that represents a time when an edge signal is received from a comparator. For example, if the voltage signal 360 rises above the threshold voltage $V_{T1}$, then the comparator 370-1 may produce an edge signal that is supplied to the input of TDC 380-1, and the TDC 380-1 may produce a digital value corresponding to a time when the edge signal was received by TDC 380-1. The digital time value may be referenced to the time when a pulse of light is emitted, and the digital time value may correspond to a round-trip time for the pulse of light to travel to a target 130 and back to the lidar system 100.

The output electrical signal in FIG. 6 may include digital values from each of the TDCs that receive an edge signal from a comparator, and each digital value may represent a time interval between the emission of an optical pulse by a light source 110 and the receipt of an edge signal from a comparator. For example, a light source 110 may emit a pulse of light that is scattered by a target 130, and a receiver 140 may receive a portion of the scattered pulse of light as an input optical signal 135. The TDCs in the receiver 140 may be reset to zero counts, and when the light source 110 emits the pulse of light, the TDCs may begin to accumulate counts that correspond to elapsed time (e.g., the TDCs may count in terms of clock cycles or some fraction of clock cycles). When TDC 380-1 receives an edge signal from comparator 370-1, the TDC 380-1 may stop accumulating time counts and may produce a digital signal that represents the time interval between emission of the optical pulse and receipt of the edge signal. For example, the digital signal may include a digital value that corresponds to the number of clock cycles that elapsed between emission of the optical pulse and receipt of the edge signal. The output electrical signal from the TDCs may correspond to the input light signal 135 detected by the detector 340 and may include the digital values from each of the TDCs that receive an edge signal from a comparator. The output electrical signal may be sent to a controller 150, and the controller may determine the distance to the target 130 based at least in part on the output electrical signal. Additionally or alternatively, the controller 150 may determine an optical characteristic of the input light signal 135 based at least in part on the output electrical signal received from the TDCs.

In particular embodiments, a receiver 140 of a lidar system 100 may include one or more analog-to-digital converters (ADCs). As an example, instead of including multiple comparators and TDCs, a receiver 140 may include an ADC that receives a voltage signal 360 from amplifier 350 and produces a digitized output electrical signal corresponding to the voltage signal 360. Although this disclosure describes or illustrates example receivers 140 that include one or more comparators 370 and one or more TDCs 380, a receiver 140 may additionally or alternatively include one or more ADCs. As an example, in FIG. 6, instead of the N comparators 370 and N TDCs 380, the receiver 140 may include an ADC configured to receive the voltage signal 360 and provide an output electrical signal that includes digitized values that correspond to the voltage signal 360.

Figure 7:
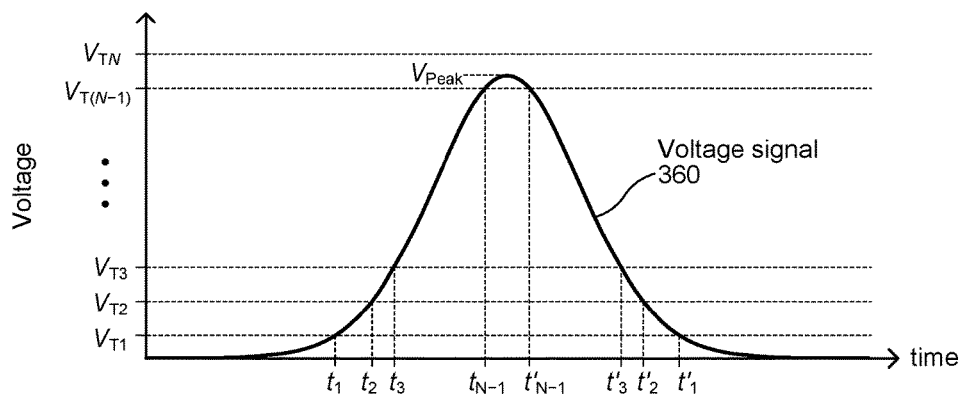
FIG. 7 illustrates an example voltage signal corresponding to a received optical signal.

FIG. 7 illustrates an example voltage signal 360 corresponding to a received optical signal 135. The voltage signal 360 illustrated in FIG. 7 may be an analog signal produced by an electronic amplifier 350 and may correspond to a pulse of light detected by the receiver 140 in FIG. 6. The voltage levels on the y-axis correspond to the threshold voltages $V_{T1}, V_{T2}, \ldots, V_{TN}$ of the respective comparators 370-1, 370-2, ..., 370-N. The time values $t_1, t_2, t_3, \ldots, t_{N-1}$ correspond to times when the voltage signal 360 exceeds the corresponding threshold voltages, and the time values $t'_1, t'_2, \ldots, t'_{N-1}$ correspond to times when the voltage signal 360 falls below the corresponding threshold voltages. For example, at time $t_1$ when the voltage signal 360 exceeds the threshold voltage $V_{T1}$, comparator 370-1 may produce an edge signal, and TDC 380-1 may output a digital value corresponding to the time $t_1$. Additionally, the TDC 380-1 may output a digital value corresponding to the time $t'_1$ when the voltage signal 360 falls below the threshold voltage $V_{T1}$. Alternatively, the receiver 140 may include an additional TDC (not illustrated in FIG. 6) configured to produce a digital value corresponding to time $t'_1$ when the voltage signal 360 falls below the threshold voltage $V_{T1}$. The output electrical signal from receiver 140 may include one or more digital values that correspond to one or more of the time values $t_1, t_2, t_3, \ldots, t_{N-1}$ and $t'_1, t'_2, t'_3, \ldots, t'_{N-1}$. Additionally, the output electrical signal may also include one or more values corresponding to the threshold voltages associated with the time values. Since the voltage signal 360 in FIG. 7 does not exceed the threshold voltage $V_{TN}$, the corresponding comparator 370-N may not produce an edge signal. As a result, TDC 380-N may not produce a time value, or TDC 380-N may produce an output electrical signal indicating that no edge signal was received.

In particular embodiments, an output electrical signal produced by a receiver 140 may correspond to or may be used to determine an optical characteristic of a received optical signal detected by the receiver 140. An optical characteristic may refer to a peak optical power of a received optical signal, an average optical power of a received optical signal, a peak optical intensity of a received optical signal, an energy of a received optical signal, a duration of a received optical signal, or a shape of a received optical signal (e.g., a pulse shape). For example, an optical pulse detected by receiver 140 may have one or more of the following optical characteristics: a peak optical power of between 1 nanowatt and 10 watts; a pulse energy of between 1 attojoule and 10 nanojoules; and a pulse duration of between 0.1 ns and 50 ns. In particular embodiments, an optical characteristic of a received optical signal may be determined from an output electrical signal provided by one or more TDCs 380 of a receiver 140 (e.g., as illustrated in FIG. 6), or an optical characteristic may be determined from an output electrical signal provided by one or more ADCs of a receiver 140.

In particular embodiments, a peak optical power or peak optical intensity of a received optical signal may be determined from one or more values of an output electrical signal provided by a receiver 140. As an example, a controller 150 may determine the peak optical power of an input optical pulse 135 based on a peak voltage ($V_{peak}$) of the voltage signal 360. The controller 150 may use a formula or lookup table that correlates a peak voltage of the voltage signal 360 with a peak optical power of a received optical signal. In the example of FIG. 7, the peak optical power of an input optical pulse may be determined from the threshold voltage $V_{T(N-1)}$, which is approximately equal to the peak voltage $V_{peak}$ of the voltage signal 360 (e.g., the threshold voltage $V_{T(N-1)}$ may be associated with an input optical pulse 135 having a peak optical power of 10 mW). As another example, a controller 150 may apply a curve-fit or interpolation operation to the values of an output electrical signal to determine the peak voltage of the voltage signal 360, and then this peak voltage may be used to determine the peak optical power of an input optical pulse.

In particular embodiments, an energy of a received optical signal may be determined from one or more values of an output electrical signal. For example, a controller 150 may perform a summation of digital values that correspond to a voltage signal 360 to determine an area under the voltage-signal curve, and the area under the voltage-signal curve may be correlated with a pulse energy of an input optical pulse 135. As an example, the approximate area under the voltage-signal curve in FIG. 7 may be determined by sub-dividing the curve into M subsections (where M is approximately the number of time values included in the output electrical signal) and adding up the areas of each of the subsections (e.g., using a numerical integration technique such as a Riemann sum, trapezoidal rule, or Simpson's rule). For example, the approximate area A under the voltage-signal curve 360 in FIG. 7 may be determined from a Riemann sum using the expression $A = \sum_{k=1}^{M} V_{Tk} \times \Delta t_k$, where $V_{Tk}$ is a threshold voltage associated with the time value $t_k$, and $\Delta t_k$ is a width of the subsection associated with time value $t_k$. In the example of FIG. 7, the voltage signal 360 may correspond to a received optical pulse with a pulse energy of 1 picojoule.

In particular embodiments, a duration of a received optical signal may be determined from a duration or width of a corresponding voltage signal 360. For example, the difference between two time values of an output electrical signal may be used to determine a duration of an optical pulse. In the example of FIG. 7, the duration of the optical signal corresponding to voltage signal 360 may be determined from the difference ($t'_3-t_3$), which may correspond to a received optical pulse with a pulse duration of 2 nanoseconds. One or more of the approaches for determining an optical characteristic of a received optical signal as described above may be implemented using a receiver 140 that includes multiple comparators 370 and TDCs 380 (as illustrated in FIG. 6) or using a receiver 140 that includes one or more ADCs.

In particular embodiments, one or more output electrical signals produced by one or more receivers 140 may be used to compare optical characteristics of two or more optical pulses detected by the receivers. For example, a receiver 140 may include two detectors 340 configured to detect two separate optical pulses (e.g., each detector may detect a different portion of a received optical pulse). An optical characteristic of the two optical pulses may be compared based on one or more output electrical signals associated with the two pulses and produced by the receiver 140. For example, a controller 150 may determine the peak voltages of two voltage signals 360 associated with the two optical pulses. The voltage signal 360 with the higher peak voltage may correspond to the optical pulse having a higher peak optical power or peak optical intensity. Rather than determining values for the optical power or intensity of two optical pulses (e.g., by using a formula or lookup table), a controller 150 may compare the peak voltage values of one or more output electrical signals to determine which pulse has the higher peak optical power or intensity. As another example, a controller 150 may compare the areas under two voltage-signal curves to compare the energy of the two corresponding optical pulses. The voltage-signal curve with the larger area may correspond to the optical pulse having a larger pulse energy. Rather than determining values for the pulse energy of two optical pulses, a controller 150 may compare the area of two voltage-signal curves to determine which pulse has the higher pulse energy.

Figure 8:
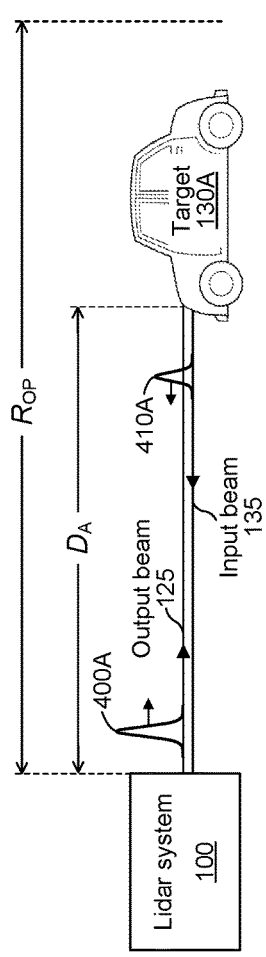
FIG. 8 illustrates an example lidar system and a target that is located within an operating range of the lidar system.

FIG. 8 illustrates an example lidar system 100 and a target 130A that is located within an operating range ($R_{OP}$) of the lidar system 100. In particular embodiments, a lidar system 100 may include a light source 110 configured to emit multiple pulses of light that are directed into a field of regard of the lidar system 100. The lidar system 100 in FIG. 8 emits an output beam 125 that includes an optical pulse 400A. The optical pulse 400A propagates to a target 130A located a distance $D_A$ from the lidar system, where $D_A$ is less than the operating range $R_{OP}$. The optical pulse 400A is scattered by the target 130A, and a portion of the scattered light propagates back to the lidar system 100 as input beam 135. The input beam 135 includes optical pulse 410A which includes a portion of the optical pulse 400A emitted by the lidar system 100 and scattered by the target 130A. The lidar system 100 may include a receiver 140 that detects the received optical pulse 410A. Additionally, the lidar system 100 may include a controller 150 that determines the distance $D_A$ to the target 130A based on the time interval between emission of the optical pulse 400A and detection of the optical pulse 410A. In particular embodiments, an output beam 125 may include or may be referred to as an optical signal, and an input beam 135 may include or may be referred to as a received optical signal.

Figure 9:
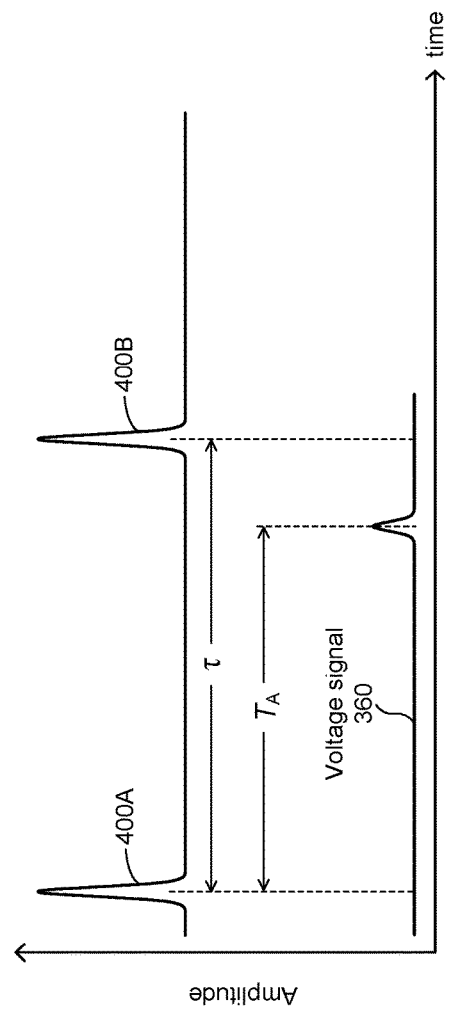
FIG. 9 illustrates optical pulses emitted by the lidar system in FIG. 8 and a voltage signal corresponding to a received optical signal.

FIG. 9 illustrates optical pulses 400A and 400B emitted by the lidar system 100 in FIG. 8 and a voltage signal 360 corresponding to a received optical signal. In particular embodiments, a lidar system 100 may be configured to emit multiple pulses of light, where each pulse of light is emitted a particular time interval after the previously emitted pulse of light. The lidar system 100 in FIG. 8 emits optical pulse 400B a time interval τ after optical pulse 400A is emitted. For example, the time interval τ (which may be referred to as a pulse period) between two successive optical pulses may be approximately 20 ns, 50 ns, 100 ns, 500 ns, 1 µs, 2 µs, 5 µs, 10 µs, or any other suitable interval of time. The received optical signal that includes the scattered light from optical pulse 400A is detected by a receiver 140 of lidar system 100, and the receiver 140 may produce the corresponding voltage signal 360 in FIG. 9. The voltage signal 360 includes an electrical pulse that is produced a time interval $T_A$ after the emission of the optical pulse 400A and that corresponds to receipt of the scattered optical pulse 410A. A lidar system 100 may determine the distance $D_A$ to the target 130A based on the time $T_A$ between emission of the optical pulse 400A and detection of the optical pulse 410A. The distance $D_A$ may be determined from the expression $D_A = c \cdot T_A/2$. For example, if $T_A$ is 1 µs, then the distance $D_A$ to the target 130A is approximately 150 m. Additionally, the operating range $R_{OP}$ in FIG. 8, which is greater than $D_A$, may be approximately 200 m.

Figure 10:
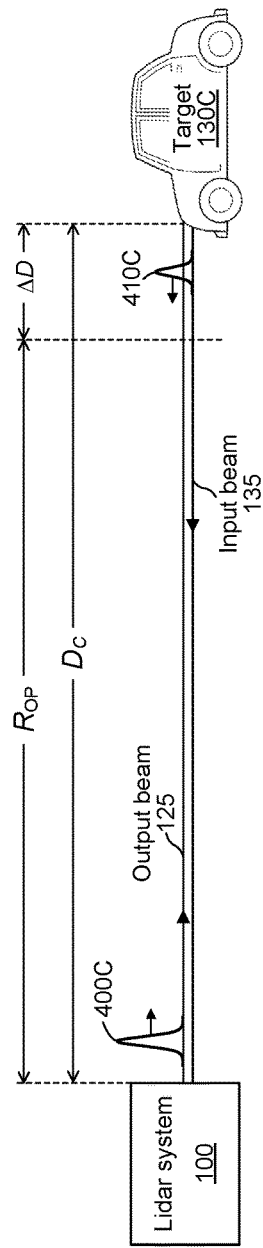
FIG. 10 illustrates an example lidar system and a target that is located beyond an operating range of the lidar system.

FIG. 10 illustrates an example lidar system 100 and a target 130C that is located beyond an operating range ($R_{OP}$) of the lidar system 100. The lidar system 100 in FIG. 10 emits an output beam 125 that includes an optical pulse 400C. The optical pulse 400C propagates to a target 130C located a distance $D_C$ from the lidar system, where $D_C$ is greater than the operating range $R_{OP}$. The optical pulse 400C is scattered by the target 130C, and a portion of the scattered light propagates back to the lidar system 100 as input beam 135. The input beam 135 includes optical pulse 410C which includes a portion of the optical pulse 400C emitted by the lidar system 100 and scattered by the target 130C. The lidar system 100 may include a receiver 140 that detects the received optical pulse 410C.

Figure 11:
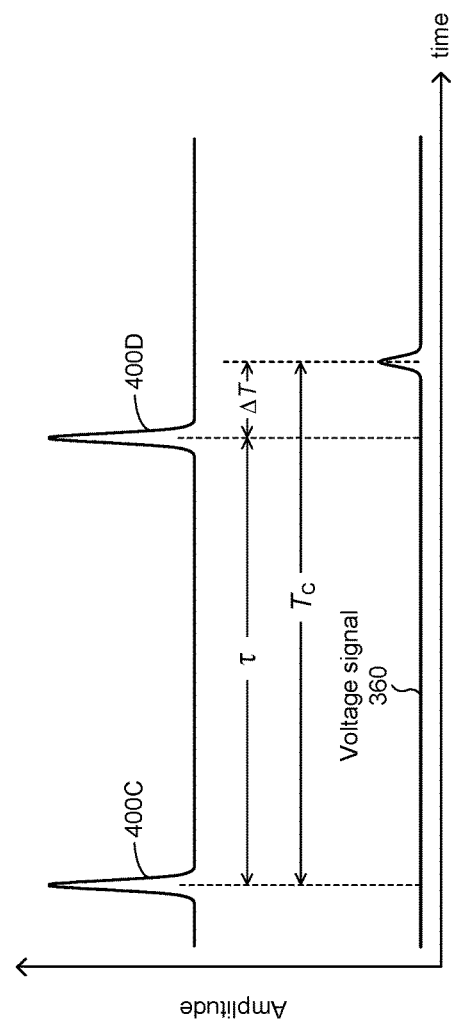
FIG. 11 illustrates optical pulses emitted by the lidar system in FIG. 10 and a voltage signal corresponding to a received optical signal.

FIG. 11 illustrates optical pulses 400C and 400D emitted by the lidar system 100 in FIG. 10 and a voltage signal 360 corresponding to a received optical signal. The lidar system 100 in FIG. 10 may emit optical pulse 400D a time interval τ after optical pulse 400C is emitted. The received optical signal that includes the scattered light from optical pulse 400C is detected by a receiver 140 of lidar system 100, which produces the corresponding voltage signal 360 in FIG. 11. The voltage signal 360 includes an electrical pulse that is produced a time interval $T_C$ after the emission of the optical pulse 400C and that corresponds to receipt of the scattered optical pulse 410C. The receipt of the scattered optical pulse 410C, as indicated by the electrical pulse in the voltage signal 360, occurs a time ΔT after the optical pulse 400D is emitted.

In particular embodiments, a range-ambiguity event may occur when a distance to a target 130 is greater than an operating range $R_{OP}$ of a lidar system 100. A range-ambiguity event (which may be referred to as range ambiguity or range wrap) refers to a situation where a lidar system 100 may determine an incorrect distance to a target 130 due to an ambiguity as to which emitted optical pulse a received optical pulse is associated with. In FIGS. 8 and 9, the distance $D_A$ to the target 130A may be determined without range ambiguity since $D_A$ is less than the operating range $R_{OP}$. Because the receipt of the optical pulse 410A, as indicated by the electrical pulse in the voltage signal 360 in FIG. 9, occurs prior to the emission of the subsequent optical pulse 400B, the lidar system 100 may not experience range ambiguity. That is, the electrical pulse in FIG. 9 may be unambiguously associated with the emitted optical pulse 400A, and as a result, the distance $D_A$ to the target 130A may be determined without ambiguity.

In FIGS. 10 and 11, a range-ambiguity event may result from the target 130C being located beyond $R_{OP}$, the operating range of the lidar system 100. In FIG. 10, the correct distance to the target 130C may be determined by associating the received optical pulse 410C (as indicated by the pulse in voltage signal 360 in FIG. 11) with the emitted optical pulse 400C. For example, the correct distance to the target 130C may be determined from the expression $D_C = c \cdot T_C/2$ or $D_C = R_{OP} + c \cdot \Delta T/2$. However, if the received optical pulse 410C is incorrectly associated with the subsequently emitted optical pulse 400D, then the lidar system 100 may determine an incorrect distance to the target 130C that is closer than the actual distance $D_C$. The optical pulse 410C scattered by the target 130C is received by the lidar system 100 a time $\Delta T$ after the optical pulse 400D is emitted. As a result, the lidar system may incorrectly associate the received optical pulse 410C (which corresponds to the pulse in voltage signal 360) with the subsequently emitted optical pulse 400D, and the distance from the lidar system 100 to the target 130C may be incorrectly determined to be $\Delta D = c \cdot \Delta T/2$. The correct distance to the target ($D_C$) is larger than the incorrect distance ($\Delta D$) by an amount approximately equal to the operating distance ($R_{OP}$), so that $D_C = \Delta D + R_{OP}$. As an example, if the operating distance $R_{OP}$ is 200 m and the correct distance to the target $D_C$ is 250 m, then, due to range ambiguity, the distance to the target may incorrectly be determined to be $\Delta D = 50$ m.

In particular embodiments, an operating range $R_{OP}$ of a lidar system 100 may correspond to a distance over which the lidar system 100 is configured to detect scattered light from a target 130 and determine the distance to the target. Additionally, an operating range $R_{OP}$ may correspond to a distance over which a lidar system 100 may determine the distance to a target 130 without range ambiguity. The operating range $R_{OP}$ of a lidar system 100 may be approximately 25 m, 50 m, 100 m, 150 m, 200 m, 250 m, 500 m, 1000 m, or any other suitable distance. For a target 130 located a distance less than $R_{OP}$, a lidar system 100 may determine the distance to the target without range ambiguity. If a target 130 is located a distance greater than $R_{OP}$, a lidar system 100 may experience range ambiguity and may not determine the correct distance to the target. In FIG. 8, the target 130A is located a distance $D_A$ from the lidar system 100, where $D_A$ is less than $R_{OP}$, and the lidar system 100 may determine the distance $D_A$ without range ambiguity. For example, the operating range may be 200 m, and the distance to the target 130A may be determined to be 150 m. In FIG. 10, the target 130C is located a distance $D_C$ from the lidar system 100, where $D_C$ is greater than $R_{OP}$. For example, the operating range may be 200 m, and the distance to the target 130C may be 250 m. In the event of range ambiguity, the lidar system may determine an incorrect distance to the target 130C (e.g., an incorrect distance of 50 m).

In particular embodiments, an operating range $R_{OP}$ of a lidar system 100 may be related to a time $\tau$ between successive pulses by the expression $R_{OP} = c \cdot \tau/2$. For example, if the time between successive pulses is 1.33 µs, then the operating range may be approximately 200 m. If a target 130 is located a distance less than $R_{OP}$, then scattered light from the target may be received by a lidar system 100 before the time $\tau$ has elapsed and before a subsequent pulse is emitted. As a result, the lidar system 100 may determine the distance to the target 130 without range ambiguity. If a target 130 is located beyond the operating range $R_{OP}$, then scattered light from the target 130 may be received after a subsequent pulse is emitted (e.g., after a time interval T has elapsed since the previous pulse was emitted). In FIGS. 10 and 11, the lidar system 100 may experience range ambiguity and may not be able to determine whether the received pulse 410C is associated with the previously emitted pulse 400C or the subsequent pulse 400D. For example, pulse 400D may be emitted 1.33 µs after pulse 400C is emitted (corresponding to a 200-m operating range), and the scattered pulse 410C may be received 0.34 µs after pulse 400D is emitted (corresponding to a 250-m distance to target 130C). As a result of range ambiguity, the lidar system 100 may be unable to determine the correct distance to the target 130.

In particular embodiments, a lidar system 100 may be a pulsed lidar system configured to emit multiple optical pulses having one or more of the following optical characteristics: a pulse energy between 0.1 µJ and 100 µJ; a pulse repetition frequency between 80 kHz and 10 MHz; and a pulse duration between 0.1 ns and 50 ns. As an example, one or more of the lidar systems 100 illustrated in FIGS. 1, 3, 8, and 10 may include a light source 110 configured to emit pulses of light having a pulse energy of approximately 0.5-10, a pulse repetition frequency of approximately 400-800 kHz, and a pulse duration of approximately 2-5 ns. In particular embodiments, a lidar system 100 may be a FMCW lidar system configured to emit multiple optical signals that each include frequency-modulated light. One or more of the lidar systems 100 illustrated in FIGS. 1, 3, 8, and 10 may be configured to operate as a FMCW lidar system.

Figure 12:
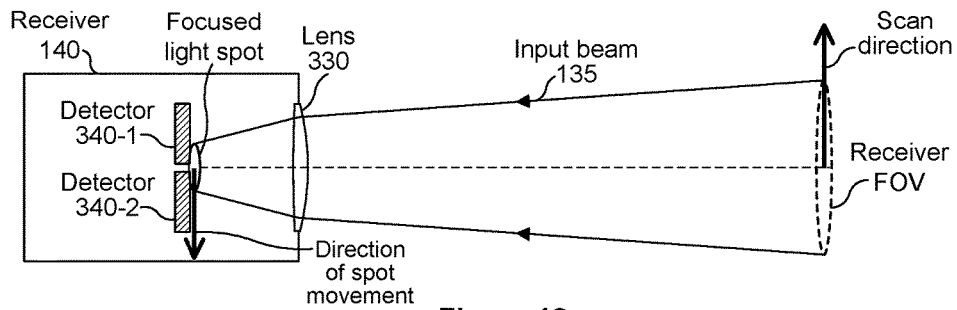
FIG. 12 illustrates an example receiver with two detectors.

FIG. 12 illustrates an example receiver 140 with two detectors 340-1 and 340-2. In particular embodiments, a receiver 140 may include two or more detectors 340. Detector 340-1 and detector 340-2 in FIG. 12 may each include any suitable type of detector, such as for example, an avalanche photodiode (APD) or a PIN photodiode. For example, detectors 340-1 and 340-2 may each be an InGaAs APD configured to detect light at one or more operating wavelengths of a lidar system 100 between 1200 nm and 1600 nm. The two detectors 340-1 and 340-2 may be separate detector components that are contained in separate packages or chips. As an example detector 340-1 may be part of a first detector chip and detector 340-2 may be part of a second detector chip that is separate from the first detector chip. Alternatively, the two detectors 340-1 and 340-2 may be contained in the same package or integrated into the same chip.

In particular embodiments, a lidar system 100 may include a scanner 120 configured to (1) scan an output beam 125 in a scan direction across a field of regard of the lidar system 100 and (2) scan a field of view of a receiver 140 in the same scan direction across the field of regard of the lidar system 100. The output beam 125 may include optical signals (e.g., pulses of light) emitted by a light source 110 of the lidar system, and the receiver 140 may detect light from the output beam 125 that is scattered toward the lidar system 100 from the direction of the receiver FOV. In FIG. 12, the receiver FOV is scanned across the field of regard in the scan direction, and light that propagates back to the receiver 140 from the receiver FOV is focused by the lens 330 onto the detectors 340-1 and 340-2. The focused light forms a spot or image that moves (in the direction of spot movement) across the detectors 340-1 and 340-2 as the receiver FOV is scanned.

In particular embodiments, a light source 110 may emit an optical pulse, and a portion of the optical pulse scattered by a target 130 may be directed to a receiver 140 and focused to a spot onto detectors 340-1 and 340-2. The received optical pulse may be directed to the detectors 340-1 and 340-2 so that a first portion of the received optical pulse is detected by detector 340-1 and a second portion of the received optical pulse is detected by detector 340-2. The first and second portions may each have an amount of optical power or energy that depends at least in part on the distance from the lidar system 100 to the target 130. For example, for a nearby target 130, the first portion of the received optical pulse may have a larger energy or peak power than the second portion. Additionally, for a target 130 located beyond an operating range of the lidar system 100, the first portion of the received optical pulse may have a lower energy or peak power than the second portion.

Figure 13:
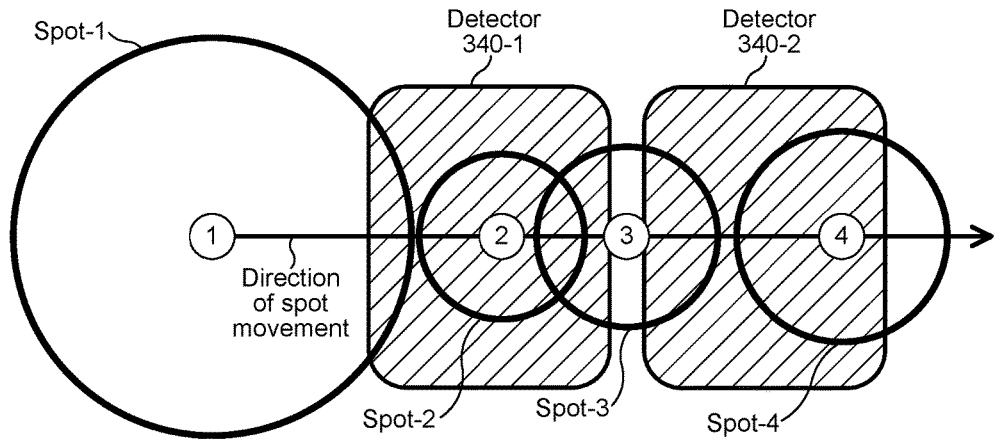
FIG. 13 illustrates four example spots of received light superimposed onto two example detectors.

FIG. 13 illustrates four example spots of received light superimposed onto two example detectors 340-1 and 340-2. The two detectors 340-1 and 340-2 may be part of a receiver 140 similar to that illustrated in FIG. 12, and the four beam spots (spot-1, spot-2, spot-3, and spot-4) are located at four different positions relative to the two detectors 340-1 and 340-2. The four spots represent received light scattered from four targets 130 located at different distances from a lidar system 100. The size or location of each of the spots may depend on how far the corresponding target 130 is located from the lidar system 100. The spots may move across the detectors 340-1 and 340-2 in the direction of spot movement (e.g., from left to right in FIG. 13) as the distance to the corresponding target 130 increases. For example, spot-1 may represent a focused spot of scattered light received from a relatively close target 130 (e.g., a target located a distance of less than 50 m from the lidar system 100), and spot-4 may represent a spot of scattered light received from a relatively distant target 130 (e.g., a target located beyond an operating range of the lidar system). Spot-2 and spot-3 may each represent scattered light received from a target 130 located an intermediate distance from the lidar system 100 (e.g., a distance between 50 m and the operating range).

The size of each of the spots may correspond to how tightly the received light is focused onto the detectors, and the focusing of the received light may depend on the distance to the corresponding target 130. For example, light from nearby targets may be defocused, light from intermediate-distance targets may be well focused, and light from targets located beyond the operating range may be defocused. Spot-1, which may represent light received from a nearby target, is defocused and has a relatively large spot size, and spot-2, which may represent light received from an intermediate-distance target, is focused to a relatively small spot size. The diameter of each spot in FIG. 13 may correspond to the beam diameter of the focused input beam 135 at the detectors. For example, the spot diameter may correspond to a 1/e diameter, a $1/e^2$ diameter, or a full width at half maximum (FWHM) diameter of the beam at the detectors. As another example, spot-1 may have a $1/e^2$ diameter of approximately 100 μm, and spot-2 may have a $1/e^2$ diameter of approximately 40 μm.

The amount of photocurrent produced by each of the detectors 340-1 and 340-2 in response to receiving light associated with a particular spot may depend at least in part on the size of the spot and its location on the detectors. For example, approximately 10% of spot-1 may overlap detector 340-1, and the detector 340-1 may produce a photocurrent signal that corresponds to approximately 10% of the power or energy of the light associated with spot-1. The light associated with a particular spot may extend beyond the circular boundary of the spot illustrated in FIG. 13. For example, the light associated with spot-1 may have an approximate Gaussian distribution, and a portion of the power or energy of the light represented by spot-1 may extend outside the spot-1 boundary to detector 340-2. As an example, approximately 0.01% of the light associated with spot-1 may overlap detector 340-2, and detector 340-2 may produce a photocurrent signal that corresponds to approximately 0.01% of the power or energy of the light associated with spot-1 (e.g., the signal from detector 340-2 may be 1,000 times smaller than the signal from detector 340-1). As another example, approximately 95% of the light associated with spot-2 may overlap detector 340-1, and approximately 1% of the light associated with spot-2 may overlap detector 340-2 (e.g., the signal from detector 340-2 may be approximately 95 times smaller than the signal from detector 340-1). As another example, spot-3 may be approximately centered with respect to the two detectors 340-1 and 340-2, and each detector may produce a photocurrent having approximately the same amplitude. As another example, approximately 70% of the light associated with spot-4 may overlap detector 340-2, and approximately 1% of the light associated with spot-4 may overlap detector 340-1 (e.g., the signal from detector 340-2 may be approximately 70 times larger than the signal from detector 340-1).

In particular embodiments, one or more detectors 340 of a receiver 140 may be arranged along a line corresponding to a scan direction of a field of view of the receiver 140. In FIG. 12, the direction of the spot movement across the detectors 340-1 and 340-2 corresponds to the scan direction of the receiver FOV, albeit in the opposite direction. As the receiver FOV scans in an upward scan direction, the focused light spot moves across the detectors 340-1 and 340-2 in a downward direction that is parallel to the scan direction. In FIG. 13, the focused light spots move across the detectors 340-1 and 340-2 from left to right, and the detectors 340-1 and 340-2 are oriented side-by-side along the line corresponding to the direction of spot movement. The line corresponding to the direction of spot movement may be approximately parallel to the line corresponding to the scan direction of the receiver FOV. Additionally, the scan direction of the receiver FOV imaged onto the detectors 340-1 and 340-2 may correspond to the direction of spot movement across the detectors.

Figure 14:
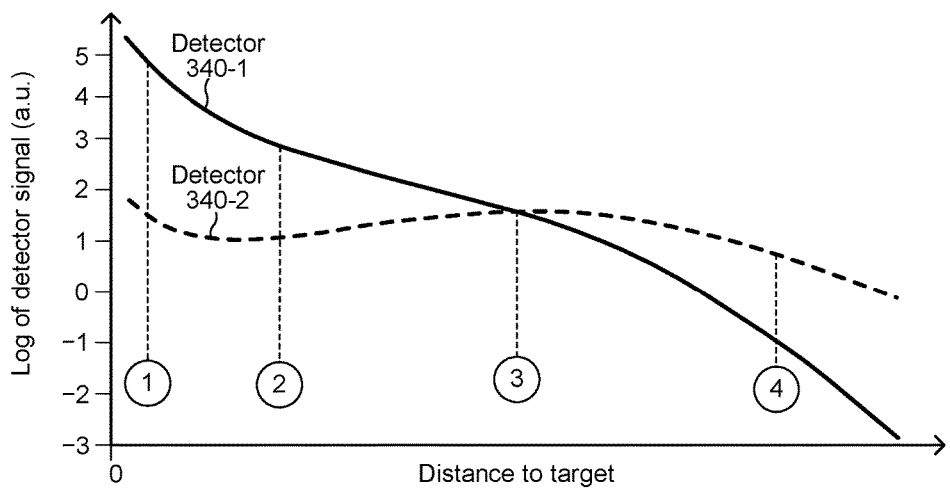
FIG. 14 illustrates example signals produced by the detectors of FIG. 13 as a function of distance to a target.

FIG. 14 illustrates example signals produced by the detectors of FIG. 13 as a function of distance to a target 130. The curves in FIG. 14 may correspond to the amplitude of a signal (e.g., photocurrent) produced by each detector in response to an input light signal 135, where the input light signal 135 includes light from an output light signal 125 that is scattered by a target 130 located a particular distance from the lidar system 100. The signal produced by detector 340-1 (represented by a solid line) is relatively large for nearby targets and then drops as the distance to the target increases. The signal produced by detector 340-2 (represented by a dashed line) varies for near and intermediate distances and then drops as the distance increases. In FIG. 14, the values on the y-axis may correspond to the optical characteristics of the optical signals detected by each of the detectors 340-1 and 340-2. For example, at spot-3, the two detectors may detect optical signals that have approximately the same optical power or energy. At spot-2, the portion of the optical signal detected by detector 340-1 may have approximately 100 times more optical power or energy than the portion of the optical signal detected by detector 340-2. At spot-4, the portion of the optical signal detected by detector 340-1 may have approximately 100 times less optical power or energy than the portion of the optical signal detected by detector 340-2.

The circled numbers 1, 2, 3, and 4 in FIG. 14 represent the corresponding beam spots in FIG. 13. Spot-1 may correspond to light scattered from a target 130 located relatively close to the lidar system (e.g., a distance of 20 m). Spot-1 has a relatively small overlap with detector 340-1 (e.g., an overlap of approximately 10%), but since the target 130 is relatively close, there is a significant amount of scattered light from the target 130 that reaches detector 340-1. As a result, the photocurrent produced by detector 340-1 is relatively large, as illustrated in FIG. 14 by the relatively large signal produced by detector 340-1 from the light of spot-1. Spot-1 has a very small overlap with detector 340-2, and in FIG. 14 the photocurrent produced by detector 340-2 from spot-1 is approximately 1,000 times smaller than the photocurrent produced by detector 340-1. Spot-2 may correspond to light scattered from a target 130 located an intermediate distance from the lidar system (e.g., a distance of 65 m). In FIG. 14, the photocurrent produced by detector 340-2 from spot-2 is approximately 100 times smaller than the photocurrent produced by detector 340-1. Spot-3 represents a cross-over point where the photocurrents produced by the two detectors 340-1 and 340-2 are approximately equal. Spot-3 may correspond to light scattered from a target 130 located at an intermediate distance (e.g., 150 m) or at or near an operating range (e.g., 200 m). For targets located closer than the distance corresponding to spot-3, the photocurrent produced by detector 340-1 is greater than the photocurrent produced by detector 340-2. For targets located beyond the distance corresponding to spot-3, the detector 340-1 photocurrent is less than the detector 340-2 photocurrent. Spot-4 may correspond to light scattered from a target 130 located at or beyond an operating range. For example, a lidar system 100 may have an operating range of 200 m, and spot-4 may correspond to a target 130 located 250 m from the lidar system 100. The photocurrent produced by detector 340-2 from spot-4 is approximately 100 times greater than the photocurrent produced by detector 340-1.

In particular embodiments, a receiver 140 may include a near-range detector and a far-range detector. For input light 135 scattered from a target located a distance less than a near-range distance of a lidar system 100, the near-range detector may produce a larger response than the far-range detector. Similarly, for light scattered from a target located beyond the near-range distance, the far-range detector may produce a larger response than the near-range detector. In the example of FIGS. 12 and 13, detector 340-1 may be referred to as a near-range detector, and detector 340-2 may be referred to as a far-range detector. Additionally, the cross-over point at spot-3 in FIG. 14 may correspond to a target 130 located a distance from the lidar system 100 approximately equal to the near-range distance. For a target 130 located closer than the near-range distance, detector 340-1 (e.g., the near-range detector) may produce a larger response than detector 340-2 (e.g., the far-range detector). Similarly, for a target 130 located beyond the near-range distance, detector 340-2 may produce a larger response than detector 340-1. The near-range distance may be a distance of approximately 50 m, 100 m, 150 m, 200 m, 250 m, 500 m, or any other suitable distance.

In particular embodiments, a near-range distance may be approximately equal to an operating range of a lidar system 100. For example, a lidar system 100 may have a 200-m operating range, and the near-range distance (corresponding to the cross-over point between the detector 340-1 and 340-2 signals) may be approximately equal to 200 m. In particular embodiments, a near-range distance may be greater than or less than an operating range of a lidar system 100. For example, a lidar system 100 may have a 200-m operating range, and the near-range distance may be approximately 150 m so that the near-range distance is less than the operating range.

In particular embodiments, a variation in detector response with distance to a target 130 may be provided, at least in part, by a scanner 120 of a lidar system 100. For example, a scanner 120 may scan the receiver FOV so that the size and location of the spot of received light on the detectors 340-1 and 340-2 changes with distance to the target 130. Additionally, the detectors 340-1 and 340-2 may be positioned so that the spot of received light moves from detector 340-1 to detector 340-2 as the distance to the target 130 increases. For targets located within a near-range distance, the received spot of light may be directed substantially toward or near detector 340-1 so that detector 340-1 produces a larger response than detector 340-2. For targets located beyond the near-range distance, the received spot of light may be directed substantially toward or near detector 340-2 so that detector 340-2 produces a larger response than detector 340-1.

Figure 15:
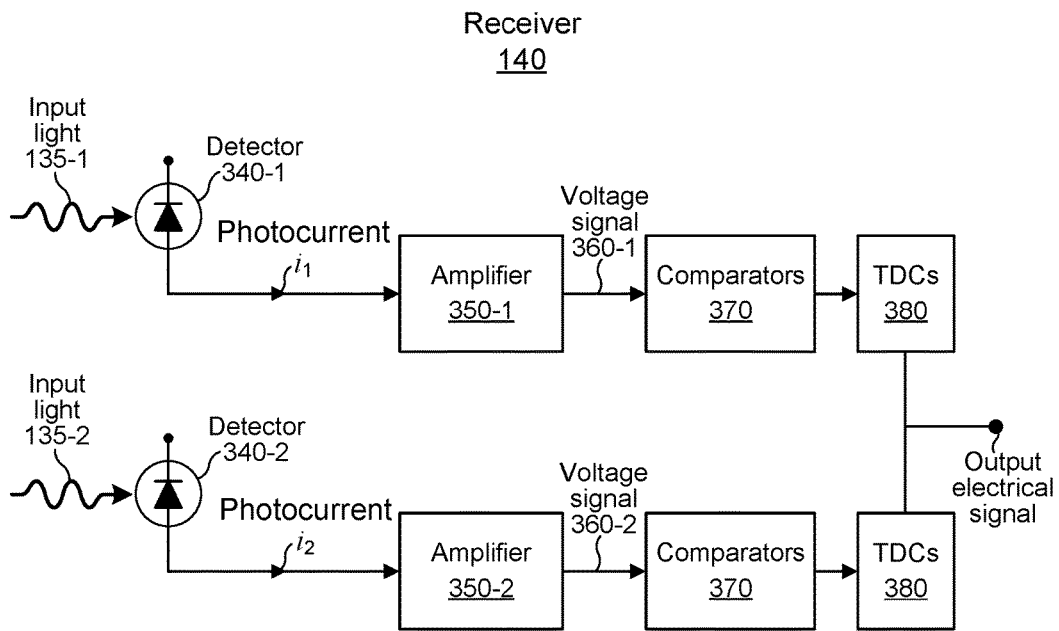
FIG. 15 illustrates an example receiver that includes two detectors and two amplifiers.

FIG. 15 illustrates an example receiver 140 that includes two detectors (340-1 and 340-2) and two amplifiers (350-1 and 350-2). In particular embodiments, a receiver 140 may include a first detector 340-1 configured to detect a first portion of a received optical signal and a second detector 340-2 configured to detect a second portion of the received optical signal. In FIG. 15, the light from an input beam may be incident on the detectors 340-1 and 340-2 of receiver 140 so that a first portion 135-1 of the input beam is received by detector 340-1 and a second portion 135-2 of the input beam is received by detector 340-2. The first portion 135-1 may be referred to as input light 135-1, and the second portion 135-2 may be referred to as input light 135-2. The input light 135-1 may correspond to the portion of a spot of received light that overlaps and is detected by detector 340-1, and the input light 135-2 may correspond to the portion of the spot that overlaps and is detected by detector 340-2. In the example of FIG. 13, the portion of spot-1 that overlaps detector 340-1 (e.g., approximately 10% of spot-1) may correspond to input light 135-1, and the portion of spot-1 that overlaps detector 340-2 (e.g., approximately 0.1% of spot-1) may correspond to input light 135-2. For spot-2 in FIG. 13, the portion of spot-2 that overlaps detector 340-1 (e.g., approximately 95% of spot-2) may correspond to input light 135-1, and the portion of spot-2 that overlaps detector 340-2 (e.g., approximately 1% of spot-2) may correspond to input light 135-2. For spot-3 in FIG. 13, the portion of spot-3 that overlaps detector 340-1 may correspond to input light 135-1, and the portion of spot-3 that overlaps detector 340-2 may correspond to input light 135-2. For spot-4 in FIG. 13, the portion of spot-4 that overlaps detector 340-1 (e.g., approximately 1% of spot-4) may correspond to input light 135-1, and the portion of spot-4 that overlaps detector 340-2 (e.g., approximately 70% of spot-4) may correspond to input light 135-2.

In FIG. 15, detector 340-1 produces photocurrent $i_1$ in response to detecting input light 135-1, and detector 340-2 produces photocurrent $i_2$ in response to detecting input light 135-2. The amplitude or size of the photocurrents $i_1$ and $i_2$ in FIG. 15 may correspond to the power or energy of the respective received portions 135-1 and 135-2. For example, input light 135-1 may include a first portion of a received pulse of scattered light, and the detector 340-1 may produce a photocurrent $i_1$ that corresponds to the pulse of input light 135-1 (e.g., the amplitude of the photocurrent $i_1$ may be proportional to the peak power of the pulse of input light 135-1). Similarly, input light 135-2 may include a second portion of the received pulse of scattered light, and the detector 340-2 may produce a photocurrent $i_2$ that corresponds to the pulse of input light 135-2. The amplitude of the photocurrent signals produced by detectors 340-1 and 340-2 in FIG. 15 may vary with distance to a target 130, similar to the signal variation with distance illustrated in FIG. 14.

In FIG. 15, the receiver 140 includes a first amplifier 350-1 that produces a first voltage signal 360-1 that corresponds to the photocurrent $i_1$. Additionally, the receiver 140 includes a second amplifier 350-2 that produces a second voltage signal 360-2 that corresponds to the photocurrent $i_2$. Amplifiers 350-1 and 350-2 may be similar to amplifier 350 in FIG. 6 and may each include one or more transimpedance amplifiers, voltage amplifiers, or electronic filters. For example, amplifier 350-1 may include a first transimpedance amplifier that receives the photocurrent $i_1$ and produces the first voltage signal 360-1 which corresponds to the photocurrent $i_1$. Similarly, amplifier 350-2 may include a second transimpedance amplifier that receives the photocurrent $i_2$ and produces the second voltage signal 360-2 which corresponds to the photocurrent $i_2$.

Figure 16:
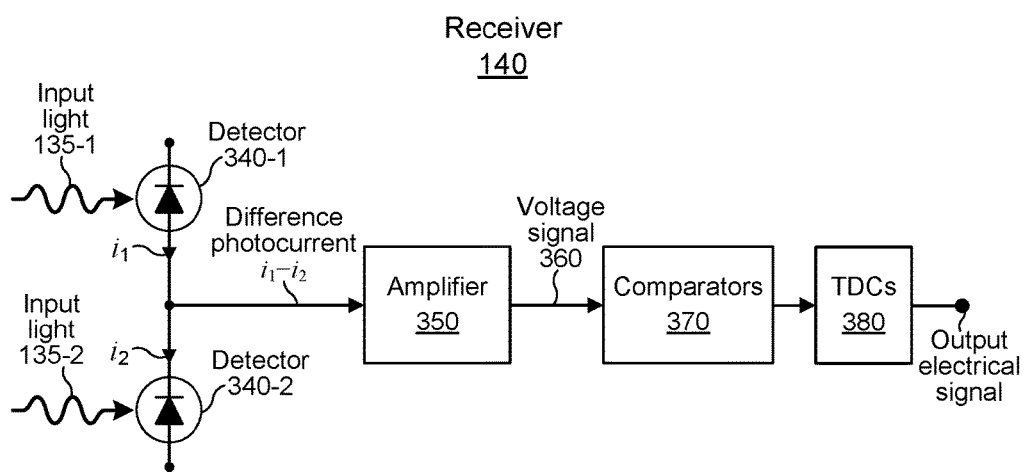
FIG. 16 illustrates an example receiver that includes two detectors and one amplifier.

FIG. 16 illustrates an example receiver 140 that includes two detectors (340-1 and 340-2) and one amplifier 350. In particular embodiments, a receiver 140 may include a first detector 340-1 and a second detector 340-2, where the detectors are coupled together. In FIG. 16, detector 340-1 and 340-2 are coupled together so their respective photocurrents $i_1$ and $i_2$ are subtracted to produce a difference photocurrent (which may be referred to as a difference current or a difference-current signal). If detector 340-1 and detector 340-2 produce photocurrents with approximately the same magnitude, then the difference photocurrent ($i_1-i_2$) may be approximately zero. A difference photocurrent of zero corresponds to spot-3 (e.g., the cross-over point) in FIGS. 13 and 14 where the two detectors produce approximately the same amount of photocurrent. A positive difference photocurrent (e.g., $i_1>i_2$) corresponds to a target 130 located closer than the distance corresponding to spot-3, and a negative difference photocurrent (e.g., $i_1<i_2$) corresponds to a target 130 located beyond the distance corresponding to spot-3. The receiver 140 in FIG. 16 includes an electronic amplifier 350 that receives the difference photocurrent and produces a voltage signal 360 that corresponds to the difference photocurrent.

In particular embodiments, a receiver 140 may include a first detector 340-1 configured to detect a first portion of a received optical signal and a second detector 340-2 configured to detect a second portion of the received optical signal. The receiver 140 may produce an electrical signal that corresponds to the first and second portions of the received optical signal. For example, voltage signals 360-1 and 360-2 in FIG. 15 may be coupled to one or more comparators 370 and one or more TDCs 380, similar to the comparators 370 and TDCs 380 illustrated in FIG. 6. The TDCs may produce an output electrical signal that corresponds to voltage signals 360-1 and 360-2, which in turn correspond to input light 135-1 and input light 135-2, respectively.

In particular embodiments, an output electrical signal may be a digital signal that includes one or more values corresponding to an optical characteristic of the first portion of the received optical signal or an optical characteristic of the second portion of the received optical signal. For example, the output electrical signal in FIG. 15 may include digital values corresponding to time values indicating when each of the voltage signals 360-1 and 360-2 exceeds or falls below particular threshold voltages. The time values may be similar to time values $t_1, t_2, t_3, \ldots, t_{N-1}$ or $t'_1, t'_2, t'_3, \ldots, t'_{N-1}$ in FIG. 7 and described above. As another example, the output electrical signal may include digital values that correspond to times when the voltage signal 360-1 exceeds or falls below particular threshold voltages. Alternatively, the output electrical signal may include digital values that correspond to times when the voltage signal 360-2 exceeds or falls below particular threshold voltages. In particular embodiments, an output electrical signal may include a first electrical signal corresponding to a first portion of a received optical signal and a second electrical signal corresponding to a second portion of the received optical signal. The first and second electrical signals may be combined into one electrical signal that is sent to a controller 150, or the first and second electrical signals may be sent as two separate signals (e.g., serially or in parallel) to a controller 150. In FIG. 15, the output electrical signal may include a first electrical signal corresponding to voltage signal 360-1 (which in turn corresponds to input light 135-1) and a second electrical signal corresponding to voltage signal 360-2 (which in turn corresponds to input light 135-2). In particular embodiments, an output electrical signal may include one or more analog signals, one or more digital signals, or any suitable combination of analog and digital signals.

In particular embodiments, a controller 150 (which may include or may be referred to as a processor, an FPGA, an ASIC, a computer, or a computing system) may be located within a lidar system 100 or outside of a lidar system 100. Alternatively, one or more parts of a controller 150 may be located within a lidar system 100, and one or more other parts of a controller 150 may be located outside a lidar system 100. In particular embodiments, one or more parts of a controller 150 may be located within a receiver 140 of a lidar system 100, and one or more other parts of a controller 150 may be located in other parts of the lidar system 100. For example, a receiver 140 may include an FPGA or ASIC configured to process an output electrical signal from the receiver 140, and the processed signal may be sent to a computing system located elsewhere within the lidar system 100. In particular embodiments, a controller 150 may include any suitable arrangement or combination of logic circuitry, analog circuitry, or digital circuitry.

In particular embodiments, a lidar system 100 may emit a first optical signal and a second optical signal (e.g., pulses 400C and 400D in FIG. 11), where the second optical signal is emitted a time τ after the first optical signal. The lidar system 100 may include a receiver 140 configured to detect a received optical signal that includes a portion of the emitted first or second optical signal scattered by a target 130. The receiver 140 may include two detectors 340-1 and 340-2 that detect a first and second portion, respectively, of the received optical signal (e.g., in FIG. 15, detector 340-1 detects the first portion 135-1, and detector 340-2 detects the second portion 135-2). The first and second portions of the received optical signal may be detected after the second optical signal is emitted. The receiver 140 may produce an output electrical signal corresponding to the first and second portions of the received optical signal, and the receiver 140 may send the output electrical signal to a controller 150 of the lidar system 100. In particular embodiments, the controller 150 may be configured to (1) receive the output electrical signal from the receiver 140 and (2) determine, based at least in part on the received electrical signal, whether the received optical signal is associated with the emitted second optical signal (e.g., pulse 400D in FIG. 11). Additionally or alternatively, the controller 150 may be configured to determine whether the received optical signal is associated with the emitted first optical signal (e.g., pulse 400C in FIG. 11).

In particular embodiments, a receiver 140 that includes multiple detectors 340 may be configured to mitigate range ambiguity in a lidar system 100. A receiver 140 with multiple detectors 340 as described herein may allow a lidar system 100 to determine which emitted optical pulse (of two or more emitted optical pulses) a received optical pulse is associated with. As an example, a lidar system 100 that provides range-ambiguity mitigation may be configured to make one or more of the following determinations: (1) determine that a received optical signal is associated with an emitted first optical signal, (2) determine that a received optical signal is not associated with an emitted first optical signal, (3) determine that a received optical signal is associated with an emitted second optical signal, or (4) determine that a received optical signal is not associated with an emitted second optical signal. As another example, a lidar system 100 that provides range-ambiguity mitigation may be configured to make one or more of the following determinations: (1) determine that a target 130 is located a distance from the lidar system 100 that is less than the operating range of the lidar system 100 or (2) determine that a target 130 is located a distance from the lidar system 100 that is greater than the operating range. Other conventional lidar systems that do not include receivers with multiple detectors may be unable to mitigate range ambiguity or may provide incorrect distances to targets located beyond a lidar-system operating range.

In particular embodiments, determining whether a received optical signal is associated with an emitted first or second optical signal may include analyzing an electrical signal (e.g., the output electrical signal in FIG. 15) to compare an optical characteristic of the first and second portions of the received optical signal. Analyzing the electrical signal may include determining one or more peak values, average values, or areas of the corresponding voltage signals 360-1 and 360-2, and comparing the optical characteristics of the first and second portions may include comparing the peak values, average values, or areas. For example, a received optical signal may include an optical pulse, and a controller 150 may compare the energy or peak power of the first and second portions 135-1 and 135-2 of the received signal by comparing values which are determined from the electrical signal and that correspond to the energy or peak power of the first and second portions. As an example, the voltage signal with the higher peak voltage $V_{peak}$ may correspond to the optical-pulse portion having the higher peak optical power. As another example, the voltage signal with the larger area under a voltage pulse may correspond to the optical-pulse portion having the higher optical energy.

In particular embodiments, a controller 150 may compare $OC_1$ (an optical characteristic of a first portion 135-1 of a received optical signal) to $OC_2$ (an optical characteristic of a second portion 135-2 of the received optical signal). The optical characteristic $OC_1$ may include one or more values (determined from an output electrical signal) that correspond to a peak optical power, an average optical power, a peak optical intensity, or an optical pulse energy of the first portion 135-1. Similarly, the optical characteristic $OC_2$ may include one or more values (determined from an output electrical signal) that correspond to a peak optical power, an average optical power, a peak optical intensity, or an optical pulse energy of the second portion 135-2. Based on the comparison between $OC_1$ and $OC_2$, the controller 150 may determine whether the corresponding received optical signal is associated with the emitted second optical signal or the emitted first optical signal.

Since the sizes of the signals from detectors 340-1 and 340-2 may vary with the distance to a target 130 (e.g., as illustrated in FIG. 14), comparing $OC_1$ and $OC_2$ may allow the controller 150 to determine whether a received optical signal is scattered from a target 130 located a distance that is less than or greater than the operating range of the lidar system 100. For example, if the target 130 is located within the operating range of the lidar system 100, then the controller 150 may determine that (1) the received optical signal is associated with the emitted second optical signal (i.e., the most recently emitted optical signal) or (2) the received optical signal is not associated with the emitted first optical signal (i.e., a previously emitted optical signal). In this case, when the received optical signal is detected, the first optical signal has already traveled for a time interval of at least τ, which would correspond to a target located beyond the operating range of the lidar system 100. Thus, if the target 130 is determined to be located within the operating range of the lidar system (based on comparing $OC_1$ and $OC_2$), then the first optical signal may be excluded from consideration, and the received optical signal may be determined to be associated with the emitted second optical signal. As another example, if the target 130 is located beyond the operating range of the lidar system 100, then the controller 150 may determine that (1) the received optical signal is not associated with the emitted second optical signal or (2) the received optical signal is associated with the emitted first optical signal. In the example of FIGS. 10 and 11, the target 130C is located beyond the operating range of the lidar system 100, and the received optical signal 410C is associated with the emitted first optical signal 400C. The second optical signal 400D may be excluded from consideration since it would indicate a target located within the operating range of the lidar system 100.

In particular embodiments, comparing $OC_1$ to $OC_2$ may include determining whether $OC_1$ is greater than $OC_2$. If $OC_1$ is greater than $OC_2$, then processor 150 may determine that (1) the received optical signal is associated with the emitted second optical signal or (2) the received optical signal is not associated with the emitted first optical signal. $OC_1$ being greater than $OC_2$ may correspond to the received optical signal being scattered from a target 130 located a distance less than the distance associated with the cross-over point in FIG. 14. The cross-over point corresponds to the target distance where $OC_1$ is approximately equal to $OC_2$, and the lidar system 100 may be configured so that the distance associated with the cross-over point is approximately equal to the operating range of the lidar system 100. If $OC_1$ is greater than $OC_2$, then the corresponding target 130 is located a distance that is less than the operating range, which indicates that the received optical signal includes scattered light from the emitted second optical signal (and not from the emitted first optical signal). In particular embodiments, if $OC_2$ is greater than $OC_1$, then processor 150 may determine that (1) the received optical signal is not associated with the emitted second optical signal or (2) the received optical signal is associated with the emitted first optical signal. $OC_2$ being greater than $OC_1$ may correspond to the received optical signal being scattered from a target 130 located a distance that is greater than the operating range, which indicates that the received optical signal includes scattered light from the emitted first optical signal (and not from the emitted second optical signal).

In particular embodiments, comparing $OC_1$ to $OC_2$ may include determining whether the ratio $OC_1/OC_2$ exceeds a particular threshold value r. If $OC_1/OC_2$ is greater than r, then then processor 150 may determine that (1) the received optical signal is associated with the emitted second optical signal or (2) the received optical signal is not associated with the emitted first optical signal. Additionally or alternatively, if $OC_1/OC_2$ is less than r, then processor 150 may determine that (1) the received optical signal is not associated with the emitted second optical signal or (2) the received optical signal is associated with the emitted first optical signal. The value for r may be set to $10^{-3}$, $10^{-2}$, $10^{-1}$, 1, 10, $10^2$, $10^3$, or any other suitable value. For example if r=1, then $OC_1/OC_2$ being greater than 1 may correspond to the received optical signal being scattered from a target 130 located a distance less than the distance associated with the cross-over point (spot-3) in FIG. 14. For r=1, the operating range of the lidar system 100 may be set approximately to the distance associated with the cross-over point. Determining whether the ratio $OC_1/OC_2$ exceeds 1 corresponds to determining whether $OC_1$ is greater than $OC_2$, as described above.

In particular embodiments, the value of r may be set based on the operating range of a lidar system 100. For example, if the operating range of a lidar system 100 is set to the distance associated with a cross-over point, then r may be set to 1. This allows the lidar system to determine whether a received optical signal is scattered from a target located within the operating range or beyond the operating range (based on whether the ratio $OC_1/OC_2$ is greater than or less than 1). As another example, if the operating range of a lidar system 100 corresponds to the distance associated with spot-2 in FIG. 14, then r may be set to 100, since the ratio $OC_1/OC_2$ is approximately 100 at that distance. As another example, if the operating range of a lidar system 100 corresponds to the distance associated with spot-4 in FIG. 14, then r may be set to 0.01, since the ratio $OC_1/OC_2$ is approximately 0.01 at that distance. If $OC_1/OC_2 > 0.01$, then the controller 150 may determine that (1) the distance to the target is less than the operating range and/or (2) the received optical signal is associated with the emitted second optical signal. If $OC_1/OC_2 < 0.01$, then the controller 150 may determine that (1) the distance to the target is greater than the operating range and/or (2) the received optical signal is associated with the emitted first optical signal.

A lidar system 100 may be configured to emit a first optical signal and a second optical signal, where the second optical signal is emitted a time τ after the first optical signal. The time τ between successive pulses may be related to the operating range $R_{OP}$ of the lidar system 100 by the expression $R_{OP}=c·τ/2$. A receiver 140 may detect a received optical signal that includes a portion of the emitted first or second optical signal scattered by a target 130. In particular embodiments, a processor 150 may be configured to determine, based at least in part on an electrical signal received from a receiver 140, whether the received optical signal is associated with the emitted second optical signal. The received optical signal being associated with the emitted second optical signal may refer to the received optical signal including scattered light from the emitted second optical signal and including little or no scattered light from the emitted first optical signal. Additionally, the received optical signal being associated with the emitted second optical signal may correspond to the distance D to the target 130 being less than the operating range of the lidar system 100. In particular embodiments, in response to determining that a received optical signal is associated with the emitted second optical signal, the processor 150 may determine the distance to the target 130. For example, the distance to the target 130 may be determined from the expression D=c·T/2, where T is the time interval between emission of the second optical signal and detection of the received optical signal. The time T corresponds to a round-trip time for the second optical signal to travel to the target 130 and back to the lidar system 100. Since the distance to the target 130 is less than the operating range (e.g., $D<R_{OP}$), this means that the round-trip time T is less than τ.

In particular embodiments, a processor 150 may be configured to determine, based at least in part on an electrical signal received from a receiver 140, whether a received optical signal is associated with an emitted first optical signal. As an example, a lidar system 100 may emit a first optical signal and a second optical signal, where the second optical signal is emitted a time τ after the first optical signal. A receiver 140 may detect a received optical signal that includes a portion of the emitted first or second optical signal scattered by a target 130. A processor 150 may determine whether the received optical signal is associated with the emitted first optical signal. The received optical signal being associated with the emitted first optical signal may refer to the received optical signal including scattered light from the emitted first optical signal and including little or no scattered light from the second optical signal. In particular embodiments, the received optical signal being associated with the emitted first optical signal may correspond to a range-ambiguity event where the distance to the target 130 is greater than the operating range of the lidar system 100. FIGS. 10 and 11 illustrate an example range-ambiguity event where the distance $D_C$ to target 130C is greater than the operating range $R_{OP}$. Additionally, the range-ambiguity event corresponds to the round-trip time $T_C$ being greater than the time τ between successive pulses.

In particular embodiments, in response to determining that a received optical signal is associated with an emitted first optical signal, a processor 150 may be configured to disregard the corresponding electrical signal. As an example, a processor 150 may receive an electrical signal from a receiver 140, and based on the received signal, the processor 150 may determine that the received optical signal is associated with the emitted first optical signal. This determination may indicate that a range-ambiguity event has occurred in which a target 130 is located beyond an operating range of the lidar system 100. After the determination is made, the processor 150 may disregard the electrical signal by (1) refraining from determining a distance to the target 130, (2) erasing or disregarding data associated with the electrical signal, or (3) instructing the receiver 140 to reset and await the receipt of a subsequent optical signal.

In particular embodiments, in response to determining that a received optical signal is associated with an emitted first optical signal, a processor 150 may be configured to determine the distance to the target 130 from which the optical signal was scattered. The received optical signal being associated with the emitted first optical signal may correspond to a range-ambiguity event where the distance to the target is greater than the operating range of the lidar system 100. For example, in FIGS. 10 and 11, the distance $D_C$ to target 130C may be determined from the expression $D_C=R_{OP}+ΔD$, where $R_{OP}$ is the operating range (which corresponds to the time interval τ between emission of the first and second optical signals according to the expression $R_{OP}=c·τ/2$). The distance ΔD may be determined from the expression ΔD=c·ΔT/2, where ΔT corresponds to the time interval between emission of the second optical signal and detection by the receiver 140 of the received optical signal. In this case, the receiver 140 may reset the time values accumulated by the TDCs 380 when the second optical signal is emitted, and as a result, the receiver 140 may provide time data so that ΔT may be determined. Alternatively, the receiver 140 or controller 150 may determine a value corresponding to the time interval $T_C$, and the distance $D_C$ to target 130C may be determined from the expression $D_C = c \cdot T_C/2$.

In particular embodiments, a lidar system 100 may emit a first optical signal, a second optical signal, and a third optical signal. The second optical signal may be emitted a time $\tau_1$ after the first optical signal, and the third optical signal may be emitted a time $\tau_2$ after the second optical signal, where $\tau_1$ and $\tau_2$ may be the same time interval or different time intervals. The lidar system 100 may include a receiver 140 configured to detect a received optical signal that includes a portion of the emitted first, second, or third optical signal scattered by a target 130. The receiver 140 may include two detectors 340-1 and 340-2 that detect a first and second portion, respectively, of the received optical signal. The first and second portions of the received optical signal may be detected after the third optical signal is emitted. The receiver 140 may produce an output electrical signal corresponding to the first and second portions of the received optical signal, and the receiver 140 may send the output electrical signal to a controller 150 of the lidar system 100. In particular embodiments, a processor 150 may be configured to (1) receive an output electrical signal from a receiver 140 and (2) determine, based at least in part on the received electrical signal, whether a received optical signal is associated with the emitted first optical signal, the emitted second optical signal, or the emitted third optical signal. The received optical signal being associated with the third optical signal may correspond to the distance D to the target 130 being less than the operating range $R_{OP}$ of the lidar system 100 (e.g., $D<R_{OP}$). The received optical signal being associated with the second optical signal may correspond to a range-ambiguity event where the distance to the target 130 is greater than $R_{OP}$ and less than $2R_{OP}$. (e.g., $R_{OP}<D<2R_{OP}$). The received optical signal being associated with the first optical signal may correspond a range-ambiguity event where the distance to the target 130 is greater than $2R_{OP}$ (e.g., $D>2R_{OP}$).

In particular embodiments, one or more electrical signals may be used to aid in the alignment of an input light beam 135 into a receiver 140. For example, in FIG. 12 or FIG. 15, voltage signal 360-1, voltage signal 360-2, or the output electrical signal may be used to (1) align the input light beam 135 into the receiver 140, (2) align the input light beam 135-1 with respect to detector 340-1, or (3) align the input light beam 135-2 with respect to the detector 340-2. Aligning the input light beam 135 may include adjusting a position or orientation of lens 330 in FIG. 12; adjusting an angle or position of the input light beam 135 relative to receiver 140 (e.g., by adjusting the orientation of a mirror or other optical component); adjusting an angle or position of the input light beam 135-1 or 135-2 (e.g., by adjusting the orientation of a mirror or other optical component); or adjusting a position or orientation of detector 340-1 or 340-2. The alignment of input light beam 135 may be performed to adjust or set the distance associated with a cross-over point. For example, if the desired distance associated with the cross-over point is 150 m, then an optical signal from the lidar system 100 may be directed to a target located approximately 150 meters away. Then, the alignment of the input light beam 135 may be adjusted until the signals associated with detectors 340-1 and 340-2 (e.g., voltage signals 360-1 and 360-2, respectively) are approximately equal. This may indicate that the input light beam 135 is split approximately equally between detectors 340-1 and 340-2 (e.g., similar to spot-3 in FIG. 13). Adjusting the alignment of input light beam 135 may be performed during assembly or manufacture of a lidar system 100. For example, after an adjustment procedure is performed, the lens 330, detector 340-1, detector 340-2, or another optical component used to perform the adjustment (e.g., a mirror) may be fixed in place (e.g., with epoxy). Additionally or alternatively, adjusting the alignment of input light beam 135 may be performed after a lidar system 100 has been assembled or deployed (e.g., to compensate for mechanical or thermal misalignment). As an example, a lidar system 100 may include an adjustable optical component (e.g., a mirror that can be manually adjusted or automatically adjusted using a motor or actuator) that is used to adjust the alignment of the input light beam 135.

Figure 17:
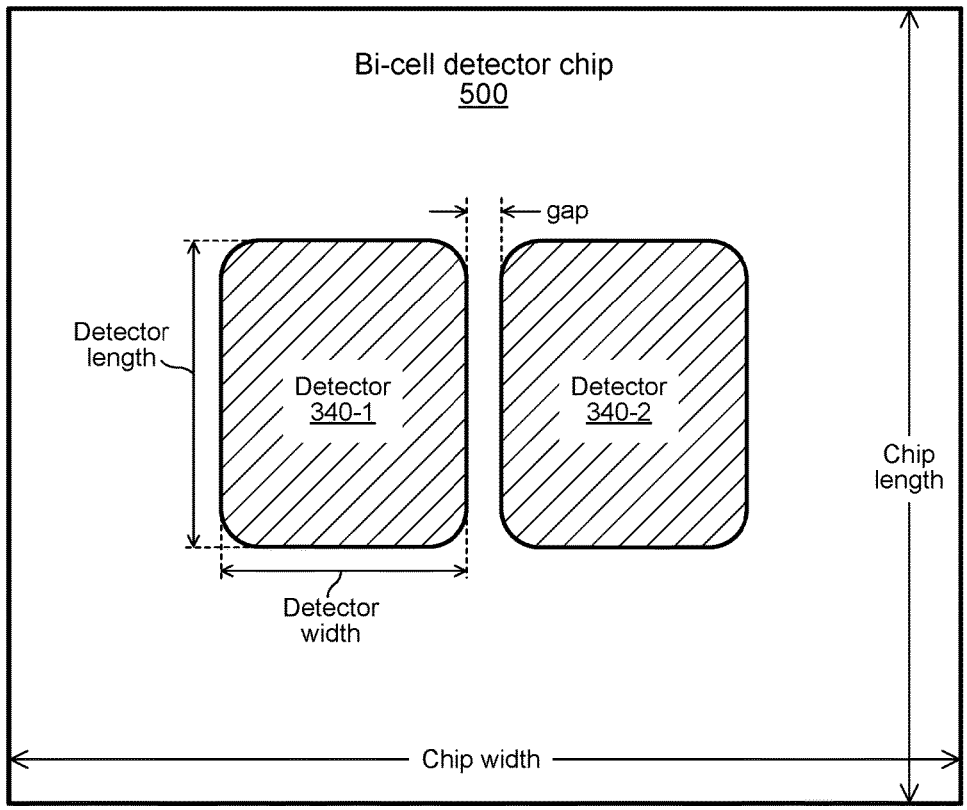
FIG. 17 illustrates a top view of an example bi-cell detector chip.

FIG. 17 illustrates a top view of an example bi-cell detector chip 500. In particular embodiments, a receiver 140 may include two detectors 340-1 and 340-2 disposed on or in a single detector chip 500. Rather than having two separate detectors disposed in separate packages or separate chips, the two detectors 340-1 and 340-2 may be fabricated together so that they are part of the same chip 500. A receiver 140 that includes a bi-cell detector chip 500 may be part of a lidar system 100 configured to mitigate range ambiguity based on signals produced by the two detectors 340-1 and 340-2. For example, the receiver 140 illustrated in FIG. 12, FIG. 15, or FIG. 16 may include a bi-cell detector chip 500 with the detectors 340-1 and 340-2 integrated together into the chip 500.

A bi-cell detector chip 500 may have any suitable chip width (e.g., a chip width of approximately 100 μm, 200 μm, 400 μm, 600 μm, 1 mm, 2 mm, 5 mm, or 10 mm) and any suitable chip length (e.g., a chip length of approximately 100 μm, 200 μm, 400 μm, 600 μm, 1 mm, 2 mm, 5 mm, or 10 mm). For example, the bi-cell detector chip 500 in FIG. 17 may have a width of approximately 400 μm and a length of approximately 400 μm. The detectors 340-1 and 340-2 in a bi-cell detector chip 500 may each have any suitable detector width (e.g., a detector width of approximately 10 μm, 20 μm, 50 μm, 100 μm, 200 μm, 500 μm, or 1 mm) and any suitable detector length (e.g., a detector length of approximately 10 μm, 20 μm, 50 μm, 100 μm, 200 μm, 500 μm, or 1 mm). For example, the detectors 340-1 and 340-2 in FIG. 17 may each have a width of approximately 50 μm and a length of approximately 80 μm. The detectors 340-1 and 340-2 in a bi-cell detector chip 500 may be separated by any suitable gap (e.g., a gap having a width of approximately 1 μm, 2 μm, 5 μm, 10 μm, 20 μm, 50 μm, 100 μm, 200 μm, or 500 μm. For example, the detectors 340-1 and 340-2 in FIG. 17 may be separated by a gap of approximately 10 μm. As another example, the detectors 340-1 and 340-2 in FIG. 17 may be separated by a gap of less than 100 μm. As another example, the detectors 340-1 and 340-2 in FIG. 17 may be separated by a gap of between approximately 1 μm and approximately 100 μm.

Figure 18:
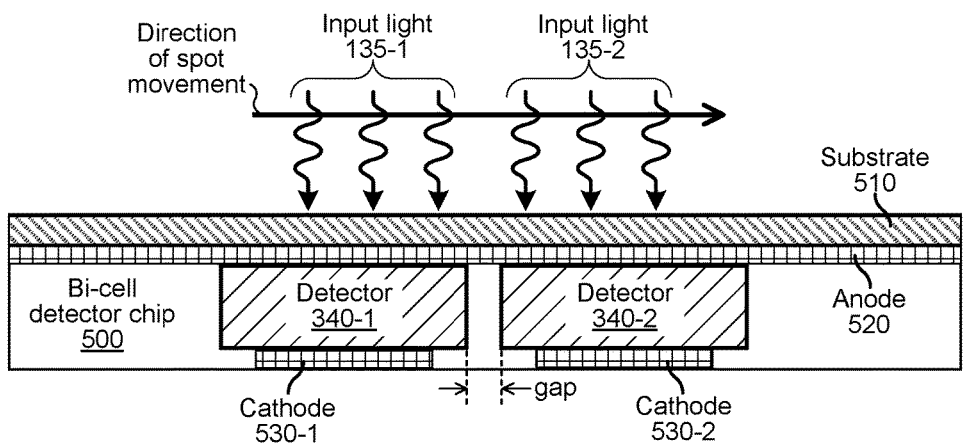
FIG. 18 illustrates a side view of an example bi-cell detector chip.

FIG. 18 illustrates a side view of an example bi-cell detector chip 500. The bi-cell detector chip 500 includes detector 340-1 and detector 340-2 disposed on a substrate material 510. For example, the detectors 340-1 and 340-2 may each be an InGaAs APD, and the substrate material 510 may include indium phosphide (InP). In particular embodiments, each of the detectors 340-1 and 340-2 in a bi-cell detector chip 500 may have separate electrical connections for their respective anodes and cathodes. Alternatively, the detectors 340-1 and 340-2 may have a common anode or a common cathode. In FIG. 18, the detectors 340-1 and 340-2 are configured to have a common anode 520 and separate electrical connections for the cathodes 530-1 and 530-2, respectively. The anode 520 may include InP, and both the substrate 510 and anode 520 may be substantially transparent to the input light 135-1 and 135-2, which may have a wavelength between 1200 nm and 1600 nm.

In FIG. 18, input light 135-1 is incident on detector 340-1, and input light 135-2 is incident on detector 340-2. As the distance to a target 130 increases, the spot of input light focused onto the detectors may move in the direction indicated in FIG. 18. For nearby targets 130, the spot of input light may be oriented so that input light 135-1 has greater power or energy than input light 135-2. For targets located beyond a particular distance, input light 135-1 may have less power or energy than input light 135-2.

Figure 19:
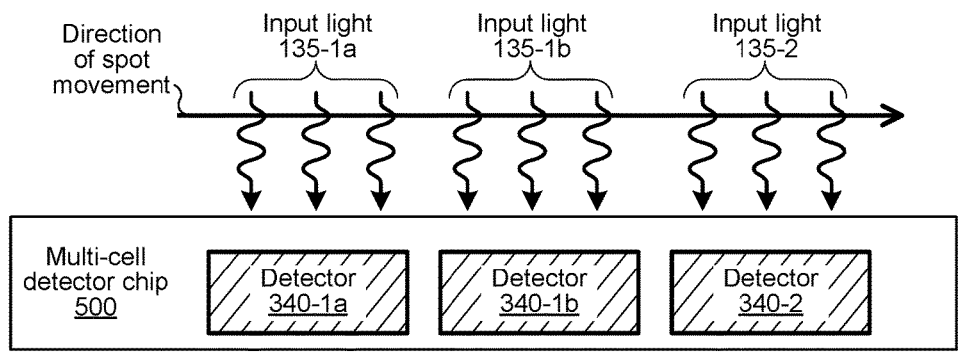
FIG. 19 illustrates a side view of an example multi-cell detector chip that includes three detectors.

FIG. 19 illustrates a side view of an example multi-cell detector chip 500 that includes three detectors 340-1*a*, 340-1*b*, and 340-2. In particular embodiments, a receiver 140 may include two or more detectors 340. As an example, a receiver 140 may include two, three, four, five, or any other suitable number of detectors 340. The detectors 340 may be disposed in separate packages or separate chips, or the detectors 340 may be disposed on or in a single package or a single detector chip 500. The detectors 340 may be arranged adjacent to one another along a line corresponding to a scan direction of a receiver field of view. In the example of FIG. 19, the three detectors (340-1*a*, 340-1*b*, and 340-2) are integrated together in a single multi-cell detector chip 500. Additionally, the three detectors are arranged along a line corresponding to the direction of spot movement across the detectors (which in turn corresponds to the scan direction of the receiver FOV). The multi-cell detector chip 500 illustrated in FIG. 19 may be similar to the bi-cell detector chip 500 illustrated in FIG. 17 or FIG. 18. Detectors 340-1*a*, 340-1*b*, and 340-2 in FIG. 19 may each have any suitable dimensions and may each include any suitable type of detector, such as for example, an APD or a PIN photodiode.

In particular embodiments, a receiver 140 may include a multi-cell detector chip 500 that is part of a lidar system 100 configured to mitigate range ambiguity based on signals produced by the detectors 340 in response to detecting an input beam 135. In FIG. 19, light from an input beam (e.g., scattered light from a remote target) may be incident on the detectors so that a first portion 135-1*a* of the input beam is received by detector 340-1*a*, a second portion 135-1*b* of the input beam is received by detector 340-1*b*, and a third portion 135-2 of the input beam is received by detector 340-2. The detectors 340-1*a*, 340-1*b*, and 340-2 may each produce a photocurrent in response to the respective input light 135-1*a*, 135-1*b*, and 135-2, and the amplitude or amount of photocurrent produced by each of the detectors may vary with distance to a target 130. Scattered light received from a relatively close target 130 (e.g., a target located less than 50 m from the lidar system 100) may be directed primarily to detector 340-1*a*, and scattered light from a target 130 located an intermediate distance (e.g., between 50 m and a near-range distance) may be directed primarily to detector 340-1B. If a target 130 is located beyond the near-range distance, the received scattered light may be directed primarily to detector 340-2.

In particular embodiments, one or more detectors 340 of a receiver 140 may be configured to operate as near-range detectors, and one or more other detectors 340 of a receiver 140 may be configured to operate as far-range detectors. Additionally, the signals from one or more near-range detectors may be compared with the signals from one or more far-range detectors to determine whether a received optical signal is associated with an emitted first optical signal (e.g., pulse 400C in FIG. 11) or an emitted second optical signal (e.g., pulse 400D in FIG. 11). In FIG. 19, detectors 340-1*a* and 340-1*b* may be configured to operate as near-range detectors, and detector 340-2 may be configured to operate as a far-range detector. For a target 130 located within a near-range distance, scattered light from the target may be directed primarily to the near-range detectors 340-1*a* and 340-1*b*, and the photocurrent produced by detector 340-1*a* or 340-1*b* (separately or in combination) may be greater than the photocurrent produced by far-range detector 340-2. For a target 130 located beyond the near-range distance, scattered light from the target may be directed primarily to the far-range detector 340-2, and the photocurrent produced by detector 340-2 may be greater than the photocurrent produced by detector 340-1*a* or 340-1*b* (separately or in combination).

In particular embodiments, one or more electronic signals (e.g., photocurrents or voltage signals) associated with detectors 340-1*a* and 340-1*b* may be compared with an electronic signal associated with detector 340-2 to determine whether a received optical signal is associated with an emitted first optical signal or an emitted second optical signal. Comparing electronic signals from the detectors may include combining the photocurrents or voltage signals from detectors 340-1*a* and 340-1*b* (e.g., by directly adding the photocurrents or voltage signals or by adding the photocurrents or voltage signals as a weighted sum). One or more values associated with the combined signals from detectors 340-1*a* and 340-1*b* may then be compared with one or more corresponding values associated with the signal from detector 340-2 to determine whether a received optical signal is associated with an emitted first optical signal or an emitted second optical signal.

In particular embodiments, the electronic gain associated with each detector 340 in a multi-cell detector chip 500 may be configured to have a particular value. The gain associated with each detector 340 may be approximately equal, or one or more detectors may be associated with one or more different gain values. For example, in FIG. 19, the gain associated with detector 340-1*a* may be configured to be lower than the gain associated with detector 340-1*b*. The electronic gain associated with a detector 340 may depend on one or more factors including (1) detector area, (2) detector reverse bias, or (3) electronic amplifier gain. A detector with a larger cross-sectional area (e.g., detector length×detector width) may capture more incident light, which corresponds to a larger effective gain. Additionally, the gain of a detector may depend on the reverse-bias voltage applied to the detector, where a larger reverse-bias voltage results in a larger gain. In particular embodiments, each detector 340 in a multi-cell detector chip 500 may be coupled to a respective electronic amplifier 350 having a particular electronic gain. In FIG. 19, the three detectors 340-1*a*, 340-1*b*, and 340-2 may each be coupled to three respective amplifiers having approximately the same electronic gain, or one or more of the amplifiers may have a different electronic gain. For example, the electronic amplifiers may be configured so that the gain of the detector 340-1*a* amplifier is lower than the gain of the detector 340-1*b* amplifier. Detector 340-1*a* may primarily receive scattered light from relatively close targets, while detector 340-1*b* may primarily receive scattered light from intermediate-distance targets. As a result, for a relatively close target 130, the input light 135-1*a* may have a relatively large optical power or energy, and to avoid damaging or saturating the electronic amplifier, detector 340-1*a* may be coupled to an amplifier having a relatively low gain. Since detector 340-1*b* may receive scattered light from targets that are farther away, the input light 135-1b may have a smaller optical power or energy, and so the detector 340-1b may be coupled to an amplifier having a higher gain. Additionally or alternatively, the gain associated with detector 340-1a may be configured to be lower than the gain associated with detector 340-1b based on the area or reverse bias of the detectors. For example, detector 340-1a may be smaller than detector 340-1b, resulting in a lower effective gain for detector 340-1a compared to detector 340-1b. As another example, the reverse-bias voltage applied to detector 340-1a may be less than the reverse-bias voltage applied to detector 340-1b, resulting in a lower gain for detector 340-1a.

Figure 20:
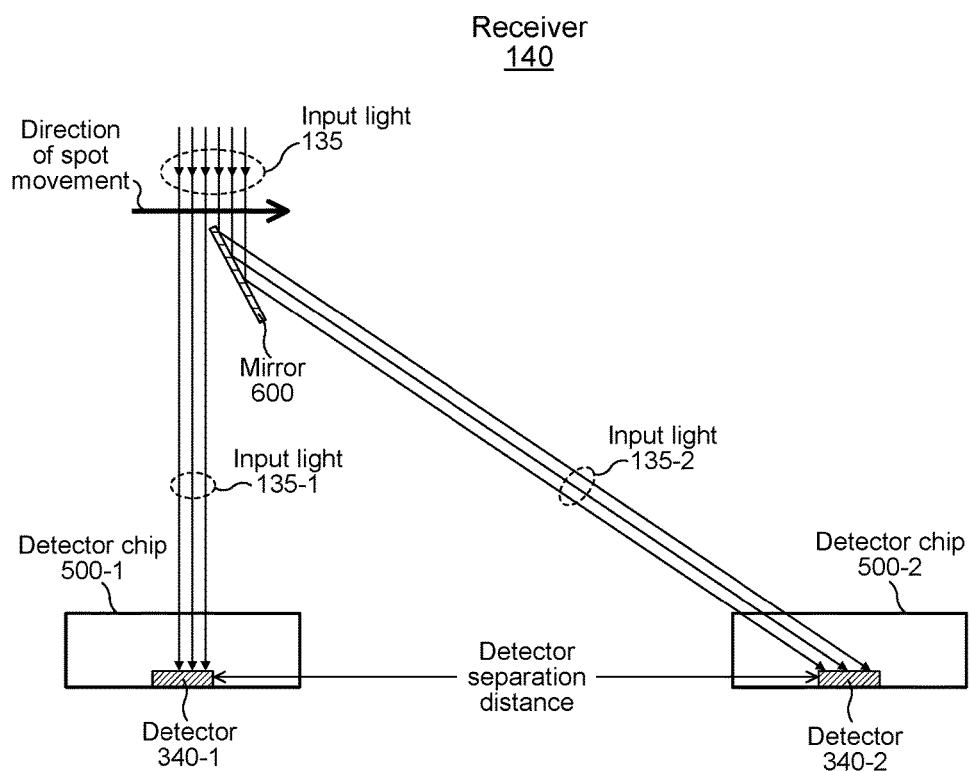
FIG. 20 illustrates an example receiver that includes two detectors and a mirror.

FIG. 20 illustrates an example receiver 140 that includes two detectors (340-1 and 340-2) and a mirror 600. In particular embodiments, a receiver 140 may include a first detector 340-1 configured to detect input light 135-1 (which includes a first portion of an input light signal 135) and a second detector 340-2 configured to detect input light 135-2 (which includes a second portion of the input light signal 135). Additionally, the receiver 140 may include an optical assembly configured to split off the second portion 135-2 from the input signal 135 and direct the second portion 135-2 to the second detector 340-2. Additionally or alternatively, a receiver 140 may include an optical assembly configured to split off the first portion 135-1 from the input signal 135 and direct the first portion 135-1 to the first detector 340-1. In particular embodiments, an optical assembly that splits off a first portion 135-1 or a second portion 135-2 from an input signal 135 may include any suitable optical components, such as for example, one or more mirrors, prisms (e.g., right-angle prisms, cube prisms, or rhomboid prisms), lenses, curved mirrors, or high refractive-index materials.

In FIG. 20, the optical assembly includes a mirror 600 which splits off the second portion 135-2 from the input signal 135 and reflects the second portion 135-2 so that it is directed to the second detector 340-2. The first portion 135-1 includes part of the input light 135 that is not reflected by the mirror 600 and is directed to the first detector 340-1. As the distance to a target 130 increases, the input light beam 135 moves in the direction of spot movement indicated in FIG. 20. For nearby targets 130, the input light beam 135 may be directed so that input light 135-1 has a larger power or energy than input light 135-2. For targets located beyond a particular distance, the input light beam 135 may be directed so that a greater portion of input light 135 is split off by the mirror 600 and directed to detector 340-2. As a result, for targets located beyond a particular distance, the input light 135-1 may have less power or energy than the input light 135-2. In FIG. 20, detectors 340-1 and 340-2 are disposed in separate detector chips 500-1 and 500-2, respectively. The receiver 140 may include two separate detector chips 500-1 and 500-2 which are separated by any suitable detector-separation distance (e.g., a distance of approximately 100 µm, 200 µm, 500 µm, 1 mm, 2 mm, 5 mm, 10 mm, or 20 mm).

In particular embodiments, an optical assembly of a receiver 140 may include one or more mirrors. As an example, instead of using a single mirror 600 (as illustrated in FIG. 20), an optical assembly may include a first mirror to split off the input light 135-2 and a second mirror to direct the input light 135-2 to detector 340-2. In particular embodiments, an optical assembly of a receiver 140 may include one or more mirrors configured to split off input light 135-1 and direct input light 135-1 to detector 340-1. As an example, in addition to or instead of mirror 600 in FIG. 20, an optical assembly may include one or more mirrors that split off input light 135-1 from the input light signal 135 and direct the input light 135-1 to detector 340-1.

Figure 21:
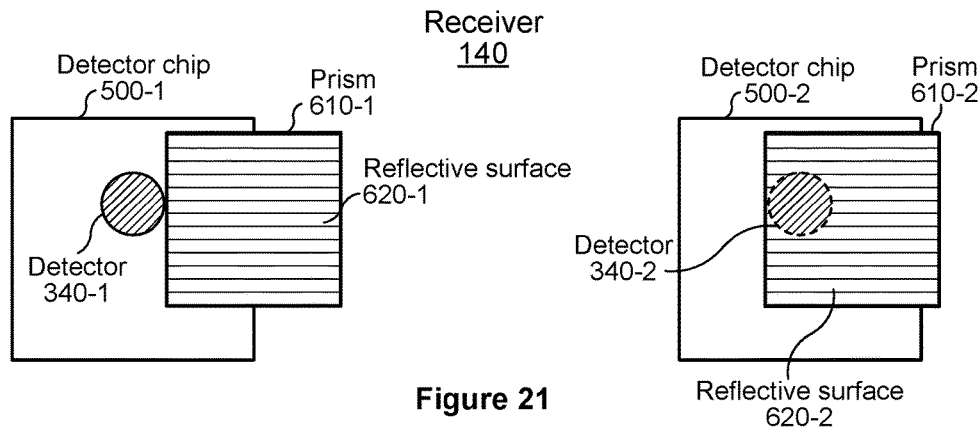
FIG. 21 illustrates a top view of an example receiver that includes two detectors and two prisms.

FIG. 21 illustrates a top view of an example receiver 140 that includes two detectors (340-1 and 340-2) and two prisms (610-1 and 610-2). Prism 610-1, which is positioned above and adjacent to detector 340-1, includes a reflective surface 620-1 (e.g., a reflective metallic coating or a reflective dielectric coating). Prism 610-2, which is positioned over detector 340-2, includes a reflective surface 620-2. The prisms 610-1 and 610-2 may each be affixed to a top surface of the respective detector chips 500-1 and 500-2 using an epoxy or adhesive (e.g., an ultraviolet-cure adhesive). The epoxy or adhesive may be substantially transparent to the input light 135-1 and 135-2.

Figure 22:
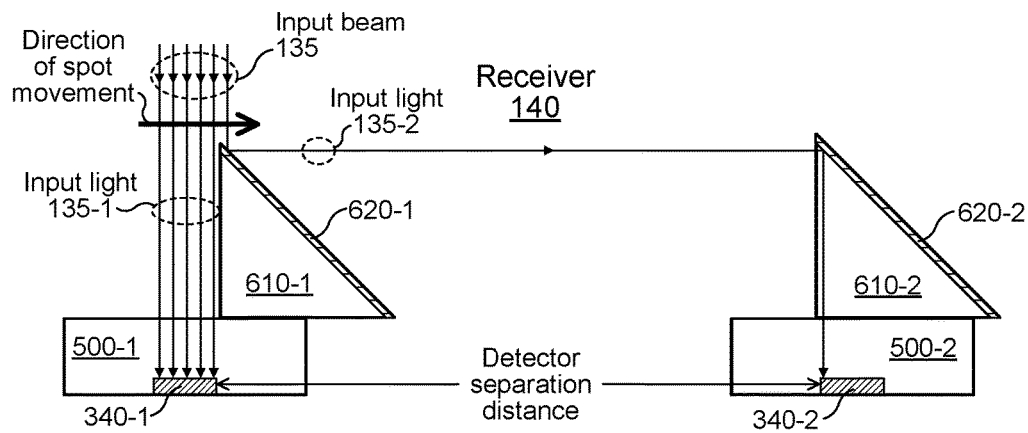
FIGS. 22 and 23 each illustrate a side view of the example receiver in FIG. 21.
Figure 23:
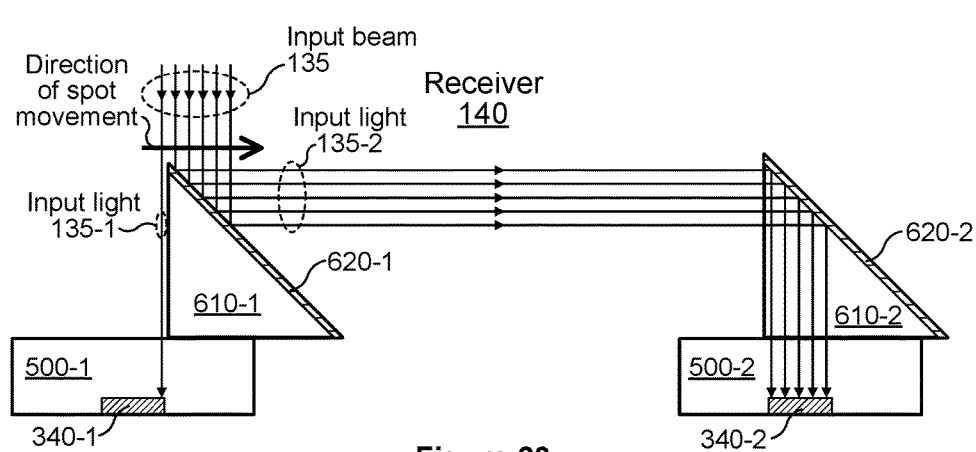

FIGS. 22 and 23 each illustrate a side view of the example receiver 140 in FIG. 21. In particular embodiments, an optical assembly of a receiver 140 may include two prisms 610-1 and 610-2. The first prism 610-1 may include a reflective surface 620-1 that splits off the input light 135-2 from the input beam 135 and directs the input light 135-2 to the second prism 610-2. The second prism 610-2 may include a reflective surface 620-2 that directs the input light 135-2 to the detector 340-2. The reflective surface 620-2 may include a reflective metallic or dielectric coating, or the reflective surface 620-2 may be provided by total internal reflection at the interface between the prism 610-2 and the surrounding environment. The input light 135-1, which is directed to detector 340-1, includes part of the input beam 135 that is not reflected by the reflective surface 620-1 of prism 610-1. As the distance to a target 130 increases, the input light beam 135 moves in the direction of spot movement indicated in FIGS. 22 and 23. The input beam 135 in FIG. 22 may represent light scattered from a nearby target 130 where the input light 135-1 has a larger power or energy than input light 135-2. The input beam 135 in FIG. 23 may represent light scattered from a target 130 located beyond a particular distance where a greater portion of the input beam 135 is split off by the prism 610-1 and directed to detector 340-2. As a result, for targets located beyond a particular distance, the input light 135-1 may have less power or energy than the input light 135-2.

Figure 24:
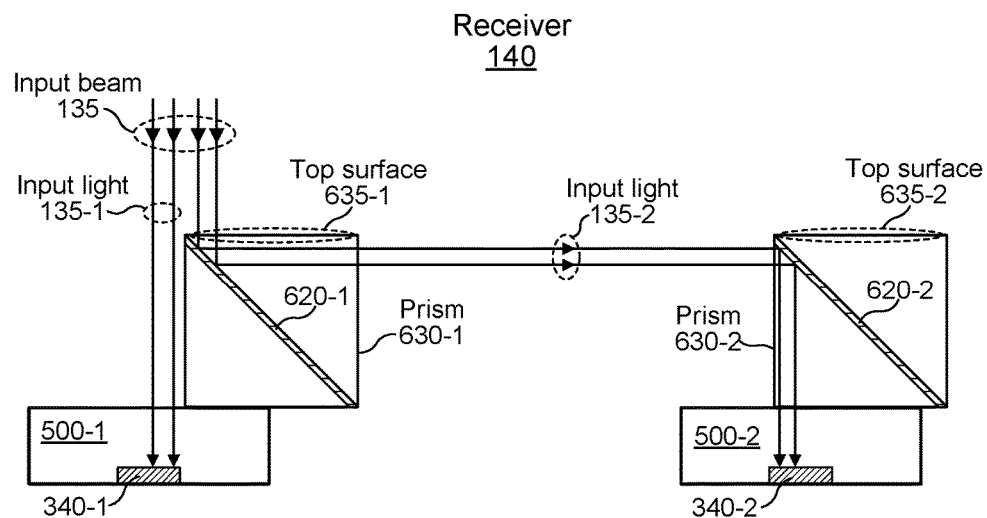
FIG. 24 illustrates an example receiver that includes two cube prisms.

FIG. 24 illustrates an example receiver 140 that includes two cube prisms (630-1 and 630-2). Rather than using triangular or right-angle prisms (as illustrated in FIGS. 21-23), an optical assembly of a receiver 140 may include one or more cube prisms. In FIG. 24, the optical assembly includes cube prism 630-1 and cube prism 630-2. The first cube-prism 630-1 includes a reflective surface 620-1 that splits off the input light 135-2 and directs the input light 135-2 to the second cube prism 630-2. The second cube prism 630-2 includes a reflective surface 620-2 that directs the input light 135-2 to the detector 340-2. The input light 135-1, which is directed to detector 340-1, includes part of the input beam 135 that is not reflected by the reflective surface 620-1 of prism 630-1. The cube prisms 630-1 and 630-2 illustrated in FIG. 24 may allow for ease of assembly and manufacturing. For example, the horizontal top surfaces 635-1 and 635-2 of the respective cube prisms 630-1 and 630-2 may allow for the prisms to be picked up and precisely positioned using a pick-and-place machine or a vacuum-handling tool. Additionally, the top surface 635-1 may include an anti-reflection coating having a low reflectivity at a wavelength of the input beam 135 (e.g., a reflectivity of less than 0.5% at 1540-1560 nm).

Figure 25:
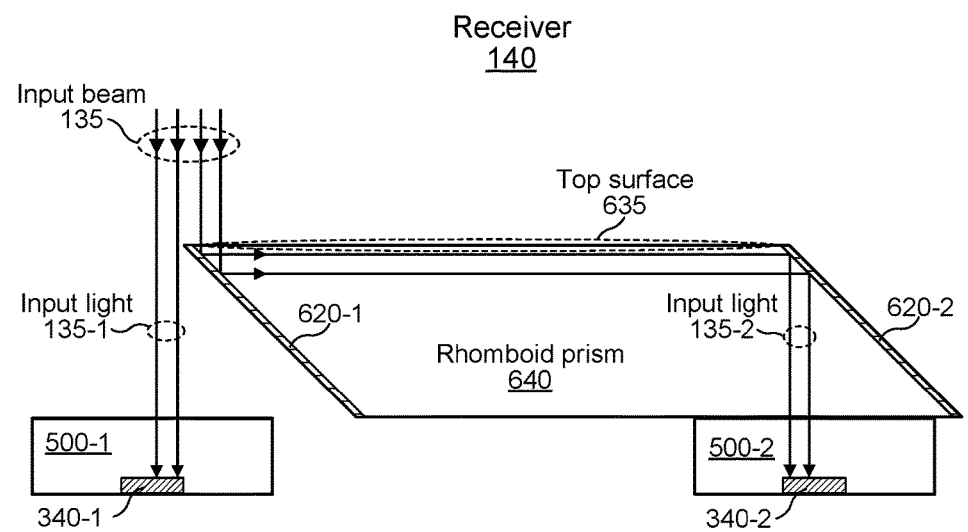
FIG. 25 illustrates an example receiver that includes a rhomboid prism.

FIG. 25 illustrates an example receiver 140 that includes a rhomboid prism 640. Rather than using two prisms (as illustrated in FIGS. 21-24), an optical assembly of a receiver 140 may include a rhomboid prism 640. The reflective surfaces 620-1 and 620-2 of the rhomboid prism 640 may include a reflective metallic coating or a reflective dielectric coating. Alternatively, the reflective surface 620-1 or 620-2 may be provided by total internal reflection of the input light 135-2 at the surface 620-1 or 620-2. In FIG. 25, the first reflective surface 620-1 of the rhomboid prism 640 splits off the input light 135-2 and directs the input light 135-2 to the second reflective surface 620-2. The second reflective surface 620-2 reflects the input light 135-2 to direct it to the detector 340-2. The input light 135-1, which is directed to detector 340-1, includes part of the input beam 135 that is not reflected by the reflective surface 620-1 of prism 630-1. The rhomboid prism 640 illustrated in FIG. 25 may allow for ease of assembly and manufacturing. For example, the horizontal top surface 635 may allow for the rhomboid prism 640 to be picked up and precisely positioned using a pick-and-place machine or a vacuum-handling tool. Additionally, the top surface 635 may include an anti-reflection coating having a low reflectivity at a wavelength of the input beam 135.

Figure 26:
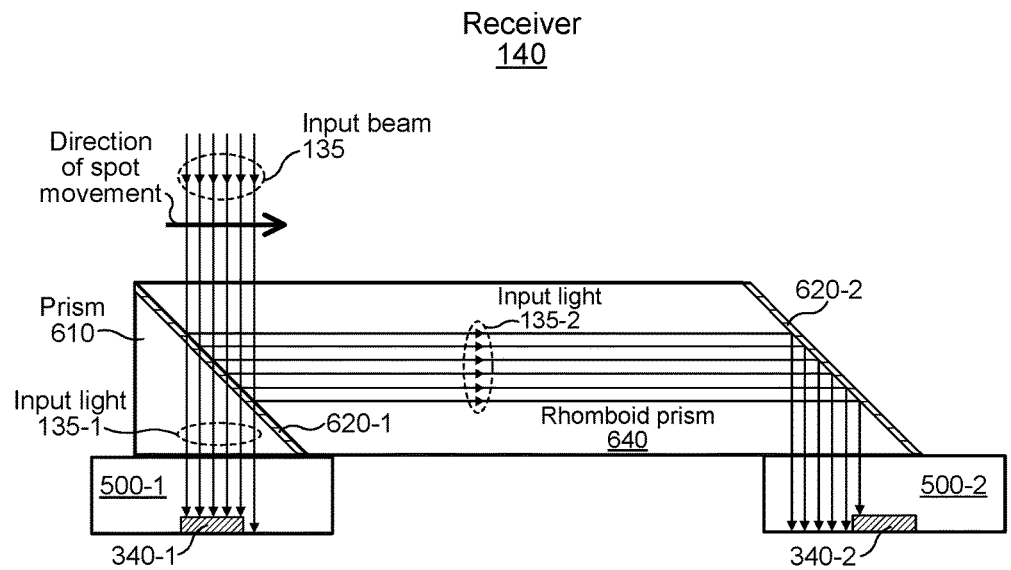
FIG. 26 illustrates an example receiver that includes a rhomboid prism with a partially reflective surface.

FIG. 26 illustrates an example receiver 140 that includes a rhomboid prism 640 with a partially reflective surface 620-1. In particular embodiments, an optical assembly of a receiver 140 may include a reflective surface 620-1 that is partially reflective. A partially reflective surface 620-1 may reflect any suitable percentage (e.g., approximately 10%, 20%, 50%, 70%, or 90%) of an incident input beam 135 and may transmit any suitable percentage (e.g., approximately 90%, 80%, 50%, 30%, or 10%) of the incident input beam 135. For example, reflective surface 620-1 in FIG. 26 may have a reflectivity of approximately 50% so that approximately one-half of the input beam 135 is reflected as input light beam 135-2 and approximately one-half of the input beam 135 is transmitted as input light beam 135-1. A partially reflective surface 620-1 may be configured to direct the reflected light to detector 340-1 or 340-2. In FIG. 26, the partially reflective surface 620-1 directs the reflected light (as input light beam 135-2) to detector 340-2, and the transmitted light is directed (as input light beam 135-1) to detector 340-1.

In particular embodiments, an optical assembly of a receiver 140 may include a rhomboid prism 640 with a partially reflective surface 620-1. In FIG. 26, a portion of the input beam 135 is reflected by the partially reflective surface 620-1 to produce the input light beam 135-2. The input light beam 135-2 propagates through the rhomboid prism 640 and is reflected toward detector 340-2 by reflective surface 620-2. The partially reflective surface 620-1 may include a partially reflective metallic or dielectric coating (e.g., a gold, silver, or aluminum coating that reflects approximately 50% of input beam 135 and transmits approximately 50% of input beam 135). The reflective surface 620-2 may include a reflective metallic or dielectric coating that reflects greater than 90% of the input light 135-2. Alternatively, the reflective surface 620-2 may be provided by total internal reflection at the interface between the rhomboid prism 640 and the surrounding environment.

In particular embodiments, an optical assembly may include a rhomboid prism 640 attached to another optical component. The rhomboid prism 640 in FIG. 26 is attached to prism 610 (e.g., using an epoxy or adhesive), and the prism/rhomboid-prism optical assembly may provide for secure attachment to the detector chips 500-1 and 500-2. In FIG. 26, the prism 610 may be affixed to the top surface of detector chip 500-1, and the right end of the rhomboid prism 640 may be affixed to the top surface of detector chip 500-2. The bottom surface of the prism 610 may provide a flat surface to allow the optical assembly to be securely attached to the top surface of detector chip 500-1.

In the example of FIG. 26, the input beam is split by the partially reflective surface 620-1 into two beams: input light beam 135-1 and input light beam 135-2. The rhomboid prism 640 and the detectors 340-1 and 340-2 may be positioned so that for a nearby target 130, the amount of input light 135-1 directed to detector 340-1 is greater than the amount of input light 135-2 directed to detector 340-2. As the distance to a target 130 increases, the input light beam 135 moves in the direction of spot movement indicated in FIG. 26. The increase in target distance (and the corresponding movement of the input beam spot) causes the amount of input light 135-1 incident on detector 340-1 to decrease and the amount of input light 135-2 incident on detector 340-2 to increase. Whether a target 130 is located a distance that is less than or greater than an operating range of a lidar system 100 may be determined based on the signals produced by the detectors 340-1 and 340-2 in response to a received input optical signal 135.

Figure 27:
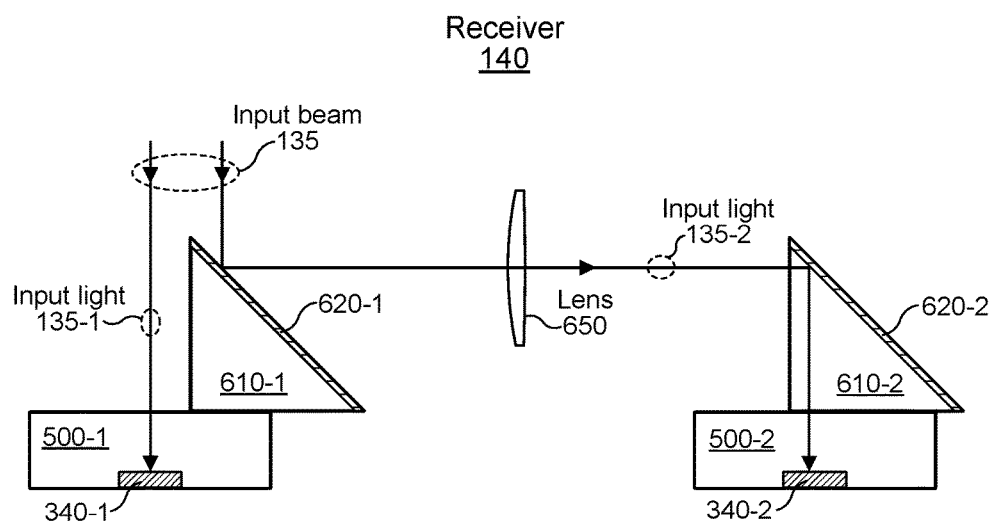
FIG. 27 illustrates an example receiver that includes a lens.

FIG. 27 illustrates an example receiver 140 that includes a lens 650. In particular embodiments, an optical assembly of a receiver 140 may include a focusing element configured to focus the input light 135-1 or the input light 135-2. In FIG. 27, the optical assembly includes a lens 650 that acts as a focusing element to focus the input light 135-2 onto detector 340-2. The input light 135-2 may be a beam that diverges as it propagates, and without a focusing element, the spot size of the input light beam 135-2 may be larger than the area of the detector 340-2. The lens 650 may focus the input light beam 135-2 so that the detector 340-2 receives most or all of the light from the input beam 135-2. Additionally or alternatively, an optical assembly may include a focusing element that focuses the input light 135-1 onto the detector 350-1.

Figure 28:
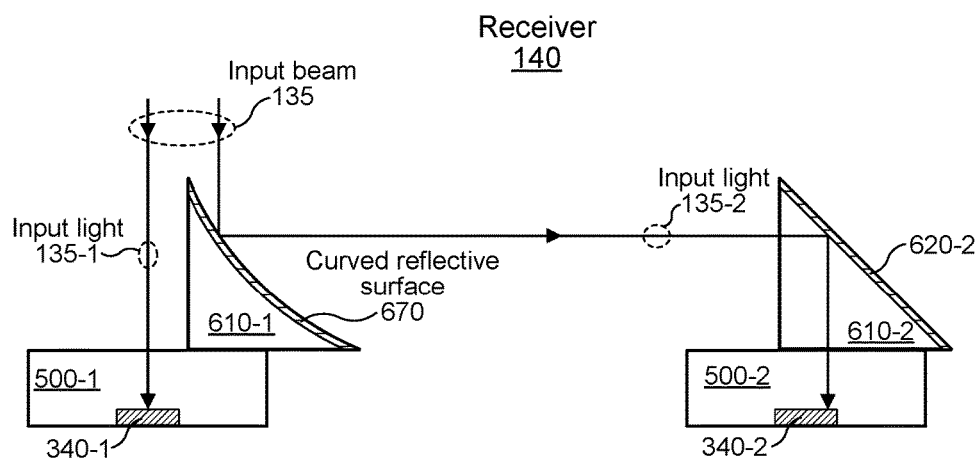
FIG. 28 illustrates an example receiver that includes a curved reflective surface.

FIG. 28 illustrates an example receiver 140 that includes a curved reflective surface 670. In FIG. 28, the optical assembly of the receiver 140 includes a curved reflective surface 670 that acts as a focusing element for the input light 135-2. The curved reflective surface 670 may include a reflective metallic or dielectric coating having any suitable shape (e.g., spherical, parabolic, or ellipsoidal). The curved reflective surface 670 may focus the input light beam 135-2 so that the detector 340-2 receives most or all of the light from the input beam 135-2.

Figure 29:
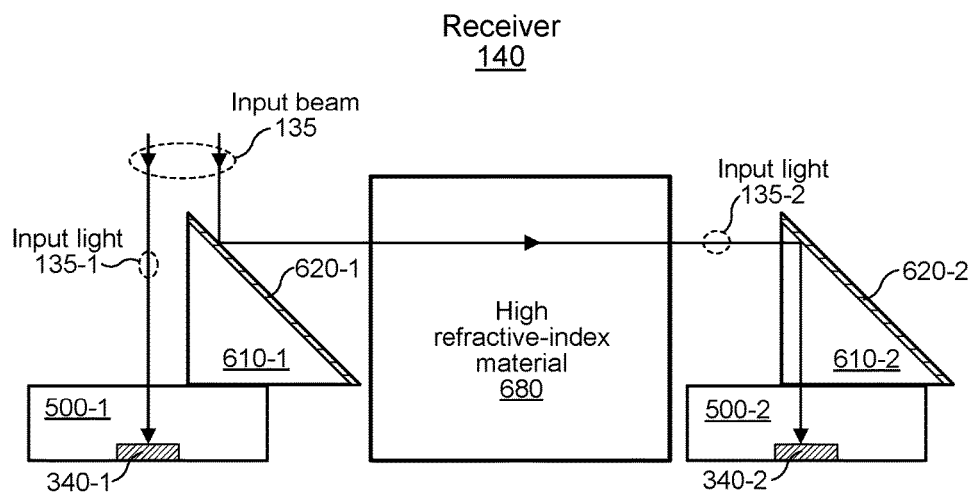
FIG. 29 illustrates an example receiver that includes a high refractive-index material.

FIG. 29 illustrates an example receiver 140 that includes a high refractive-index material 680. In particular embodiments, an optical assembly of a receiver 140 may include a high refractive-index material 680 that reduces the angular divergence of the input light beam 135-2. When the input light beam 135-2 enters the high refractive-index material 680, the beam 135-2 may be refracted by the high-index material 680, and the angular divergence of the beam may be reduced. The reduction in the angular divergence of the beam may allow the detector 340-2 to receive most or all of the light from the input beam 135-2. The high refractive-index material 680 may be made from any suitable material that is substantially transparent to light at one or more operating wavelengths of a lidar system 100 between 1200 nm and 1600 nm. For example, the high refractive-index material 680 may be made from glass (e.g., fused silica or flint glass) or a semiconductor material (e.g., silicon, gallium arsenide, AlGaAs, gallium phosphide, indium phosphide, or zinc selenide). The high refractive-index material 680 may have any suitable refractive index at one or more operating wavelengths of the lidar system 100, such as for example, a relatively high refractive index of approximately 1.5, 2.0, 2.5, 3.0, 3.5, or 4.0. The rhomboid prism 640 illustrated in FIG. 25 or FIG. 26 may be made from a material with a relatively high refractive index.

Figure 30:
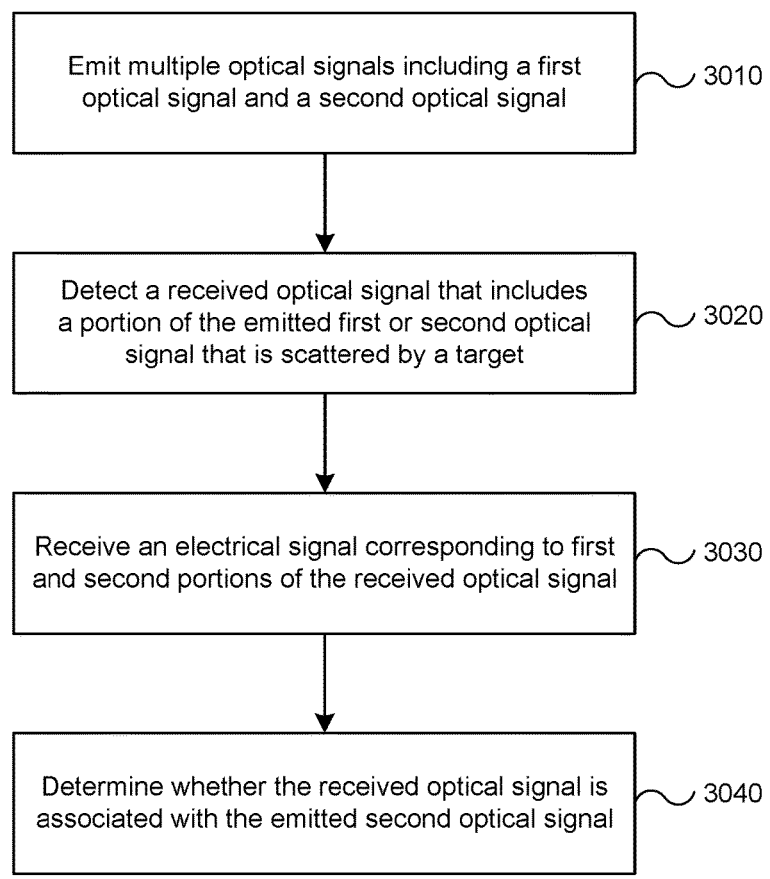
FIG. 30 illustrates an example method for determining whether a received optical signal is associated with an emitted optical signal.

FIG. 30 illustrates an example method 3000 for determining whether a received optical signal is associated with an emitted optical signal. The method 3000 illustrated in FIG. 30 may correspond to a method for mitigating range ambiguity. For example, in FIGS. 10 and 11, the lidar system 100 may emit a first optical pulse 400C and a second optical pulse 400D, and method 3000 may be used to determine whether the received optical pulse 410C is associated with the second optical pulse. The method may begin at step 3010, where multiple optical signals may be emitted, the optical signals including a first optical signal and a second optical signal. For example, the first and second optical signals may each include a pulse of light emitted by a light source 110 of a lidar system 100 and directed into a field of regard of the lidar system 100. The second pulse of light may be emitted a particular time interval τ after the first pulse of light. At step 3020, a received optical signal (e.g., input beam 135) may be detected, where the received optical signal includes a portion of the emitted first or second optical signal that is scattered by a target 130. The received optical signal may be detected by a receiver 140, and the received optical signal may be detected after the second optical signal is emitted. The receiver 140 may include a first detector 340-1 configured to detect a first portion 135-1 of the received optical signal and a second detector 340-2 configured to detect a second portion 135-2 of the received optical signal. At step 3030, an electrical signal corresponding to the first and second portions of the received optical signal may be received. For example, a receiver 140 may produce an output electrical signal and send it to a controller 150 of a lidar system 100, and the controller 150 may receive the output electrical signal. An output electrical signal may include one or more analog signals, one or more digital signals, or any suitable combination of analog and digital signals. At step 3040, a controller 150 may determine whether the received optical signal is associated with the emitted second optical, at which point the method may end. For example, a controller 150 may receive an output electrical signal from a receiver 140, and based at least in part on the received electrical signal, the controller 150 may determine whether the received optical signal is associated with the emitted second optical signal. Additionally or alternatively, the controller 150 may determine whether the received optical signal is associated with the emitted first or second optical signal.

Figure 31:
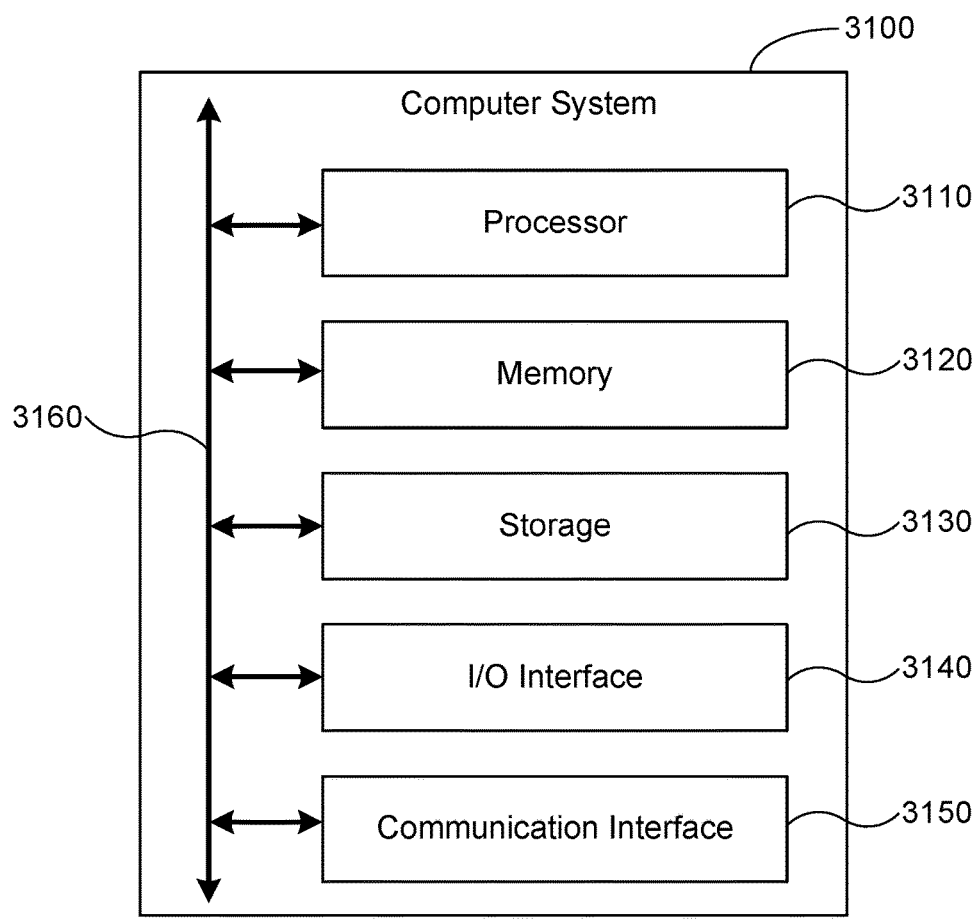
FIG. 31 illustrates an example computer system.

FIG. 31 illustrates an example computer system 3100. In particular embodiments, one or more computer systems 3100 may perform one or more steps of one or more methods described or illustrated herein. In particular embodiments, one or more computer systems 3100 may provide functionality described or illustrated herein. In particular embodiments, software running on one or more computer systems 3100 may perform one or more steps of one or more methods described or illustrated herein or may provide functionality described or illustrated herein. Particular embodiments may include one or more portions of one or more computer systems 3100. In particular embodiments, a computer system may include or may be referred to as a processor, a controller, a computing device, a computing system, a computer, a general-purpose computer, or a data-processing apparatus. Herein, reference to a computer system may encompass one or more computer systems, where appropriate.

Computer system 3100 may take any suitable physical form. As an example, computer system 3100 may be an embedded computer system, a system-on-chip (SOC), a single-board computer system (SBC), a desktop computer system, a laptop or notebook computer system, a mainframe, a mesh of computer systems, a server, a tablet computer system, or any suitable combination of two or more of these. As another example, all or part of computer system 3100 may be combined with, coupled to, or integrated into a variety of devices, including, but not limited to, a camera, camcorder, personal digital assistant (PDA), mobile telephone, smartphone, electronic reading device (e.g., an e-reader), game console, smart watch, clock, calculator, television monitor, flat-panel display, computer monitor, vehicle display (e.g., odometer display or dashboard display), vehicle navigation system, lidar system, ADAS, autonomous vehicle, autonomous-vehicle driving system, cockpit control, camera view display (e.g., display of a rear-view camera in a vehicle), eyewear, or head-mounted display. Where appropriate, computer system 3100 may include one or more computer systems 3100; be unitary or distributed; span multiple locations; span multiple machines; span multiple data centers; or reside in a cloud, which may include one or more cloud components in one or more networks. Where appropriate, one or more computer systems 3100 may perform without substantial spatial or temporal limitation one or more steps of one or more methods described or illustrated herein. As an example, one or more computer systems 3100 may perform in real time or in batch mode one or more steps of one or more methods described or illustrated herein. One or more computer systems 3100 may perform at different times or at different locations one or more steps of one or more methods described or illustrated herein, where appropriate.

As illustrated in the example of FIG. 31, computer system 3100 may include a processor 3110, memory 3120, storage 3130, an input/output (I/O) interface 3140, a communication interface 3150, or a bus 3160. Computer system 3100 may include any suitable number of any suitable components in any suitable arrangement.

In particular embodiments, processor 3110 may include hardware for executing instructions, such as those making up a computer program. As an example, to execute instructions, processor 3110 may retrieve (or fetch) the instructions from an internal register, an internal cache, memory 3120, or storage 3130; decode and execute them; and then write one or more results to an internal register, an internal cache, memory 3120, or storage 3130. In particular embodiments, processor 3110 may include one or more internal caches for data, instructions, or addresses. Processor 3110 may include any suitable number of any suitable internal caches, where appropriate. As an example, processor 3110 may include one or more instruction caches, one or more data caches, or one or more translation lookaside buffers (TLBs). Instructions in the instruction caches may be copies of instructions in memory 3120 or storage 3130, and the instruction caches may speed up retrieval of those instructions by processor 3110. Data in the data caches may be copies of data in memory 3120 or storage 3130 for instructions executing at processor 3110 to operate on; the results of previous instructions executed at processor 3110 for access by subsequent instructions executing at processor 3110 or for writing to memory 3120 or storage 3130; or other suitable data. The data caches may speed up read or write operations by processor 3110. The TLBs may speed up virtual-address translation for processor 3110. In particular embodiments, processor 3110 may include one or more internal registers for data, instructions, or addresses. Processor 3110 may include any suitable number of any suitable internal registers, where appropriate. Where appropriate, processor 3110 may include one or more arithmetic logic units (ALUs); may be a multi-core processor; or may include one or more processors 3110.

In particular embodiments, memory 3120 may include main memory for storing instructions for processor 3110 to execute or data for processor 3110 to operate on. As an example, computer system 3100 may load instructions from storage 3130 or another source (such as, for example, another computer system 3100) to memory 3120. Processor 3110 may then load the instructions from memory 3120 to an internal register or internal cache. To execute the instructions, processor 3110 may retrieve the instructions from the internal register or internal cache and decode them. During or after execution of the instructions, processor 3110 may write one or more results (which may be intermediate or final results) to the internal register or internal cache. Processor 3110 may then write one or more of those results to memory 3120. One or more memory buses (which may each include an address bus and a data bus) may couple processor 3110 to memory 3120. Bus 3160 may include one or more memory buses. In particular embodiments, one or more memory management units (MMUs) may reside between processor 3110 and memory 3120 and facilitate accesses to memory 3120 requested by processor 3110. In particular embodiments, memory 3120 may include random access memory (RAM). This RAM may be volatile memory, where appropriate. Where appropriate, this RAM may be dynamic RAM (DRAM) or static RAM (SRAM). Memory 3120 may include one or more memories 3120, where appropriate.

In particular embodiments, storage 3130 may include mass storage for data or instructions. As an example, storage 3130 may include a hard disk drive (HDD), a floppy disk drive, flash memory, an optical disc, a magneto-optical disc, magnetic tape, or a Universal Serial Bus (USB) drive or a combination of two or more of these. Storage 3130 may include removable or non-removable (or fixed) media, where appropriate. Storage 3130 may be internal or external to computer system 3100, where appropriate. In particular embodiments, storage 3130 may be non-volatile, solid-state memory. In particular embodiments, storage 3130 may include read-only memory (ROM). Where appropriate, this ROM may be mask ROM (MROM), programmable ROM (PROM), erasable PROM (EPROM), electrically erasable PROM (EEPROM), flash memory, or a combination of two or more of these. Storage 3130 may include one or more storage control units facilitating communication between processor 3110 and storage 3130, where appropriate. Where appropriate, storage 3130 may include one or more storages 3130.

In particular embodiments, I/O interface 3140 may include hardware, software, or both, providing one or more interfaces for communication between computer system 3100 and one or more I/O devices. Computer system 3100 may include one or more of these I/O devices, where appropriate. One or more of these I/O devices may enable communication between a person and computer system 3100. As an example, an I/O device may include a keyboard, keypad, microphone, monitor, mouse, printer, scanner, speaker, camera, stylus, tablet, touch screen, trackball, another suitable I/O device, or any suitable combination of two or more of these. An I/O device may include one or more sensors. Where appropriate, I/O interface 3140 may include one or more device or software drivers enabling processor 3110 to drive one or more of these I/O devices. I/O interface 3140 may include one or more I/O interfaces 3140, where appropriate.

In particular embodiments, communication interface 3150 may include hardware, software, or both providing one or more interfaces for communication (such as, for example, packet-based communication) between computer system 3100 and one or more other computer systems 3100 or one or more networks. As an example, communication interface 3150 may include a network interface controller (NIC) or network adapter for communicating with an Ethernet or other wire-based network or a wireless NIC (WNIC); a wireless adapter for communicating with a wireless network, such as a WI-FI network; or an optical transmitter (e.g., a laser or a light-emitting diode) or an optical receiver (e.g., a photodetector) for communicating using fiber-optic communication or free-space optical communication. Computer system 3100 may communicate with an ad hoc network, a personal area network (PAN), an in-vehicle network (IVN), a local area network (LAN), a wide area network (WAN), a metropolitan area network (MAN), or one or more portions of the Internet or a combination of two or more of these. One or more portions of one or more of these networks may be wired or wireless. As an example, computer system 3100 may communicate with a wireless PAN (WPAN) (such as, for example, a BLUETOOTH WPAN), a WI-FI network, a Worldwide Interoperability for Microwave Access (WiMAX) network, a cellular telephone network (such as, for example, a Global System for Mobile Communications (GSM) network), or other suitable wireless network or a combination of two or more of these. As another example, computer system 3100 may communicate using fiber-optic communication based on 100 Gigabit Ethernet (100 GbE), 10 Gigabit Ethernet (10 GbE), or Synchronous Optical Networking (SONET). Computer system 3100 may include any suitable communication interface 3150 for any of these networks, where appropriate. Communication interface 3150 may include one or more communication interfaces 3150, where appropriate.

In particular embodiments, bus 3160 may include hardware, software, or both coupling components of computer system 3100 to each other. As an example, bus 3160 may include an Accelerated Graphics Port (AGP) or other graphics bus, a controller area network (CAN) bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these. Bus 3160 may include one or more buses 3160, where appropriate.

In particular embodiments, various modules, circuits, systems, methods, or algorithm steps described in connection with the implementations disclosed herein may be implemented as electronic hardware, computer software, or any suitable combination of hardware and software. In particular embodiments, computer software (which may be referred to as software, computer-executable code, computer code, a computer program, computer instructions, or instructions) may be used to perform various functions described or illustrated herein, and computer software may be configured to be executed by or to control the operation of computer system 3100. As an example, computer software may include instructions configured to be executed by processor 3110. In particular embodiments, owing to the interchangeability of hardware and software, the various illustrative logical blocks, modules, circuits, or algorithm steps have been described generally in terms of functionality. Whether such functionality is implemented in hardware, software, or a combination of hardware and software may depend upon the particular application or design constraints imposed on the overall system.

In particular embodiments, a computing device may be used to implement various modules, circuits, systems, methods, or algorithm steps disclosed herein. As an example, all or part of a module, circuit, system, method, or algorithm disclosed herein may be implemented or performed by a general-purpose single- or multi-chip processor, a digital signal processor (DSP), an ASIC, a FPGA, any other suitable programmable-logic device, discrete gate or transistor logic, discrete hardware components, or any suitable combination thereof. A general-purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In particular embodiments, one or more implementations of the subject matter described herein may be implemented as one or more computer programs (e.g., one or more modules of computer-program instructions encoded or stored on a computer-readable non-transitory storage medium). As an example, the steps of a method or algorithm disclosed herein may be implemented in a processor-executable software module which may reside on a computer-readable non-transitory storage medium. In particular embodiments, a computer-readable non-transitory storage medium may include any suitable storage medium that may be used to store or transfer computer software and that may be accessed by a computer system. Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs (e.g., compact discs (CDs), CD-ROM, digital versatile discs (DVDs), blu-ray discs, or laser discs), optical disc drives (ODDs), magneto-optical discs, magneto-optical drives, floppy diskettes, floppy disk drives (FDDs), magnetic tapes, flash memories, solid-state drives (SSDs), RAM, RAM-drives, ROM, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In particular embodiments, certain features described herein in the context of separate implementations may also be combined and implemented in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various embodiments have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately, "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

What is claimed is:

1. A lidar system comprising:
   a light source configured to emit a plurality of optical signals directed into a field of regard of the lidar system, the optical signals comprising a first optical signal and a second optical signal, wherein the second optical signal is emitted a particular time interval after the first optical signal is emitted;
   a receiver configured to detect a received optical signal comprising a portion of the emitted first or second optical signal that is scattered by a target located a distance from the lidar system, wherein the received optical signal is detected after the second optical signal is emitted, and wherein the receiver comprises:
      a first detector configured to detect a first portion of the received optical signal; and
      a second detector configured to detect a second portion of the received optical signal; and
   a processor configured to:
      receive, from the receiver, an electrical signal corresponding to the first and second portions of the received optical signal; and
      determine, based at least in part on the received electrical signal, whether the received optical signal is associated with the emitted second optical signal.

2. The lidar system of claim 1, wherein the processor is further configured to determine whether the received optical signal is associated with the emitted first optical signal.

3. The lidar system of claim 2, wherein the received optical signal being associated with the emitted first optical signal corresponds to a range-ambiguity event wherein the distance to the target is greater than an operating range of the lidar system.

4. The lidar system of claim 2, wherein, in response to determining that the received optical signal is associated with the emitted first optical signal, the processor is further configured to disregard the received electrical signal.

5. The lidar system of claim 2, wherein, in response to determining that the received optical signal is associated with the emitted first optical signal, the processor is further configured to determine the distance from the lidar system to the target based at least in part on:
   a first distance associated with the particular time interval between emission of the first and second optical signals; and
   a second distance associated with a time interval between emission of the second optical signal and a time when the received optical signal is detected by the receiver.

6. The lidar system of claim 1, wherein the received optical signal being associated with the emitted second optical signal corresponds to the distance to the target being less than an operating range of the lidar system.

7. The lidar system of claim 1, wherein, in response to determining that the received optical signal is associated with the emitted second optical signal, the processor is further configured to determine the distance from the lidar system to the target based at least in part on a time interval between emission of the second optical signal and a time when the received optical signal is detected by the receiver.

8. The lidar system of claim 1, wherein determining whether the received optical signal is associated with the emitted second optical signal comprises analyzing the received electrical signal to compare $OC_1$, an optical characteristic of the first portion of the received optical signal, to $OC_2$, a corresponding optical characteristic of the second portion of the received optical signal, wherein the optical characteristics $OC_1$ and $OC_2$ each corresponds to a peak optical power, an average optical power, a peak optical intensity, or an optical pulse energy.

9. The lidar system of claim 8, wherein the processor is configured to determine that the received optical signal is associated with the emitted second optical signal if $OC_1$ is greater than $OC_2$.

10. The lidar system of claim 8, wherein the processor is configured to determine that the received optical signal is associated with the emitted second optical signal if a ratio $OC_1/OC_2$ exceeds a particular threshold value.

11. The lidar system of claim 1, wherein:
   the optical signals further comprise a third optical signal emitted another particular time interval after the second optical signal;
   the received optical signal comprises a portion of the emitted first, second, or third optical signal that is scattered by the target;
   the received optical signal is detected after the third optical signal is emitted; and
   the processor is configured to determine whether the received optical signal is associated with the emitted first optical signal, the emitted second optical signal, or the emitted third optical signal.

12. The lidar system of claim 1, wherein:
   the first detector is a near-range detector configured to produce a larger response to the received optical signal than the second detector if the distance to the target is less than a near-range distance of the lidar system; and
   the second detector is a far-range detector configured to produce a larger response than the first detector if the distance to the target is greater than the near-range distance.

13. The lidar system of claim 1, wherein the lidar system further comprises a scanner configured to:
   scan an output beam comprising the plurality of optical signals in a scan direction across the field of regard of the lidar system; and
   scan a field of view of the receiver in the scan direction across the field of regard of the lidar system so that:

the first detector produces a larger response than the second detector for scattered light received from targets located within a near-range distance of the lidar system; and the second detector produces a larger response than the first detector for scattered light received from targets located beyond the near-range distance.

14. The lidar system of claim 1, wherein the first detector and the second detector are arranged along a line corresponding to a scan direction of a field of view of the receiver.

15. The lidar system of claim 1, wherein the first and second detectors are disposed on or in a single detector chip, wherein the first and second detectors are separated by a gap of less than 100 micrometers.

16. The lidar system of claim 1, wherein the first detector is part of a first detector chip and the second detector is part of a second detector chip that is separate from the first detector chip.

17. The lidar system of claim 1, wherein each of the first and second detectors comprises an avalanche photodiode (APD) or a PIN photodiode.

18. The lidar system of claim 1, wherein:
detecting the first portion of the received optical signal comprises the first detector producing a first electrical-current signal corresponding to the first portion of the received optical signal; and
detecting the second portion of the received optical signal comprises the second detector producing a second electrical-current signal corresponding to the second portion of the received optical signal.

19. The lidar system of claim 18, wherein the receiver further comprises:
a first transimpedance amplifier configured to produce a first voltage signal corresponding to the first electrical-current signal; and
a second transimpedance amplifier configured to produce a second voltage signal corresponding to the second electrical-current signal.

20. The lidar system of claim 18, wherein:
the first and second detectors are coupled together so their respective electrical-current signals are subtracted to produce a difference-current signal; and
the receiver further comprises a transimpedance amplifier configured to produce a voltage signal corresponding to the difference-current signal.

21. The lidar system of claim 1, wherein the received electrical signal is a digital signal comprising one or more values corresponding to an optical characteristic of the first portion of the received optical signal and an optical characteristic of the second portion of the received optical signal.

22. The lidar system of claim 1, wherein the received electrical signal comprises a first electrical signal corresponding to the first portion of the received optical signal and a second electrical signal corresponding to the second portion of the received optical signal.

23. The lidar system of claim 1, wherein the receiver further comprises an optical assembly configured to split off the second portion of the received optical signal from the received optical signal and direct the second portion to the second detector.

24. The lidar system of claim 23, wherein the optical assembly comprises a mirror configured to reflect the second portion to direct the second portion to the second detector.

25. The lidar system of claim 23, wherein the optical assembly comprises a first prism and a second prism, wherein:
the first prism is configured to split off the second portion of the received optical signal and direct the second portion to the second prism; and
the second prism is configured to direct the second portion to the second detector.

26. The lidar system of claim 23, wherein the optical assembly comprises an optical focusing element configured to focus the second portion of the received optical signal.

27. The lidar system of claim 23, wherein the optical assembly comprises an optical material having a relatively high refractive index configured to reduce an amount of angular divergence of the second portion of the received optical signal.

28. The lidar system of claim 1, wherein the lidar system is a pulsed lidar system wherein the plurality of optical signals comprise optical pulses having:
a pulse energy between 0.1 µJ and 100 µJ;
a pulse repetition frequency between 80 kHz and 10 MHz; and
a pulse duration between 0.1 ns and 50 ns.

29. The lidar system of claim 1, wherein the lidar system is a frequency-modulated continuous-wave (FMCW) lidar system wherein each of the plurality of optical signals comprises frequency-modulated light.

30. A method comprising:
emitting, by a light source of a lidar system, a plurality of optical signals directed into a field of regard of the lidar system, the optical signals comprising a first optical signal and a second optical signal, wherein the second optical signal is emitted a particular time interval after the first optical signal is emitted;
detecting, by a receiver of the lidar system, a received optical signal comprising a portion of the emitted first or second optical signal that is scattered by a target located a distance from the lidar system, wherein the received optical signal is detected after the second optical signal is emitted, and wherein detecting the received optical signal comprises:
detecting, by a first detector of the receiver, a first portion of the received optical signal; and
detecting, by a second detector of the receiver, a second portion of the received optical signal;
receiving, by a processor of the lidar system, an electrical signal corresponding to the first and second portions of the received optical signal; and
determining, by the processor and based at least in part on the received electrical signal, whether the received optical signal is associated with the emitted second optical signal.

* * * * *